(12) United States Patent
Richards et al.

(10) Patent No.: US 7,577,415 B1
(45) Date of Patent: Aug. 18, 2009

(54) METHOD AND APPARATUS FOR ULTRA WIDEBAND POWER CONTROL

(75) Inventors: James L. Richards, Fayetteville, TN (US); Larry W. Fullerton, Brownsboro, AL (US); Ivan A. Cowie, Madison, AL (US)

(73) Assignee: Alereon, Inc., Austin, TX (US)

( * ) Notice: Subject to any disclaimer, the term of this patent is extended or adjusted under 35 U.S.C. 154(b) by 0 days.

(21) Appl. No.: 11/710,175

(22) Filed: Feb. 23, 2007

Related U.S. Application Data

(63) Continuation of application No. 11/398,951, filed on Apr. 6, 2006, now Pat. No. 7,209,724, which is a continuation of application No. 10/409,009, filed on Apr. 8, 2003, which is a continuation of application No. 09/586,163, filed on Jun. 2, 2000, now Pat. No. 6,571,089, which is a continuation-in-part of application No. 09/332,501, filed on Jun. 14, 1999, now Pat. No. 6,539,213.

(51) Int. Cl.
  *H04Q 7/20* (2006.01)
(52) U.S. Cl. .......... 455/266; 455/522; 455/69; 455/550.1; 455/127.1; 455/517
(58) Field of Classification Search .......... 455/226.3, 455/522, 69, 550.1, 422.1, 426.1, 426.2, 455/517, 68, 70, 67.11, 500, 509, 403, 414.1, 455/414.2, 423, 424
See application file for complete search history.

(56) References Cited

U.S. PATENT DOCUMENTS

| | | | |
|---|---|---|---|
| 4,228,538 A | 10/1980 | Scharla-Nielsen et al. |
| 4,641,317 A | 2/1987 | Fullerton |
| 4,743,906 A | 5/1988 | Fullerton |
| 4,777,653 A | 10/1988 | Bonnerot et al. |
| 4,813,057 A | 3/1989 | Fullerton |
| 4,901,307 A | 2/1990 | Gilhousen et al. |
| 4,979,186 A | 12/1990 | Fullerton |
| 4,998,245 A | 3/1991 | Tanaka et al. |
| 5,056,109 A | 10/1991 | Gilhousen et al. |
| 5,216,692 A | 6/1993 | Ling |
| 5,245,629 A | 9/1993 | Hall |
| 5,257,283 A | 10/1993 | Gilhousen et al. |

(Continued)

FOREIGN PATENT DOCUMENTS

EP  0 853 393 A1  7/1998

(Continued)

OTHER PUBLICATIONS

Kolenchery, S. et al., "*Performance of Local Power Control in Peer-to-Peer Impulse Radio Networks with Bursty Traffic*," Center for Advanced Computing and Communications, 16 pages, Mar. 1997.

*Primary Examiner*—Keith T Ferguson
(74) *Attorney, Agent, or Firm*—Sprinkle IP Law Group

(57) ABSTRACT

A method for power control in an ultra wideband impulse radio system includes: (a) transmitting an impulse radio signal from a first transceiver, (b) receiving the impulse radio signal at a second transceiver; (c) determining at least one performance measurement of the received impulse radio signal; and (d) controlling output power of at least one of the first transceiver and the second transceiver in accordance with the at least one performance measurement.

16 Claims, 28 Drawing Sheets

U.S. PATENT DOCUMENTS

| | | |
|---|---|---|
| 5,267,262 A | 11/1993 | Wheatley, III |
| 5,333,175 A | 7/1994 | Ariyavisitakul et al. |
| 5,363,108 A | 11/1994 | Fullerton |
| 5,383,219 A | 1/1995 | Wheatley, III et al. |
| 5,396,516 A | 3/1995 | Padovani et al. |
| 5,461,639 A | 10/1995 | Wheatley, III et al. |
| 5,590,408 A | 12/1996 | Weiland et al. |
| 5,603,096 A | 2/1997 | Gilhousen et al. |
| 5,604,730 A | 2/1997 | Tiedemann, Jr. |
| 5,677,927 A | 10/1997 | Fullerton et al. |
| 5,687,169 A | 11/1997 | Fullerton |
| 5,758,271 A | 5/1998 | Rich et al. |
| 5,784,406 A | 7/1998 | DeJaco et al. |
| 5,832,035 A | 11/1998 | Fullerton |
| 5,982,760 A | 11/1999 | Chen |
| 6,292,519 B1 | 9/2001 | Popovic |
| 6,335,923 B2 | 1/2002 | Kubo |
| 6,370,109 B1 | 4/2002 | Schwartz et al. |
| 6,374,085 B1 | 4/2002 | Saints et al. |
| 6,628,929 B1 | 9/2003 | Normura |
| 7,023,833 B1 * | 4/2006 | Aiello et al. ................ 370/348 |
| 2002/0126739 A1 | 9/2002 | Tiedemann et al. |

FOREIGN PATENT DOCUMENTS

| | | | |
|---|---|---|---|
| WO | WO 00/04649 A1 | 1/2000 | |

\* cited by examiner

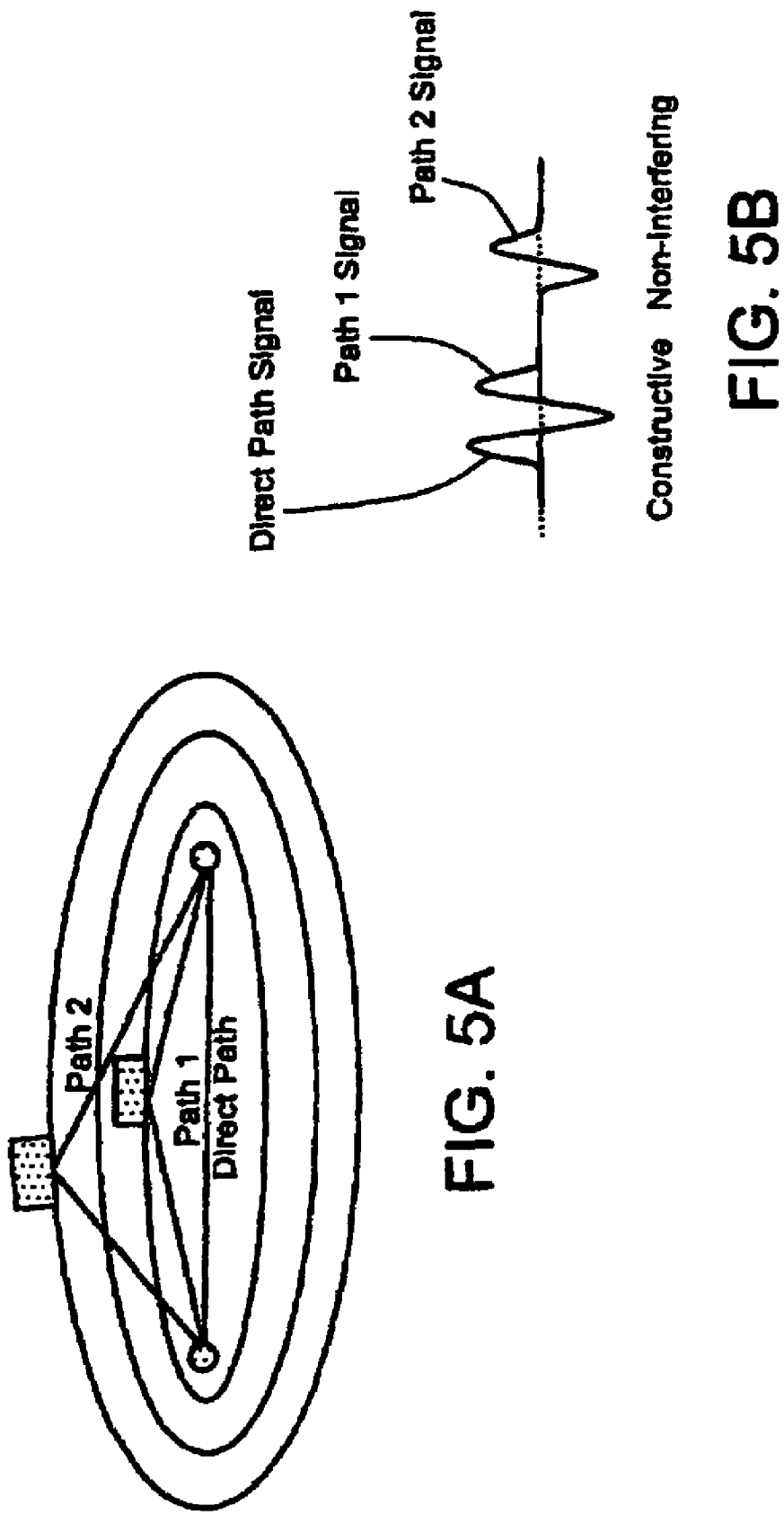

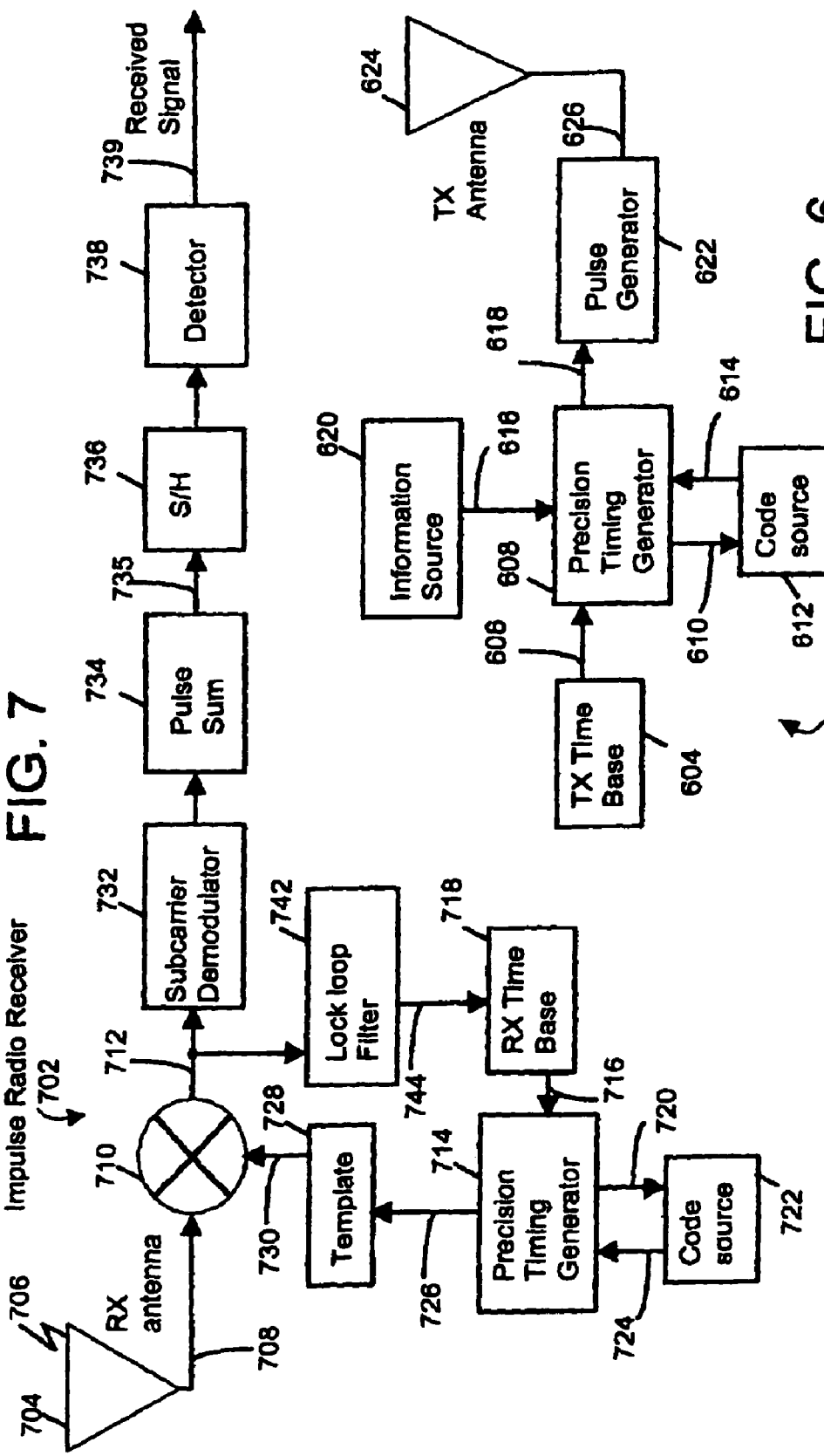

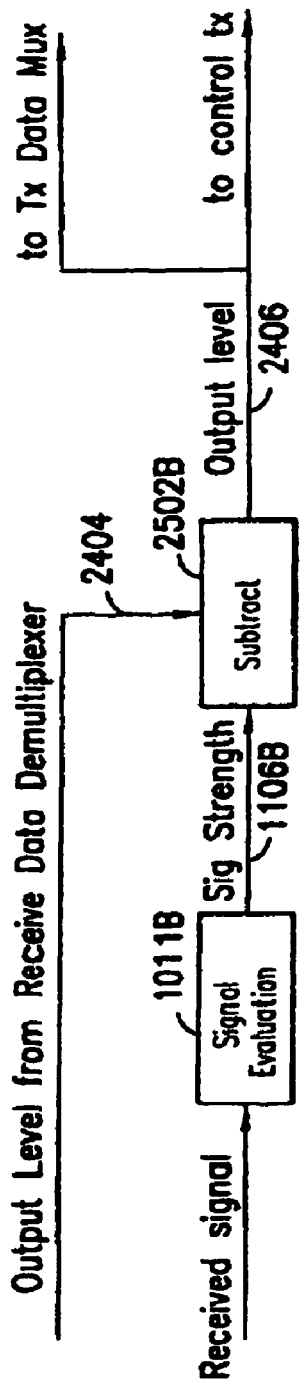
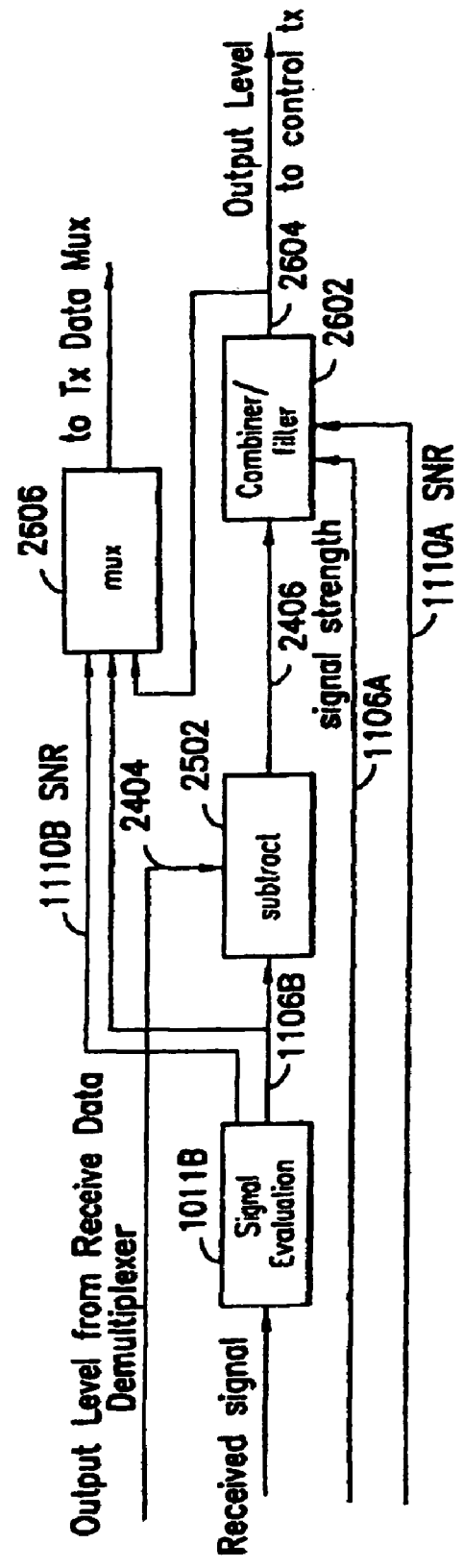
FIG. 25
FIG. 26

METHOD AND APPARATUS FOR ULTRA WIDEBAND POWER CONTROL

CROSS-REFERENCE TO RELATED APPLICATION

This application is a continuation of, and claims a benefit of priority under 35 U.S.C. 120 of the filing date of U.S. patent application Ser. No. 11/398,951; by inventors James L. Richards, et al., entitled "METHOD AND APPARATUS FOR POWER CONTROL IN AN ULTRA WIDEBAND RADIO SYSTEM" filed on Apr. 6, 2006 now U.S. Pat. No. 7,209,724, which in turn is a continuation of U.S. patent application Ser. No. 10/409,009, by inventors James L. Richards, et al., entitled "METHOD AND APPARATUS FOR POWER CONTROL IN AN ULTRA WIDEBAND IMPULSE RADIO SYSTEM", filed Apr. 8, 2003, which is a continuation and claims a benefit of priority under 35 U.S.C. 120 of the filing date of U.S. patent application Ser. No. 09/586,163 by inventors James L. Richards, et al., entitled "METHOD AND APPARATUS FOR MODERATING INTERFERENCE WHILE EFFECTING IMPULSE RADIO WIRELESS CONTROL OF EQUIPMENT", filed Jun. 2, 2000 (which has since issued as U.S. Pat. No. 6,571,089), which in turn is a continuation-in-part and claims a benefit of priority under 35 U.S.C. 120 of the filing date of U.S. application Ser. No. 09/332,501 by inventors James L. Richards, et al., entitled "SYSTEM AND METHOD FOR IMPULSE RADIO POWER CONTROL", filed Jun. 14, 1999 (which has since issued as U.S. Pat. No. 6,539,213). The entire contents of all above-mentioned patents and patent applications are hereby expressly incorporated by reference for all purposes.

BACKGROUND OF THE INVENTION

1. Field of the Invention

The present invention generally relates to wireless communications, and more specifically, to a system and a method for impulse radio power control.

2. Related Art

Recent advances in communications technology have enabled an emerging, revolutionary ultra wideband technology (UWB) called impulse radio communications systems (hereinafter called impulse radio).

Impulse radio was first fully described in a series of patents. Including U.S. Pat. Nos. 4,641,317 (issued Feb. 3, 1987), 4,813,057 (issued Mar. 14, 1989) 4,979,186 (issued Dec. 18, 1990) and 5,363,108 (issued Nov. 8, 1994) to Larry W. Fullerton.

A second generation of impulse radio patents include U.S. Pat. Nos. 5,677,927 (issued Oct. 14, 1997), 5,687,169 (issued Nov. 11, 1997) and 5,832,035 (issued Nov. 3, 1998) to Fullerton et al. These patent documents are incorporated herein by reference.

Uses of impulse radio systems are described in U.S. patent application No. 09/332,502, entitled, "System and Method for Intrusion Detention Using a Time Domain Radar Array," and U.S. patent application No. 09/332,503, entitled, "Wide Area Time Domain Radar Array," both filed the same day as the present application, Jun. 14, 1999, both of which are assigned to the assignee of the present invention, and both of which are incorporated herein by reference.

Basic impulse radio transmitters emit short pulses approaching a Gaussian monocycle with tightly controlled pulse-to-pulse intervals. Impulse radio systems typically use pulse position modulation, which is a form of time modulation where the value of each instantaneous sample of a modulating signal is caused to modulate the position of a pulse in time.

For impulse radio communications, the pulse-to-pulse interval is varied on a pulse-by-pulse basis by two components: an information component and a pseudo-random code component. Unlike direct sequence spread spectrum systems, the pseudo-random code for impulse radio communications is not necessary for energy spreading because the monocycle pulses themselves have an inherently wide bandwidth. Instead, the pseudo-random code of an impulse radio system is used for channelization, energy smoothing in the frequency domain and for interference suppression.

Generally speaking, an impulse radio receiver is a direct conversion receiver with a cross correlator front end. The front end coherently converts an electromagnetic pulse train of monocycle pulses to a baseband signal in a single stage. The data rate of the impulse radio transmission is typically a fraction of the periodic timing signal used as a time base. Because each data bit modulates the time position of many pulses of the periodic timing signal, this yields a modulated, coded timing signal that comprises a train of identically shaped pulses for each single data bit. The impulse radio receiver integrates multiple pulses to recover the transmitted information.

In a multi-user environment, impulse radio depends, in part, on processing gain to achieve rejection of unwanted signals. Because of the extremely high processing gain achievable with impulse radio, much higher dynamic ranges are possible than are commonly achieved with other spread spectrum methods, some of which must use power control in order to have a viable system. Further, if power is kept to a minimum in an impulse radio system, this will allow closer operation in co-site or nearly co-site situations where two impulse radios must operate concurrently, or where an impulse radio and a narrow band radio must operate close by one another and share the same band.

In some multi-user environments where there is a high density of users in a coverage area or where data rates are so high that processing gain is marginal, power control may be used to reduce the multi-user background noise to improve the number of channels available and the aggregate traffic density of the area.

Thus, one area in which further improvement is desired is in power control for impulse radio systems. Briefly stated, power control generally refers to adjusting the transmitter output power to the minimum necessary power to achieve acceptable signal reception at an impulse radio receiver. If the received signal power drops too low, the transmitter power should be increased. Conversely, if the received signal power rises too high, the transmitter power should be decreased. This potentially reduces interference with other services and increases the channelization (and thus, capacity) available to a multi-user impulse radio system.

Power control for impulse radio systems have been proposed. For example, in their paper entitled, "*Performance of Local Power Control In Peer to Peer Impulse Radio Networks with Bursty Traffic,*" Kolenchery et al. describe the combined use of a variable data rate with power control. Kolenchery et al. propose a system that uses closed loop power control with an open loop adjustment of power associated with each change in data rate to maintain constant signal to noise during the transient event of changing the data rate. However, the system proposed by Kolenchery et al. does not make full use of the properties of UWB. Further, Kolenchery et al. do not describe a system and method for measuring signal quality and applying such a system and method to power control.

A need therefore exists for an improved system and a method for impulse radio power control.

SUMMARY OF THE INVENTION

Briefly stated, the present invention is directed to a system and method for impulse radio power control. A first transceiver transmits an impulse radio signal to a second transceiver. A power control update is calculated according to a performance measurement of the impulse radio signal received at the second transceiver. The transmitter power of either transceiver, depending on the particular embodiment, is adjusted according to the power control update.

An advantage of the current invention is that interference is reduced. This is particularly important where multiple impulse radios are operating in close proximity (e.g., a densely utilized network), and their transmissions interfere with one another. Reducing the transmitter power of each radio to a level that produces satisfactory reception increases the total number of radios that can operate in an area without excess interference.

Another advantage of the current invention is that impulse radios can be more energy efficient. Reducing transmitter power to only the level required to produce satisfactory reception allows a reduction in the total power consumed by the transceiver, and thereby increases its efficiency.

Various performance measurements are employed according to the current invention to calculate a power control update. Bit error rate, signal-to-noise ratio, and received signal strength are three examples of performance measurements that can be used alone or in combination to form a power control update. There performance measurements vary by accuracy and time required to achieve an update. An appropriate performance measurement can be chosen based on the particular environment and application.

In one embodiment, where a pulse train including a quantity $N_{train}$ of pulses is transmitted for each bit of information, the output power of a transceiver is controlled by controlling the quantity $N_{train}$ of pulses according to the power control update. For example, in an embodiment where the quantity $N_{train}$ of pulses includes a quantity $N_{period}$ of periods, and each period includes a quantity $N_{pulses-per-period}$ of pulses, the output power of a transceiver can be controlled by controlling the quantity $N_{period}$ of periods. Alternatively, the output power can be controlled by controlling the quantity $N_{pulses-per-period}$ of pulses.

In one embodiment, where the output power of the first transceiver is controlled, the power control update is determined at the second transceiver and then sent from the second transceiver to the first transceiver. Alternatively, the second transceiver sends at least one performance measurement to the first transceiver, and the first transceiver then determines the power control update based on the performance measurement(s).

Further features and advantages of the invention, as well as the structure and operation of various embodiments of the invention, are described in detail below with reference to the accompanying drawings.

BRIEF DESCRIPTION OF THE FIGURES

Within the accompanying drawings, the convention used to describe signal connections requires that a signal line end at a junction with another signal line to indicate a connection. Two signal lines that cross indicate no connection at the crossing. The present invention will now be described with reference to the accompanying drawings, wherein:

FIG. 5A illustrates a typical geometrical configuration giving rise to multipath received signals;

FIG. 5B illustrates exemplary multipath signals in the time domain;

FIG. 6 illustrates a representative impulse radio transmitter functional diagram that does not include power control;

FIG. 7 illustrates a representative impulse radio receiver functional diagram that does not include power control;

FIG. 25 illustrates an embodiment of a power control algorithm employing auto-control with power level messages;

FIG. 26 illustrates an embodiment of a power control algorithm where auto-control and cross control are implemented in combination;

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

Table of Contents

Figure 1B:
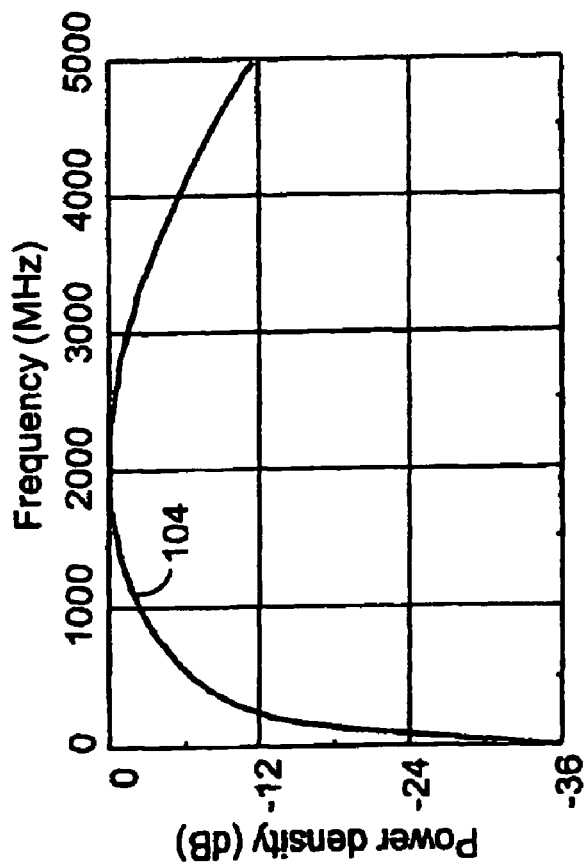
FIG. 1B illustrates the frequency domain amplitude of the Gaussian Monocycle of FIG. 1A.

I. Impulse Radio Basics
  I.1. Waveforms
  I.2. Pulse Trains
  I.3. Coding for Energy Smoothing and Channelization
  I.4. Modulation
  I.5 Reception and Demodulation
  I.6 Interference Resistance
  I.7 Processing Gain
  I.8 Capacity
  I.9 Multipath and Propagation
  I.10. Distance Measurement
II. Exemplary Transceiver Implementation
  II.1. Transmitter
  II.2. Receiver
III. Overview of the Invention
IV. Power Control Process
  IV.1. Power Control Overview
  IV.2. Impulse Radio Performance Measurements
  IV.2.a. Signal Strength Measurements
  IV.2.b. Noise Measurement
  IV.2.c. Bit Error Rate (BER)
  IV.2.d. Performance Measurement Summary
  IV.3. Impulse Radio Power Control
  IV.3.a. Calculate Power Control Update
    i. Using Signal Strength Measurements
    ii. Using SNR Measurements
    iii. Using BER Measurements
      (1) BER and Signal Strength
      (2) BER and SNR
  IV.3.a. Calculate power Control Update Using Measurements of a Signal Transmitted by another Transceiver
  IV.4. Transceiver Power Control
  IV.4.a. Integration Power Control
  IV.4.b. Gain Expansion Power Control
  IV.4.c. Power Control In Combination With Variable Data Rate
V. CONCLUSION I. Impulse Radio Basics This section is directed to technology basics and provides the reader with an introduction to impulse radio concepts, as well as other relevant aspects of communications theory. This section includes subsections relating to waveforms, pulse trains, coding for energy smoothing and channelization, modulation, reception and demodulation, interference resistance, processing gain, capacity, multipath and propagation, distance measurement, and qualitative and quantitative characteristics of these concepts. It should be understood that this section is provided to assist the reader with understanding the present invention, and should not be used to limit the scope of the present invention.

Impulse radio refers to a radio system based on short, low duty cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Most waveforms with enough bandwidth approximate a Gaussian shape to a useful degree.

Impulse radio can use many types of modulation, including AM, time shift (also referred to as pulse position) and M-ary versions. The time shift method has simplicity and power output advantages that make it desirable. In this document, the time shift method is used as an illustrative example.

In impulse radio communications, the pulse-to-pulse interval can be varied on a pulse-by-pulse basis by two components: an information component and a pseudo-random code component. Generally, conventional spread spectrum systems make use of pseudo-random codes to spread the normally narrow band information signal over a relatively wide band of frequencies. A conventional spread spectrum receiver correlates these signals to retrieve the original information signal. Unlike conventional spread spectrum systems, the pseudo-random code for impulse radio communications is not necessary for energy spreading because the monocycle pulses themselves have an inherently wide bandwidth. Instead, the pseudo-random code is used for channelization, energy smoothing in the frequency domain, resistance to interference, and reducing the interference potential to nearby receivers.

The impulse radio receiver is typically a direct conversion receiver with a cross correlator front end in which the front end coherently converts an electromagnetic pulse train of monocycle pulses to a baseband signal in a single stage. The baseband signal is the basic information signal for the impulse radio communications system. It is often found desirable to include a subcarrier with the baseband signal to help reduce the effects of amplifier drift and low frequency noise. The subcarrier that is typically implemented alternatively reverses modulation according to a known pattern at a rate faster than the data rate. This same pattern is used to reverse the process and restore the original data pattern just before detection. This method permits alternating current (AC) coupling of stages, or equivalent signal processing to eliminate direct current (DC) drift and errors from the detection process. This method is described in detail in U.S. Pat. No. 5,677,927 to Fullerton et al.

In impulse radio communications utilizing time shift modulation, each data bit typically time position modulates many pulses of the periodic timing signal. This yields a modulated, coded timing signal that comprises a train of identically shaped pulses for each single data bit. The impulse radio receiver integrates multiple pulses to recover the transmitted information.

I.1. Waveforms

Impulse radio refers to a radio system based on short, low duty cycle pulses. In the widest bandwidth embodiment, the resulting waveform approaches one cycle per pulse at the center frequency. In more narrow band embodiments, each pulse consists of a burst of cycles usually with some spectral shaping to control the bandwidth to meet desired properties such as out of band emissions or in-band spectral flatness, or time domain peak power or burst off time attenuation.

For system analysis purposes, it is convenient to model the desired waveform in an ideal sense to provide insight into the optimum behavior for detail design guidance. One such waveform model that has been useful is the Gaussian monocycle as shown in FIG. 1A. This waveform is representative of the transmitted pulse produced by a step function into an ultra-wideband antenna. The basic equation normalized to a peak value of 1 is as follows:

$$f_{mono}(t) = \sqrt{e}\left(\frac{t}{\sigma}\right)e^{\frac{-t^2}{2\sigma^2}}$$

Where,
ρ is a time scaling parameter,
t is time,
$f_{mono}(t)$ is the waveform voltage, and
e is the natural logarithm base.

Figure 1A:
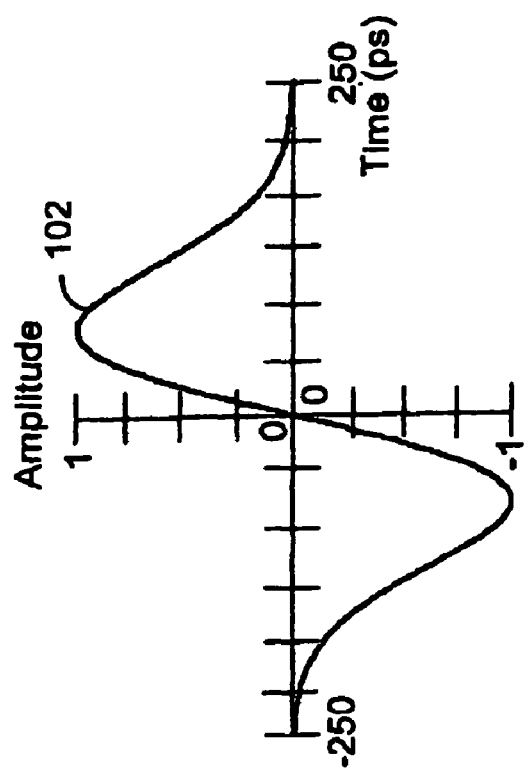
FIG. 1A illustrates a representative Gaussian Monocycle waveform in the time domain.

The frequency domain spectrum of the above waveform is shown in FIG. 1B. The corresponding equation is:

$$F_{mono}(f) = (2\pi)^{\frac{3}{2}}\sigma f e^{-2(\pi\sigma f)^2}$$

The center frequency ($f_c$), or frequency of peak spectral density:

$$f_c = \frac{1}{2\pi\sigma}$$

These pulses, or bursts of cycles, may be produced by methods described in the patents referenced above or by other methods that are known to one of ordinary skill in the art. Any practical implementation will deviate from the ideal mathematical model by some amount. In fact, this deviation from ideal may be substantial and yet yield a system with acceptable performance. This is especially true for microwave implementations, where precise waveform shaping is difficult to achieve. These mathematical models are provided as an aid to describing ideal operation and are not intended to limit the invention. In fact, any burst of cycles that adequately fills a given bandwidth and has an adequate on-off attenuation ratio for a given application will serve the purpose of this invention.

I.2. A Pulse Train

Impulse radio systems can deliver one or more data bits per pulse; however, impulse radio systems more typically use pulse trains, not single pulses, for each data bit. As described in detail in the following example system, the impulse radio transmitter produces and outputs a train of pulses for each bit of information.

Figure 2B:
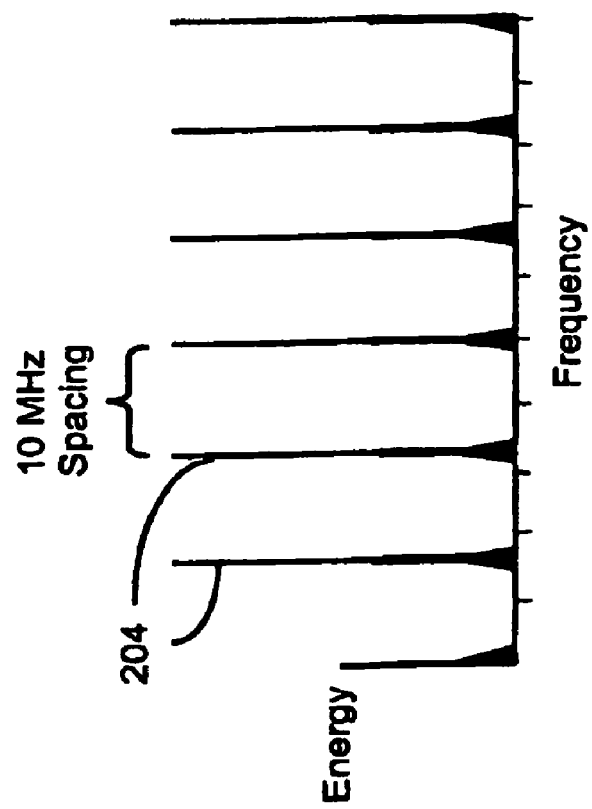
FIG. 2B illustrates the frequency domain amplitude of the waveform of FIG. 2A.
Figure 2A:
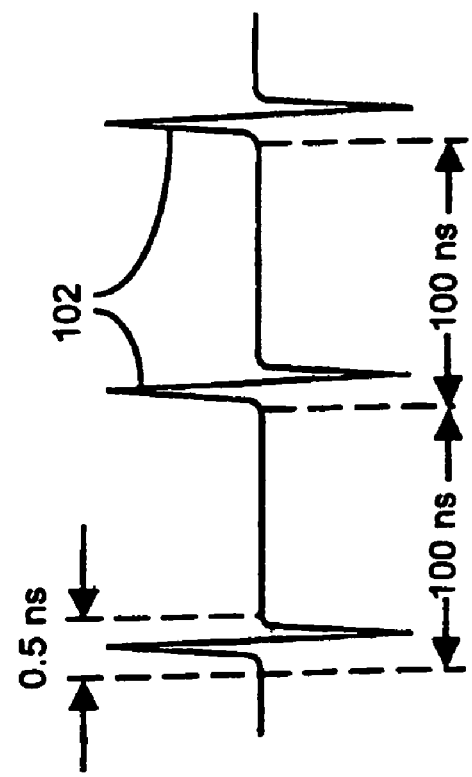
FIG. 2A illustrates a pulse train comprising pulses as in FIG. 1A.

Prototypes built by the inventors have pulse repetition frequencies including 0.7 and 10 megapulses per second (Mpps, where each megapulse is $10^6$ pulses). FIGS. 2A and 2B are illustrations of the output of a typical 10 Mpps system with uncoded, unmodulated, 0.5 nanosecond (ns) pulses 102. FIG. 2A shows a time domain representation of this sequence of pulses 102. FIG. 2B, which shows 60 MHZ at the center of the spectrum for the waveform of FIG. 2A, illustrates that the result of the pulse train in the frequency domain is to produce a spectrum comprising a set of lines 204 spaced at the frequency of the 10 Mpps pulse repetition rate. When the full spectrum is shown, the envelope of the line spectrum follows the curve of the single pulse spectrum 104 of FIG. 1B. For this simple uncoded case, the power of the pulse train is spread among roughly two hundred comb lines. Each comb line thus has a small fraction of the total power and presents much less of an interference problem to receiver sharing the band.

It can also be observed from FIG. 2A that impulse radio systems typically have very low average duty cycles resulting in average power significantly lower than peak power. The duty cycles of the signal in the present example is 0.5% based on a 0.5 ns pulse in a 100 ns interval.

I.3. Coding for Energy Smoothing and Channelization

For high pulse rate systems, it may be necessary to more finely spread the spectrum than is achieved by producing comb lines. This may be done by pseudo-randomly positioning each pulse relative to its nominal position.

Figure 3:
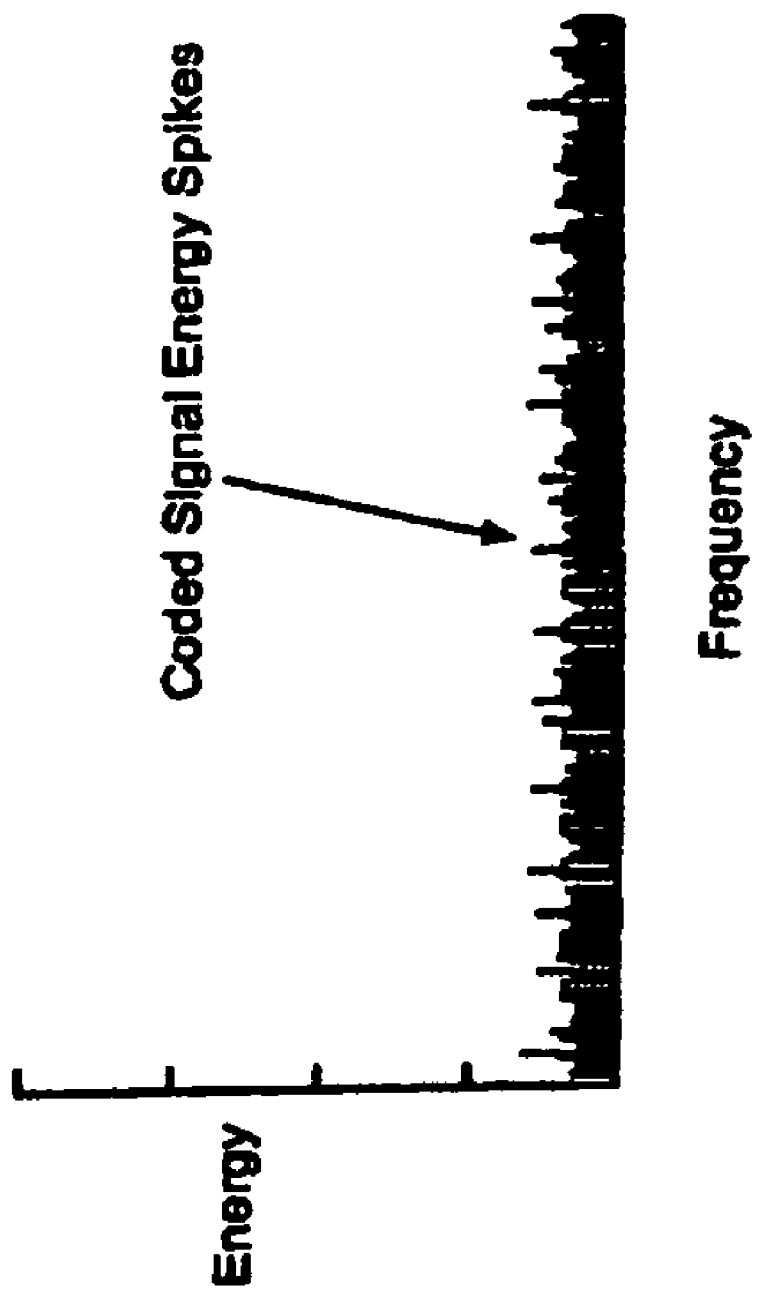
FIG. 3 illustrates the frequency domain amplitude of a sequence of time coded pulses.

FIG. 3 is a plot illustrating the impact of a pseudo-noise (PN) code dither on energy distribution in the frequency domain (A pseudo-noise, or PN code is a set of time positions defining the pseudo-random positioning for each pulse in a sequence of pulses). FIG. 3, when compared to FIG. 2B, shows that the impact of using a PN code is to destroy the comb line structure and spread the energy more uniformly. This structure typically has slight variations which are characteristic of the specific code used.

The PN code also provides a method of establishing independent communication channels using impulse radio. PN codes can be designed to have low cross correlation such that a pulse train using one code will seldom collide on more than one or two pulse positions with a pulses train using another code during any one data bit time. Since a data bit may comprise hundreds of pulses, this represents a substantially attenuation of the unwanted channel.

I.4. Modulation

Any aspect of the waveform can be modulated to convey information. Amplitude modulation, phase modulation, frequency modulation, time shift modulation and M-ary versions of these have been proposed. Both analog and digital forms have been implemented. Of these, digital time shift modulation has been demonstrated to have various advantages and can be easily implemented using a correlation receiver architecture.

Digital time shift modulation can be implemented by shifting the coded time position by an additional amount (that is, in addition to PN code dither) in response to the information signal. This amount is typically very small relative to the PN code shift. In a 10 Mpps system with a center frequency of 2 GHz, for example, the PN code may command pulse position variations over a range of 100 ns; whereas, the information modulation may only deviate the pulse position by 150 ps.

Thus, in a pulse train of n pulses, each pulse is delayed a different amount from its respective time base clock position by an individual code delay amount plus a modulation amount, where n is the number of pulses associated with a given data symbol digital bit.

Modulation further smooths the spectrum, minimizing structure in the resulting spectrum.

I.5. Reception and Demodulation

Clearly, if there were a large number of impulse radio users within a confined area, there might be mutual interference. Further, while the PN coding minimizes that interference, as the number of users rises, the probability of an individual pulse from one use's sequence being received simultaneously with a pulse from another user's sequence increases. Impulse radios are able to perform in these environments, in part, because they do not depend on receiving every pulse. The impulse radio receiver performs a correlating, synchronous receiving function (at the RF level) that uses a statistical sampling and combining of many pulses to recover the transmitted information.

Impulse radio receives typically integrate from 1 to 1000 or more pulses to yield the demodulated output. The optimal number of pulses over which the receiver integrates is dependent on a number of variables, including pulse rate, bit rate, interference levels, and range.

I.6. Interference Resistance

Besides channelization and energy smoothing, the PN coding also makes impulse radios highly resistant to interference from all radio communications systems, including other impulse radio transmitters. This is critical as any other signals within the band occupied by an impulse signal potentially interfere with the impulse radio. Since there are currently no unallocated bands available for impulse systems, they must share spectrum with other conventional radio systems without being adversely affected. The PN code helps impulse systems discriminate between the intended impulse transmission and interfering transmissions from others.

Figure 4:
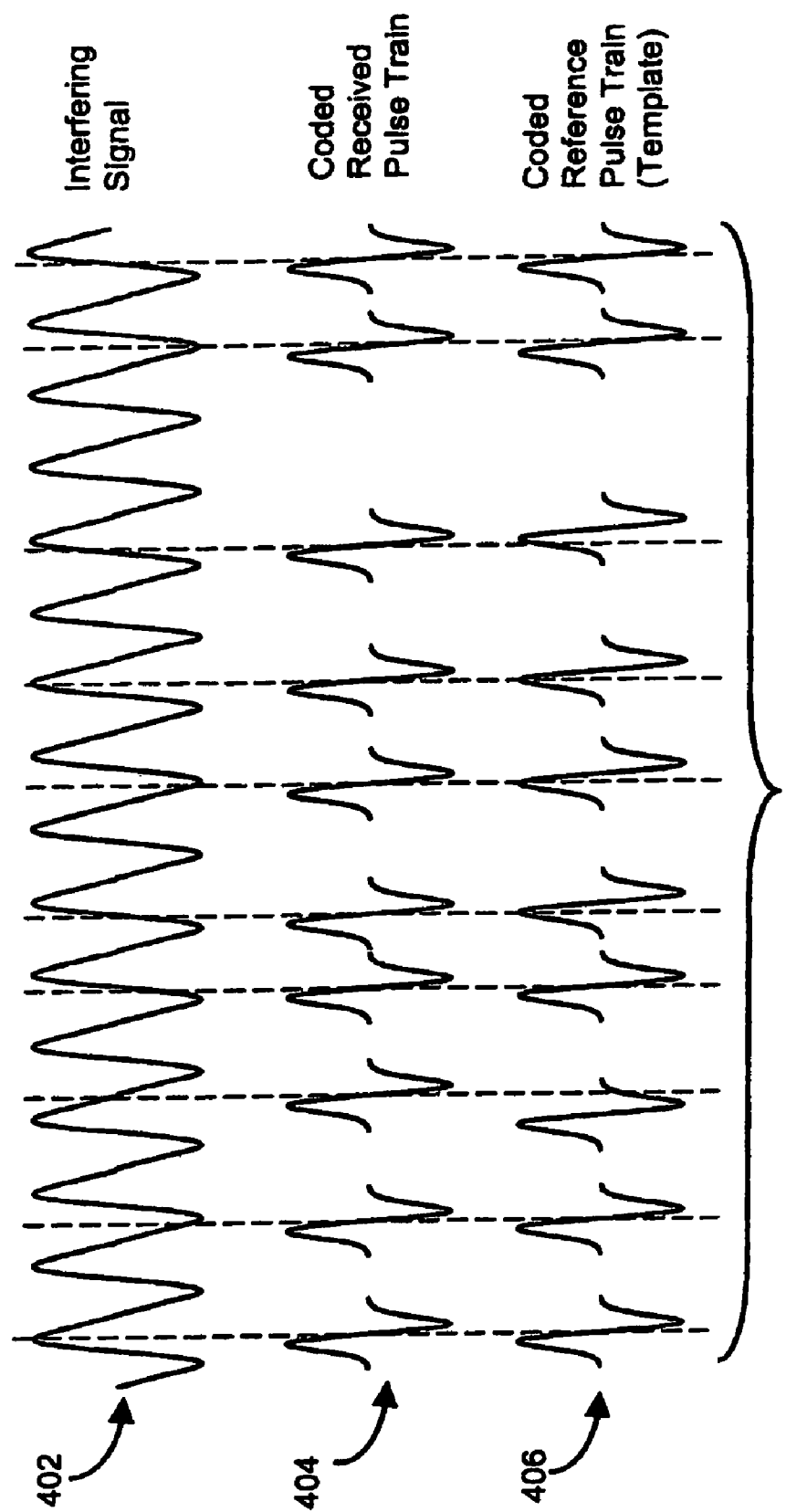
FIG. 4 illustrates a typical received signal and interference signal.

FIG. 4 illustrates the result of a narrow band sinusoidal interference signal 402 overlaying an impulse radio signal 404. At the impulse radio receiver, that input to the cross correlation would include the narrow band signal 402, as well as the received ultrawide-band-impulse radio signal 404. The input is sampled by the cross correlator with a PN dithered template signal 406. Without PN coding, the cross correlation would sample the interfering signal 402 with such regularity that the interfering signals could cause significant interference to the impulse radio receiver. However, when the transmitted impulse signal is encoded with the PN code dither (and the impulse radio receiver template signal 406 is synchronized with the identical PN code dither) the correlation samples the interfering signals pseudo-randomly. The samples from the interfering signal add incoherently, increasing roughly according to square root of the number of samples integrated; whereas, the impulse radio samples add coherently, increasing directly according to the number of samples integrated. Thus, integrating over many pulses overcomes the impact of interference.

I.7. Processing Gain

Impulse radio is resistant to interference because of its large processing gain. For typical spread spectrum systems, the definition of processing gain, which quantifies the decrease in channel interference when wide-band communications are used, is the ratio of the bandwidth of the channel to the bit rate of the information signal. For example, a direct sequence spread spectrum system with a 10 kHz information bandwidth and a 10 MHZ channel bandwidth yields a processing gain of 1000 or 30 dB. However, far greater processing gains are achieved with impulse radio systems, where for the same 10 KHz information bandwidth is spread across a much greater 2 GHz channel bandwidth, the theoretical processing gain is 200,000 or 53 dB.

I.8. Capacity

It has been shown theoretically, using signal to noise arguments, that thousands of simultaneous voice channels are available to an impulse radio system as a result of the exceptional processing gain, which is due to the exceptionally wide spreading bandwidth.

For a simplistic user distribution, with N interfering uses of equal power equidistant from the receiver, the total inference signal to noise ratio as a result of these other users can be described by the following equation:

$$V^2{tot} = \frac{N\sigma^2}{\sqrt{Z}}$$

Where $V^2_{tot}$ is the total interference signal to noise ratio variance, at the receiver;

N is the number of interfering users;

$\rho^2$ is the signal to noise ratio variance resulting from one of the interfering signals with a single pulse cross correlation; and Z is the number of pulses over which the receiver integrates to recover the modulation.

This relationship suggests that link quality degrades gradually as the number of simultaneous users increases. It also shows the advantage of integration gain. The number of users that can be supported at the same interference level increases by the square root of the number of pulses integrated.

I.9. Multipath and Propagation

One of the striking advantages of impulse radio is its resistance to multipath fading effects. Conventional narrow band systems are subject to multipath through the Rayleigh fading process, where the signals from many delayed reflections combine at the receiver antenna according to their relative phase. This results in possible summation or possible cancellation, depending on the specific propagation to a given location. This also results in potentially wild signal strength fluctuations in mobile applications, where the mix of multipath signals changes for every few feet of travel.

Impulse radios, however, are substantially resistant to these effects. Impulses arriving from delayed multipath reflections typically arrive outside of the correlation time and thus are ignored. This process is described in detail with reference to FIGS. 5A and 5B. In FIG. 5A, three propagation paths are shown. The direct path is the shortest. It represents the straight line distance between the transmitter and the receiver. Path 1 represents a grazing multipath reflection, which is very close to the direct path. Path 2 represents a distant multipath reflection. Also shown are elliptical (or, in space, ellipsoidal) traces that represent other possible locations for reflections with the same time delay.

FIG. 5B represents a time domain plot of the received waveform from this multipath propagation configuration. This figure comprises three doublet pulses as shown in FIG. 1A. The direct path signal is the reference signal and represents the shortest propagation time. The path 1 signal is delayed slightly and actually overlaps and enhances the signal strength at this delay value. Note that the reflected waves are reversed in polarity. The path 2 signal is delayed sufficiently that the waveform is completely separated from the direct path signal. If the correlator template signal is positioned at the direct path signal, the path 2 signal will produce no response. It can be seen that only the multipath signals resulting from very close reflectors have any effect. The bulk of the multipath signals, which are substantially delayed, are removed from the correlation process and are ignored.

The multipath signals delayed less than one quarter wave (one quarter wave is about 1.5 inches, or 3.5 cm at 2 GHz center frequency) are the only signals that will attenuate the direct path signal. This is the reflection from the first Fresnel zone, and this property is shared with narrow band signals; however, impulse radio is highly resistant to all other Fresnel zone reflections. The ability to avoid the highly variable attenuation from multipath gives impulse radio significant performance advantages.

I.10. Distance Measurement

Impulse systems can measure distances to extremely fine resolution because of the absence of ambiguous cycles in the waveform. Narrow band systems, on the other hand, are limited to the modulation envelope and cannot easily distinguish precisely which RF cycle is associated with each data bit because the cycle-to-cycle amplitude differences are so small they are masked by link or system noise. Since the impulse radio waveform has no multi-cycle ambiguity, this allows positive determination of the waveform position to less than a wavelength-potentially, down to the noise floor of the system. This time position measurement can be used to measure propagation delay to determine link distance, and once link distance is known, to transfer a time reference to an equivalently high degree of precision. The inventors of the present invention have built systems that have shown the potential for centimeter distance resolution, which is equivalent to about 30 ps of time transfer resolution. See, for example, commonly owned, co-pending application 09/045,929, filed Mar. 23, 1998, tiled "Ultrawide-Band Position Determination System and Method", and 09/083,993, filed May 26, 1998, titled "System and Method for Distance Measurement by Inphase and Quadrature Signals in a Radio System", both of which are incorporated herein by reference.

II. Exemplary Transceiver Implementation

II.1. Transmitter

An exemplary embodiment of an impulse radio transmitter 602 of an impulse radio communication system having one subcarrier channel will now be described with reference to FIG. 6.

The transmitter 602 comprises a time base 604 that generates a periodic timing signal 606. The time base 604 typically comprises a voltage controlled oscillator (VCO), or the like, having a high timing accuracy and low jitter, on the order of picoseconds (ps). The voltage control to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614 together with an internally generated subcarrier signal (which is optional) and an information signal 616 to generate a modulated, coded timing signal 618.

The code source 612 comprises a storage device such as a random access memory (RAM), read only memory (ROM), or the like, for storing suitable PN codes and for outputting the PN codes as a code signal 614. Alternatively, maximum length shift registers or other computational means can be used to generate the PN codes.

An information source 620 supplies the information signal 616 to the precision timing generator 608. The information signal 616 can be any type of intelligence, including digital bits representing voice, data, imagery, or the like, analog signals, or complex signals.

A pulse generator 622 uses the modulated, coded timing signal 618 as a trigger to generate output pulses. The output pulses are sent to a transmit antenna 624 via a transmission line 626 coupled thereto. The output pulses are converted into propagating electromagnetic pulses by the transmit antenna 624. In the present embodiment, the electromagnetic pulses are called the emitted signal, and propagate to an impulse radio receiver 702, such as shown in FIG. 7, through a propagation medium, such as air, in a radio frequency embodiment. In a preferred embodiment, the emitted signal is wide-band or ultrawide-band, approaching a monocycle pulse as in FIG. 1A. However, the emitted signal can be spectrally modified by filtering of the pulses. This bandpass filtering will cause each monocycle pulse to have more zero crossings (more cycles) in the time domain. In this case, the impulse radio receiver can use a similar waveform as the template signal in the cross correlator for efficient conversion.

II.2. Receiver

An exemplary embodiment of an impulse radio receiver (hereinafter called the receiver) for the impulse radio communication system is now described with reference to FIG. 7.

The receiver 702 comprises a receive antenna 702 for receiving a propagated impulse radio signal 706. A receiver signal 708 is input to a cross correlator or sampler 710 via a receiver transmission line, coupled to the receive antenna 704, and producing a baseband output 712.

The receiver 702 also includes a precision timing generator 714, which receives a periodic timing signal 716 from a receiver time base 718. This time base 718 is adjustable and controllable in time, frequency, or phase, as required by the lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter to generate the propagated signal. Thus, the timing of the template pulse train matches the timing of the received signal pulse train, allowing the received signal 708 to be synchronously sampled in the correlator 710. The correlator 710 ideally comprises a multiplier followed by a short term integrator to sum the multiplier product over the pulse interval.

The output of the correlator 710 is coupled to a subcarrier demodulator 732, which demodulates the subcarrier information signal from the subcarrier. The purpose of the optional subcarrier process, when used, is to move the information signal away from DC (zero frequency) to improve immunity to low frequency noise and offsets. The output of the subcarrier demodulator is then filtered or integrated in the pulse summation stage 734. A digital system embodiment is shown in FIG. 7. In this digital system, a sample and hold 736 samples the output 735 of the pulse summation stage 734 synchronously with the completion of the summation of a digital bit or symbol. The output of sample and hold 736 is then compared with an nominal zero (or reference) signal output in a detector stage 738 to determine an output signal 739 representing the digital state of the output voltage of sample and hold 736.

The baseband signal 712 is also input to a lowpass filter 742 (also referred to as lock loop filter 742). A control loop comprising the lowpass filter 742, time base 718, precision timing generator 714, template generator 728, and correlator 710 is used to generate an error signal 744. The error signal 744 provides adjustments to the adjustable time base 718 to time position the periodic timing signal 726 in relation to the position of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

Figure 8A:
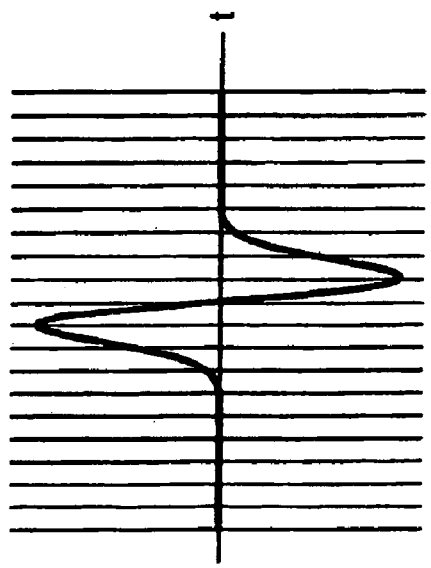
FIG. 8A illustrates a representative received pulse signal at the input to the correlator.
Figure 8B:
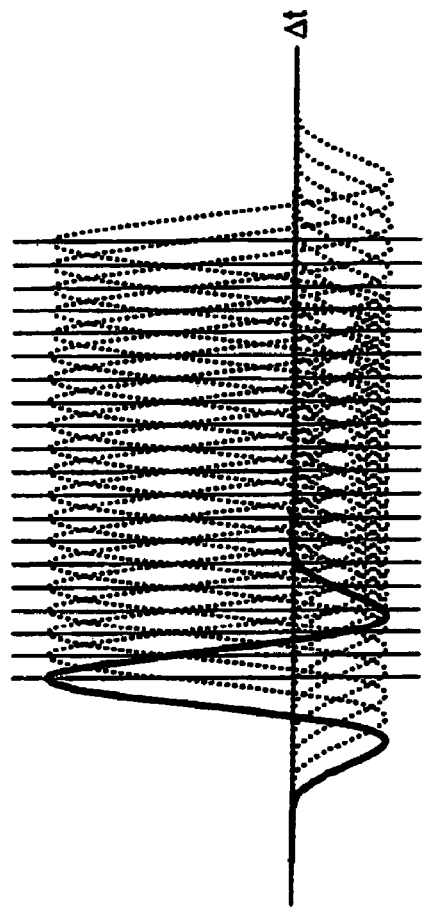
FIG. 8B illustrates a sequence of representative impulse signals in the correlation process.
Figure 8C:
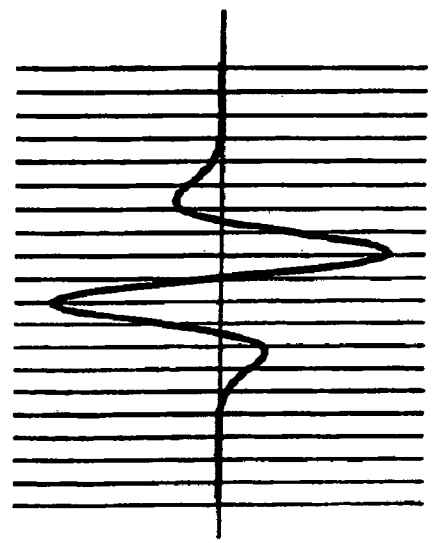
FIG. 8C illustrates the potential locus of results as a function of the various potential template time positions.

FIGS. 8A-8C illustrate the cross correlation process and the correlation function. FIG. 8A shows the waveform of a template signal. FIG. 8B shows the waveform of a received impulse radio signal at a set of several possible time offsets. FIG. 8C represents the output of the correlator (multiplier and short time integrator) for each of the time offsets of FIG. 8B. Thus, this graph does not show a waveform that is a function of time, but rather a function of time-offset. For any given pulse received, there is only one corresponding point which is applicable on this graph. This is the point corresponding to the time offset of the template signal used to receive that pulse. Further examples and details of precision timing can be found described in U.S. Pat. No. 5,677,927, and commonly owned co-pending application Ser. No. 09/146,524, filed Sep. 3, 1998, tilted "Precision Timing Generator system and Method", both of which are incorporated herein by reference.

III. Overview of the Invention

Figure 9:
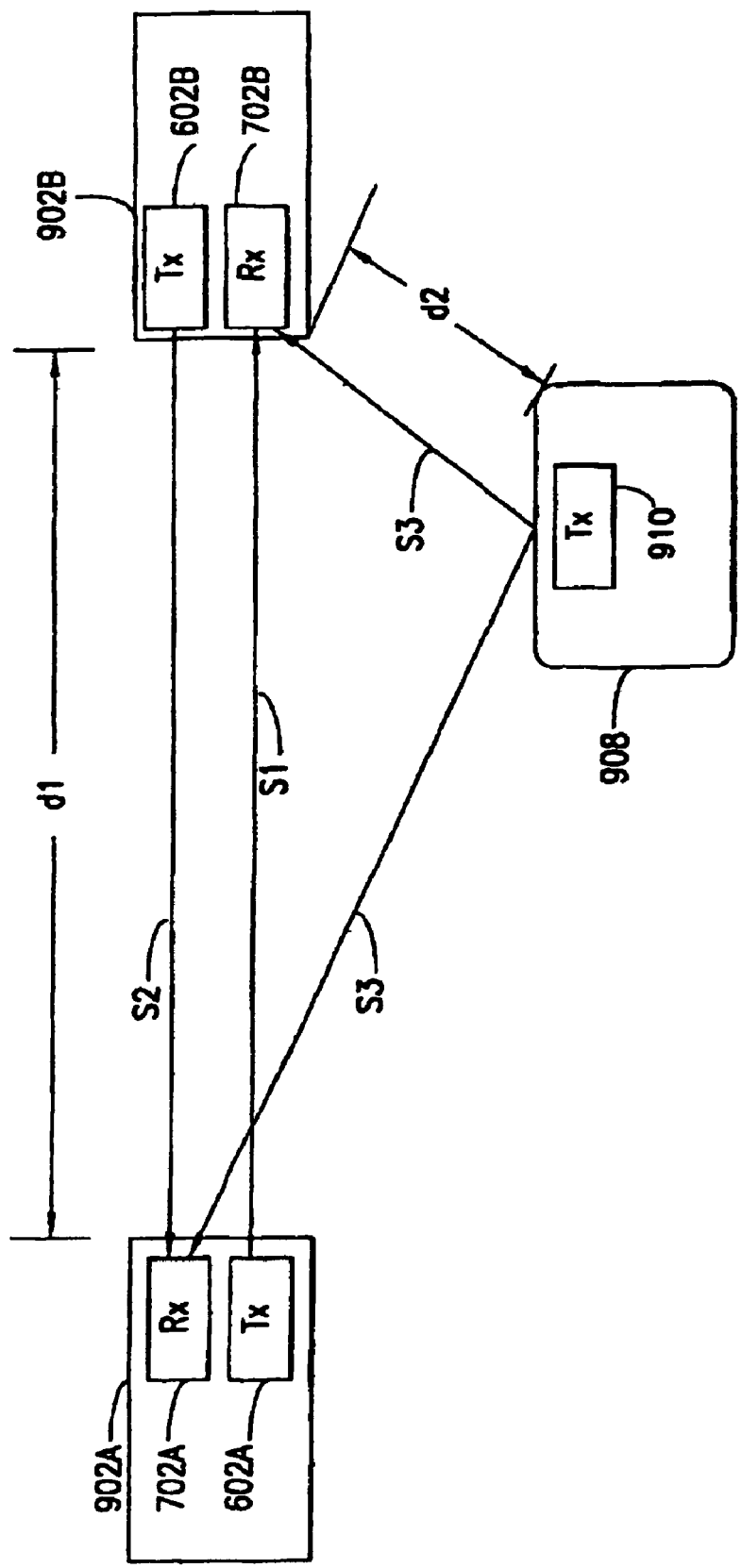
FIG. 9 illustrates an example environment of an impulse radio communication system.

The present invention is directed to a system and method for impulse radio power control. FIG. 9 depicts an example communications environment within which the present invention is used. Two or more impulse radio transceivers 902A, 902B communicate with one another, possibly in the presence of an interfering transmitter 908. Each transceiver 902A, 902B includes an impulse radio receiver 702 and an impulse radio transmitter 602. FIG. 9 depicts two transceivers 902A and 902B, separated by a distance d1. As shown, transmitter 602A transmits a signal S1 that is received by receiver 702B. Transmitter 602B transmits a signal S2 that is received by receiver 702A. Interfering transmitter 908, if present, transmits an interfering signal S3 that is received by both receiver 702A and receiver 702B. Interfering transmitter 908 is situated a distance d2 from transceiver 902B.

The output power of transmitters 602A, 602B is adjusted; according to a preferred embodiment of the present invention, based on a performance measurement(s) of the received signals. In one embodiment, the output power of transmitter 602B is adjusted based on a performance measurement of signal S2 as received by receiver 702A. In an alternative embodiment, the output power of transmitter 602B is adjusted based on a performance measurement of signal S1 received by receiver 702B. In both cases, the output power of transmitter 602B is increased when the performance measurement of the received signal drops below a threshold, and is decreased when the performance measurement rises above, a threshold. Several alternative embodiments are described below for calculating this power control update.

Power control refers to the control of the output power of a transmitter. However, it is noted that this is usually implemented as a voltage control proportional to the output signal voltage.

Different measurements of performance can be used as the basis for calculating a power control update. As discussed in detail below, examples of such performance measurements include signal strength, signal-to-noise ratio (SNR), and bit error rate (BER), used either alone or in combination.

For the sake of the clarity, FIG. 9 depicts two transceiver 902A, 902B in two-way communication with one another. Those skilled in the art will recognize that the principles discussed herein apply equally well to multiple transceivers 902 in communication with each other. Transceiver 902 can represent any transceiver employing impulse radio technology (for examples, see U.S. Pat. No. 5,677,927, incorporated by reference above). Transceiver 902 can be a hand-held unit, or mounted in some fashion, e.g., a transceiver mounted in a base station. For example, referring to FIG. 9, transceiver 902A can represent a hand-held phone communicating a transceiver 902B that is part of a base station. Alternatively, both transceivers 902A and 902B can represent hand-held phones communicating with each other. A plethora of further alternatives are envisioned.

Interfering transmitter 908 includes transmitter 910 that transmits electromagnetic energy in the same or a nearly frequency band as that used by transceivers 902A and 902B, thereby possibly interfering with the communications of transceivers 902A and 902B. Interfering transmitter 908 might also include a receiver, although the receiver function does not impact interference analysis. For example, interfering transmitter 908 could represent an impulse radio communicating with another impulse radio (not shown). Alternatively, interfering transmitter 908 could represent any arbitrary transmitter that transmits electromagnetic energy in some portion of the frequency spectrum used by transceivers 902. Those skilled in the art will recognize that many such transmitters can exist, given the ultra-wideband nature of the signals transmitter by transceivers 902.

For those environments where multiple impulse radios of similar design are operating in close geographic proximity, interference between the impulse radios is minimized by controlling the transmitter power in each transceiver according to the present invention. Consider the example environment depicted in FIG. 9 where interfering transmitter 908 represents an impulse radio transceiver similar in design to transceivers 902A and 902B. Lowering the output power of interfering transmitter 908 reduces the extent to which S3 interferes with the communication between transceivers 902A and 902B. Similarly, lowering the power of transmitters 602A and 602B reduces the extent to which S1 and S2 interfere with the communications of transmitter 908. According to the present invention, each transmitter (602A, 602B, and 910 in those situations where interfering transmitter 908 represents an impulse radio) maintains its output power to achieve a satisfactory signal reception. The present invention is therefore particularly well suited to a crowded impulse radio environment.

IV. Power Control Process

IV.1 Power Control Overview

Generally speaking, impulse radio power control methods utilize a performance measurement indicative of the quality of the communications process where the quality is power dependent. This quality measurement is compared with a quality reference in order to determine a power control update. Various performance measurements can be used, individually or in combination. Each has slightly different characteristics, which can be utilized in different combinations to construct an optimum system for a given application. Specific performance measurements that are discussed below include signal strength, signal to noise ratio (SNR), and bit error rate (BER). These performance measurements are discussed in an idealized embodiment. However, great accuracy is generally not required in the measurement of these values.

Thus, signals approximating these quantities can be substituted as equivalent. Other performance measurements related to these or equivalent to these would be apparent to one skilled in the relevant art. Accordingly, the use of other measurements of performance are within the spirit and scope of the present invention.

Figure 10:
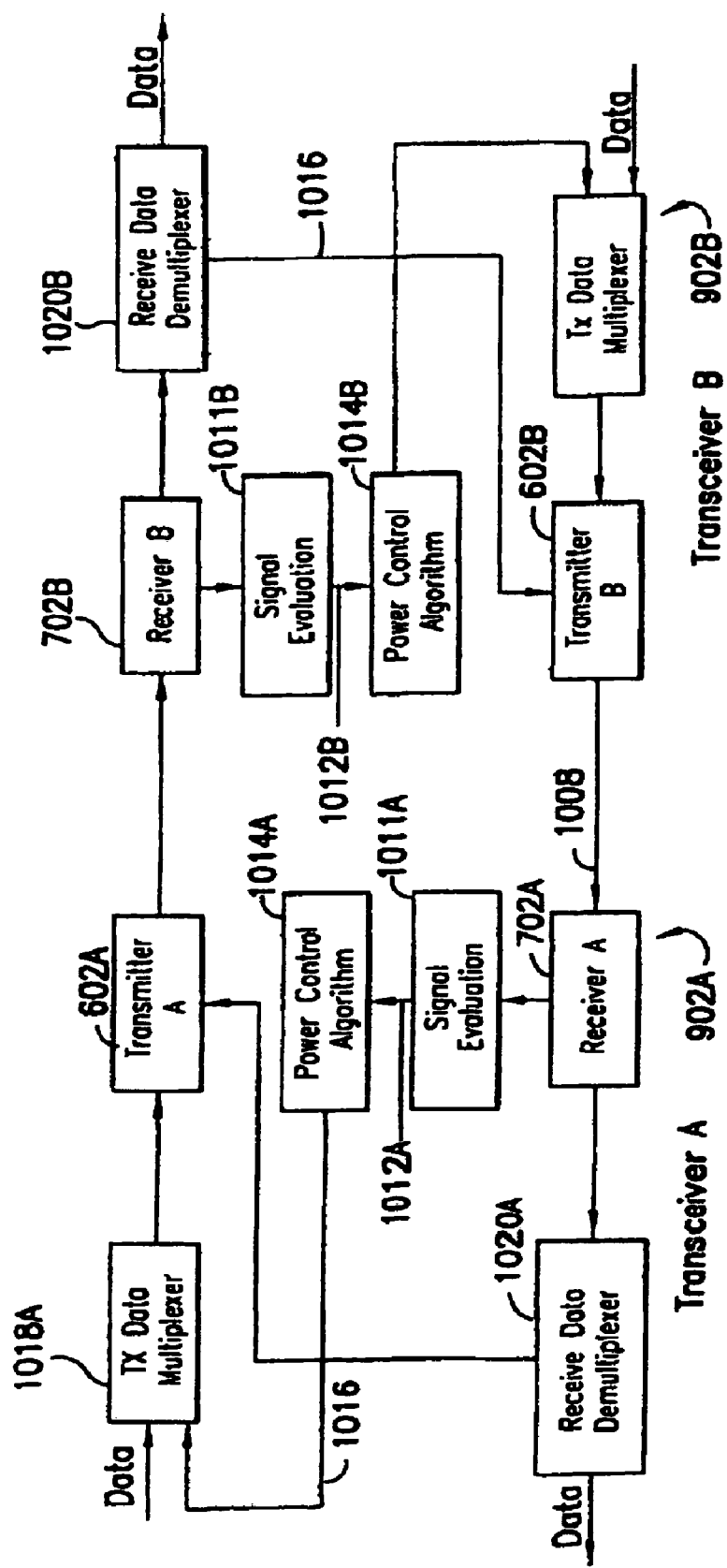
FIG. 10 is an exemplary flow diagram of a two transceiver system employing power control according to one embodiment of the present invention.

FIG. 10 illustrates a typical two transceiver system comprising transceiver 902A and transceiver 902B and utilizing power control according to an embodiment of the present invention. Referring to FIG. 10, receiver 702A receives the transmission 1008 from transmitter 602B of transceiver 902B. Signal evaluation function 1011A evaluates the signal quality, and quality measurement(s) 1012A are provided to the power control algorithm 1014A. Power control algorithm 1014A then determines a power control update 1016 according to the current received signal quality measurement(s) 1012A determined by signal evaluation function 1011A. This update 1016 is added to the signal data stream in the transmitter data multiplexer 1018A and then transmitted via transmitter 602A to transceiver 902B. Receiver 702B of transceiver 902B receives a data stream and demultiplexer 1020B separates the user data and power control command 1016, sending the power control command 1016 to transmitter 602B (or to power control function 1126 as discussed below in connection with FIG. 11). Transmitter 602B (or power control function 1126) then adjusts the transmission output level of signal 1008 according to the power control command, which is based on the received signal quality measurement(s) 1012A determined by transceiver 902A. A similar control loop operates to control transmitter 602A according to the received signal quality measurement(s) 1012B determined by signal evaluation function 1011B of transceiver 902B.

Figure 11:
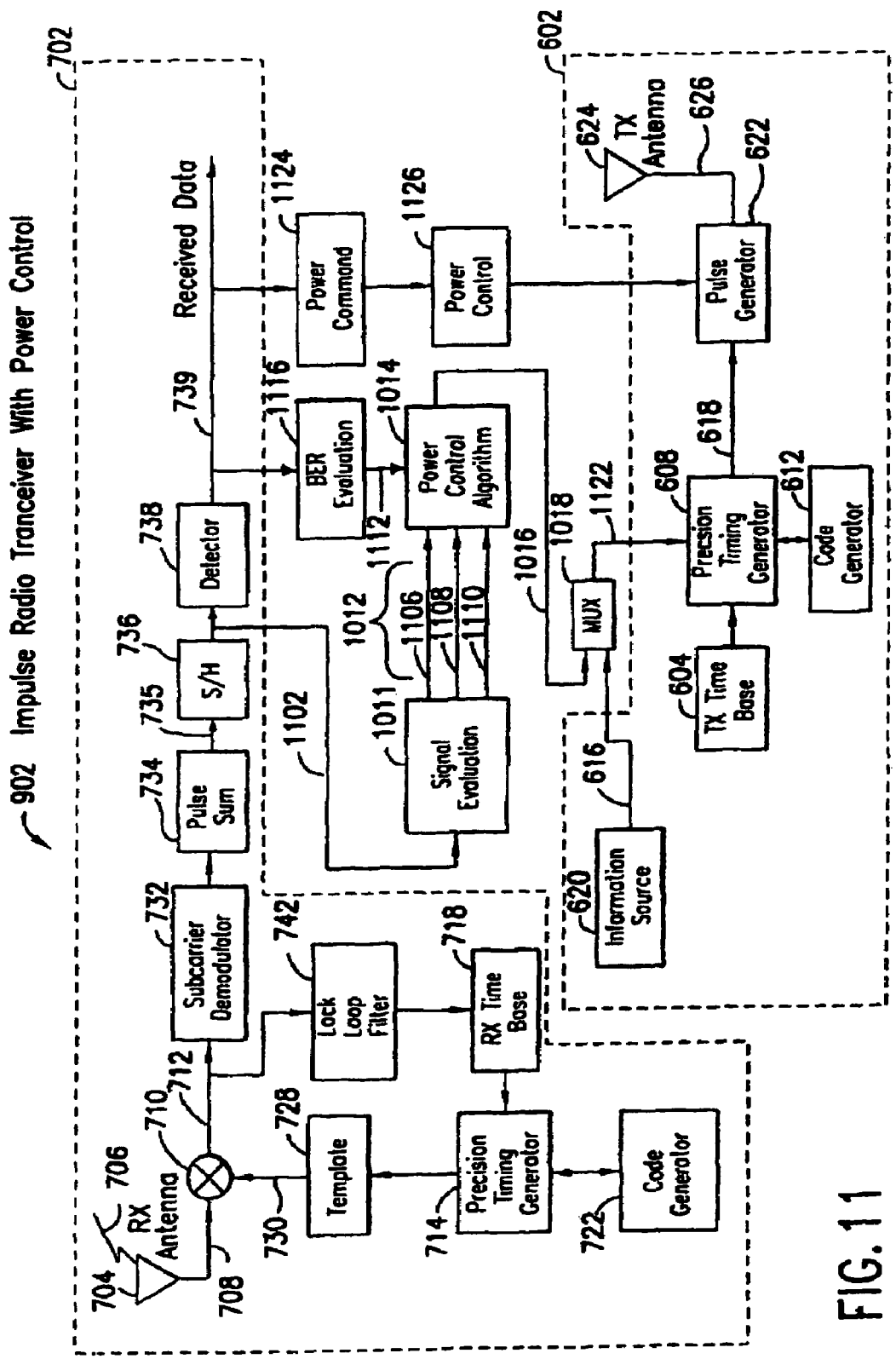
FIG. 11 is an exemplary diagram of an impulse receiver including power control functions according to one embodiment of the present invention.

FIG. 11 illustrates a transceiver 902 modified to measure signal strength, SNR, and BER according to an embodiment of the present invention. According to this embodiment, an originating transmitter transmits the RF signal 706, which is received by the antenna 704. The resulting received signal 708 is then provided to the correlator 710 where it is multiplied according to the template signal 730 and then short term integrated (or alternatively sampled) to produce a baseband output 712. This baseband output is provided to the optional subcarrier demodulator 732, which demodulates a subcarrier as applied to the transmitted signal 706. This output is then long term integrated in the pulse summation stage 734, which is typically an integrate and dump stage that produces a ramp shape output waveform when the receiver 702 is receiving a transmitted signal 706, or is typically a random walk type waveform when receiving pure noise. This output 735 (after it is sampled by sample and hold state 736) is fed to a detector 738 having an output 739, which represents the detection of the logic of the transmitted signal 706.

The output of the correlator 710 is also coupled to a lock loop comprising a lock loop filter 742, an adjustable time base 718, a precision timing generator 714, a template generator 728, and the correlator 710. The lock loop maintains a stable quiescent operating point on the correlation function in the presence of variations in the transmitter time base frequency and variations due to Doppler effects.

The adjustable time base 718 drives the precision timing generator 714, which provides timing to the code generator 722, which in turn, provides timing commands back to the timing generator 714 according to the selected code. The timing generator 714 then provides timing signals to the template generator 728 according to the timing commands, and the template generator 728 generates the proper template waveform 730 for the correlation process. Further examples and discussion of these processes can be found in the patents incorporated by reference above.

It is noted that coding is optional. Accordingly, it should be appreciated that the present invention covers non-coded implementations that do not incorporate code source 722.

Referring again to FIG. 11, the output 735 of the pulse summation stage 734 is sampled by the sample and hold stage 736 producing an output 1102 which is then processed by a signal evaluation stage 1011 the determines a measure of the signal strength 1106, received noise 1108, and SNR 1110. These values are passed to the power control algorithm 1014, which may combine this information with a BER measurement 1112 provided by a BER evaluation function 1116. The power control algorithm 1014 generates a power control update 1016 value according to one or more of the performance measurements. This value is combined with the information signal 616 and sent to the transceiver which is originating the received signal 706. One method of combining this information is to divide the data stream into time division blocks using a multiplexer 1018. A portion of the data stream 1122 contains user data (i.e., information signal 616) and a portion contains control information, which includes power control update information 1016. The combined data stream 1122 is then provided to the transmitter precision timing generator 608, which may optionally include a subcarrier modulation process. This timing generator is driven by a transmitter time base 604 and interfaces with a code generator 612, which provides pulse position commands according to a PN code. The timing generator 608 provides timing signals 618 to the pulse generator 622, which generates pulses 626 of proper amplitude and waveform according to the timing signals 618. These pulses are then transmitted by the antenna 624.

It is noted that BER 1112 is a measure of signal quality that is related to the ratio of error bits to the total number of bits transmitted. The user of other signal quality measurements, which are apparent to one skilled in the relevant art, are within the spirit and scope of the present invention.

It should be apparent to one of ordinary skill in the art that the system functions such as power command 1124 and power control 1126 can be implemented into either the transmitter 602 or receiver 702 of a transceiver, at the convenience of the designer. For example, power control 1126 is shown as being part of transmitter 602 in FIG. 10.

The transceiver originating the RF signal 706 has a similar architecture. thus, the receiver data stream 739 contains both user data and power control commands, which are intended to control the pulse generator 622. These power control commands are selected from the data stream by a power command function 1124, which includes the function of receive data demultiplexer 1020, and delivered to a power control function 1126 that controls the output power of the pulse generator 622.

IV.2. Impulse Radio Performance Measurements

According to the present invention, the output 1102 of the sample and hold sage 736 is evaluated to determine signal performance criteria necessary for calculation of power control updates 1016. The signal performance criteria can include signal strength, noise, SNR and/or BER.

Figure 12:
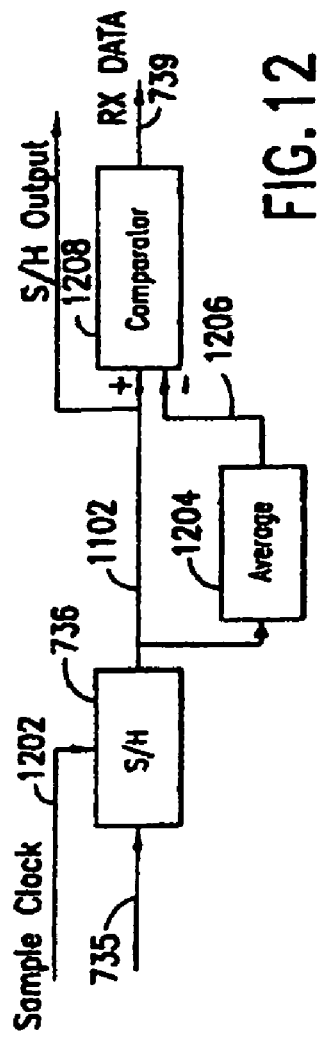
FIG. 12 is a detailed representation of one embodiment of the detection process in FIG. 10.

First, the signal detection process is described in greater detail in accordance with FIG. 12, which describes the workings of the detector 738 of FIGS. 7 and 11. The output 735 of the pulse summation stage 734 is provided to the input of the sample and hold 736, which is clocked by a sample clock signal 1202 at the end of the integration period (pulse summation period) for a data bit. This samples the final voltage level, which represents the integration result, and holds it until the integration of the next data bit is complete. The output 1102 of this sample and hold 736, is supplied to an averaging function 1204, which determines the average value 1206 of this signal 1102. This average function 1204 may be a running average, a single pole low pass filter, a simple RC filter (a filter including a resistor(s) and capacitor(s)), or any number of equivalent averaging functions as would be known by one of ordinary skill in the art. This average value 1206 represents the DC (direct current) value of the output 1102 of sample and hold 736 and is used as the reference for comparator 1208 in the determination of the digital value of the instant signal which is output as Received Data 739. The advantage of averaging function 1204 is to eliminate DC offsets in the circuits leading up to sample and hold 736. This function, however, depends on a relatively equal number of ones and zeroes in the data stream. An alternative method is to evaluate the average only when no signal is in lock, as evidenced by low signal strength, and then to hold this value when a signal is in lock. This will be discussed later in detail with reference to FIG. 17. This depends on the assumption that the DC offset will be stable over the period of the transmission. A further alternative is to build low offset circuits such that a fixed value, e.g. zero, may be substituted for the average. This is potentially more expensive, but has no signal dependencies. A fourth alternative is to split the difference between the average voltage detected as a data "one" and the average voltage detected as a data "zero" to determine a reference value for bit comparison. This difference is available from a signal strength measurement process, which is now described in greater detail in the discussion of FIG. 13.

IV.2.a Signal strength Measurement

Figure 13:
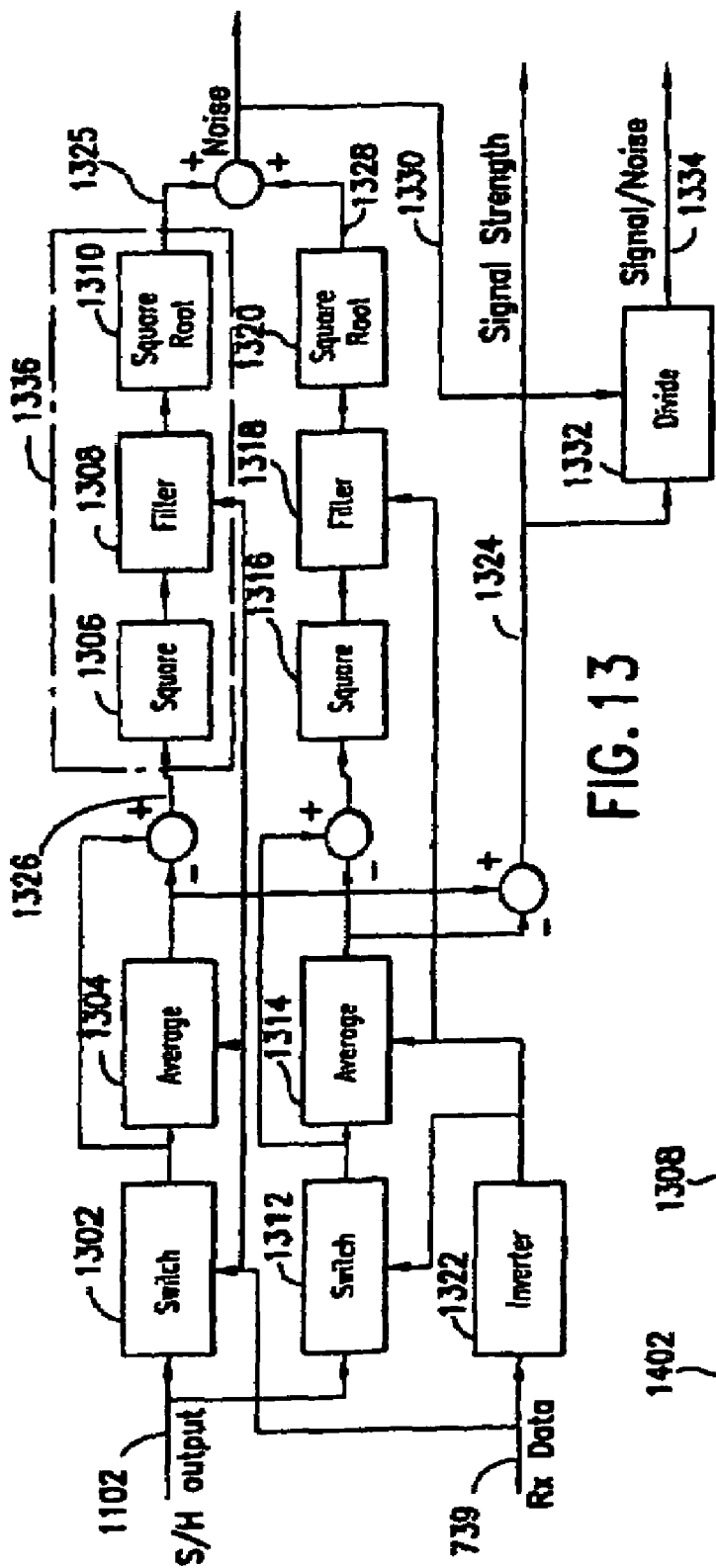
FIG. 13 is a detailed block diagram of one embodiment of the signal evaluation process in FIG. 11.

FIG. 13 illustrates the details of the signal evaluation function 1011 of FIG. 11. This function determines signal strength by measuring the difference between the average voltage associated with a digital "one" and the average voltage associated with a digital "zero". Noise is determined by measuring the variation of these signals, and "signal to noise" is determined by finding the ratio between the signal strength and the noise.

The process for finding signal strength will now be described with reference to FIG. 13, which includes two signal paths, each for determining the average characteristics of the output voltage associated with a detected digital "one" or "zero" respectively. The upper path comprising switch 1302, average function 1304, square function 1306, filter 1308, and square root function 1310 operates when the receive data detects a digital "one." The lower path, comprising switch 1312, average function 1314, square function 1316, filter 1318, and square root function 1320 operates when the receive data detects a digital "zero" according to inverter 1322. It would be appreciated by one skilled in the art that multiple such paths may be implemented corresponding to multiple states of modulation, should such multiple states be implemented in the particular transceiver system. It should also be noted that a single path might be sufficient for many applications, resulting in possible cost savings with potentially some performance degradation.

More specifically, the output 1102 of the sample and hold 736 is fed to either average function 1304 or average function 1314, according to the receive data 739 and inverter 1322, which determines whether the instant signal summation (i.e., the instant of receive data 739) is detected as a "one" or a "zero". If the signal is detected as a digital "one", switch 1302 is closed and average function 1304 receives this signal, while average function 1314 receives no signal and holds its value. If the signal is detected as a digital "zero", switch 1312 is closed and average function 1314 receives this signal, while average function 1304 receives no signal and holds its value.

Average functions 1304 and 1314 determine the average value of their respective inputs over the number of input samples when their respective switch is closed. This is not strictly an averaging over time, but an average over the number of input samples. Thus, if there are more ones than zeroes in a given time interval, the average for the ones would reflect the sum of the voltage values for the one over that interval divided by the number of ones detected in that interval rather than simply dividing by the length of the interval or number of total samples in the interval. Again this average may be performed by running average, or filter elements modified to be responsive to the number of samples rather than time. Whereas, the average over the number of samples represents the best mode in that it corrects for an imbalance between the number of ones and zeroes, a sample average over time or filter over time may be adequate for many applications. It should also be noted that a number of averaging functions including, but not limited to, running average, boxcar average, low pass filter, and others can be used or easily adapted to be used in a manner similar to the examples by one or ordinary skill in the art.

It should also be appreciated that a simple average based strictly on digital "ones" or "zeroes", rather than the composite that includes both "ones" and "zeroes", can be evaluated with a slight loss of performance to the degree that the average voltage associated with "ones" or the average voltage associated with "zeros" are not symmetrical.

The outputs of averaging functions 1304 and 1314 are combined to achieve a signal strength measurement 1324. In the embodiment illustrated, the voltage associated with digital "one" is positive, and the voltage associated with digital zero is negative, thus the subtraction indicated in the diagram, is equivalent to a summation of the two absolute values of the voltages, It should also be noted that this summation is equal to twice the average of these two values. A divide by two at this point would be important only in a definitional sense as this factor will be accommodated by the total loop gain in the power control system.

The purpose of square functions 1306 and 1316, filters 1308 and 1318, and square root functions 1310, 1320 shall be described below in the following section relating to noise measurements.

IV.2.b Noise Measurement

Figure 15:
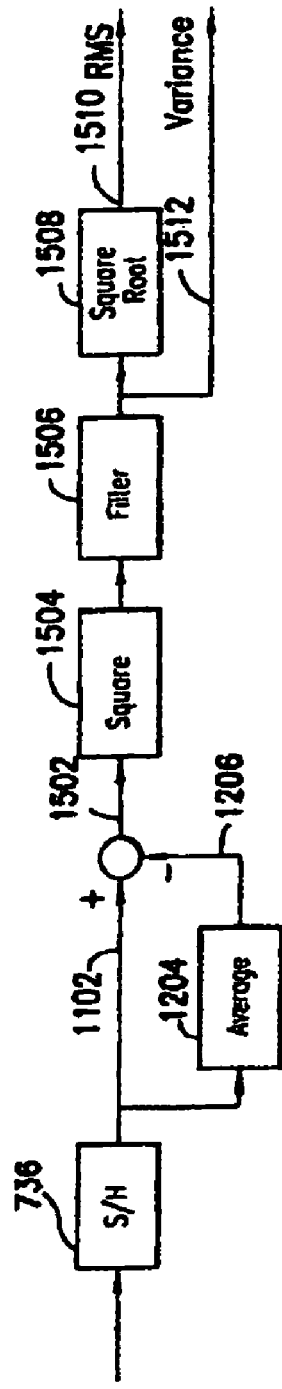
FIG. 15 is a detailed block diagram of one embodiment of the signal evaluation process in FIG. 11.

FIG. 15 and 13 illustrate a noise measurement process in accordance with an embodiment of the present invention. This noise measurement process is contained within the signal evaluation function 1011 of FIG. 11. The noise measurement is combined with the signal strength measurement to derive a signal to noise measurement 1110. There are two modes that must be considered when determining the noise value.

The first mode is now described with reference to FIG. 15. This mode is used before a signal is in lock. In this situation, the pulse summation function is not generating ramps because there is no coherent signal being received. To measure noise in this mode, the samples from sample and hold 736 are evaluated for statistical standard deviation, i.e. the RMS (root mean square) AC (alternating current) voltage. This value is then averaged by an average function to provide a stable measure of the noise. The averaged value can then be used as an initial value for the noise after a signal is captured and locked.

More specifically, referring to FIG. 15, the output 1102 of sample and hold 736 is averaged in the average function 12034 to remove any DC offset that may be associated with the signal. The output of average function 1204 is then subtracted from the sample and hold output producing a zero mean signal 1502. The zero mean signal 1502 is then squared by square function 1504 and filtered by filter 1506. This result (the output of filter 1506) represents the variance 1512 of the noise. A square root function 1508 is also applied, resulting in the RMS value 1510 of the noise.

Figure 16:
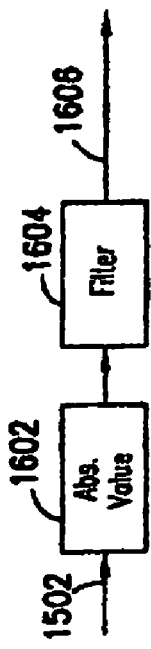
FIG. 16 illustrates an alternate processing method for FIG. 15.

FIG. 16 illustrates an alternate processing method which may afford some implementation economies. Referring to FIG. 16, the zero mean signal 1502 is provided to an absolute value function 1602 which is then filtered by filter 1604, resulting in an output 1606 that may be used in place of the RMS value 1510.

The second mode to be considered occurs when the receiver is locked to a received signal. In this mode, the pulse summation function is generating a generally ramp shaped time function signal due to the coherent detection of modulated data "ones" and "zeroes". In this mode the desired noise value measurement is the statistical standard deviation of the voltage associated with either the data "ones" or data "zeros". Alternatively, as discussed below in the description of FIG. 14, the absolute value of the voltage associated with either the data "ones" or data "zeros" can be used in place of standard deviation.

Referring again to FIG. 13, the output of average function 1304 is subtracted from each sample resulting in a value 1326 that is then squared by square function 1306, and filtered by filter 1308. The filtered result is then processed by square root function 1310, resulting in an RMS AC value 1325 representing the noise associated with the "ones". A similar process is performed on the output of average function 1314 by the square function 1316, filter 1318, and square root function 1320, resulting in a value 1328 representing the noise associated with the data "zeroes". These two values 1325 and 1328 are combined resulting in a value 1330 representing the noise in the reception process. If the noise for the "ones" is equal to the noise for the "zeroes", then this method of adding the values results in a sum equivalent to twice the average of the noise value for the "ones".

The noise value 1330 is combined with the signal strength value 1324 in a divide function 1332 to derive a signal-to-noise value 1334 result. As with the signal strength measurement 1324, computational economies may be achieved by using only the result of the data "ones" or data "zeroes" processing for the standard deviation computation, or by using average absolute value in the place of standard deviation.

Figure 14:
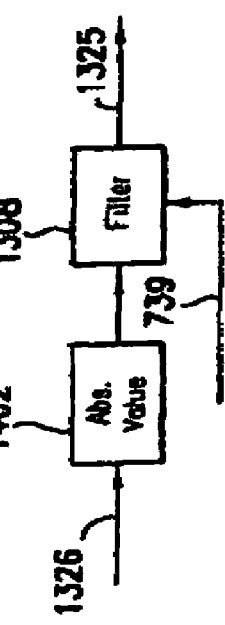
FIG. 14 illustrates an alternate processing method for FIG. 13.

The use of absolute value in place of standard deviation is now described with reference to FIG. 14. FIG. 14 illustrates an alternate solution to the square function 1306, filter 1308, and square root function 1310 sequence identified as 1336 in FIG. 13. The output of average function 1304 is subtracted from each sample resulting in a value 1326 that is provided to the absolute value function 1402 and the result is then filtered by filter 1308 to produce an alternative to the RMS value 1325. Other methods of achieving computational efficiency would be apparent to one of ordinary skill in the art.

The terminology data "ones" and date "zeroes" refers to the logic states passed through the impulse radio receiver. In a typical system, however, there may be a Forward Error Correction (hereinafter called FEC) function that follows the impulse receiver. In such a system, the data "ones" and "zeroes" in the impulse receiver would not be final user data, but instead would be symbol "ones" and "zeros" which would be input to the FEC function to produce final user data "ones" and "zeroes".

Figure 17:
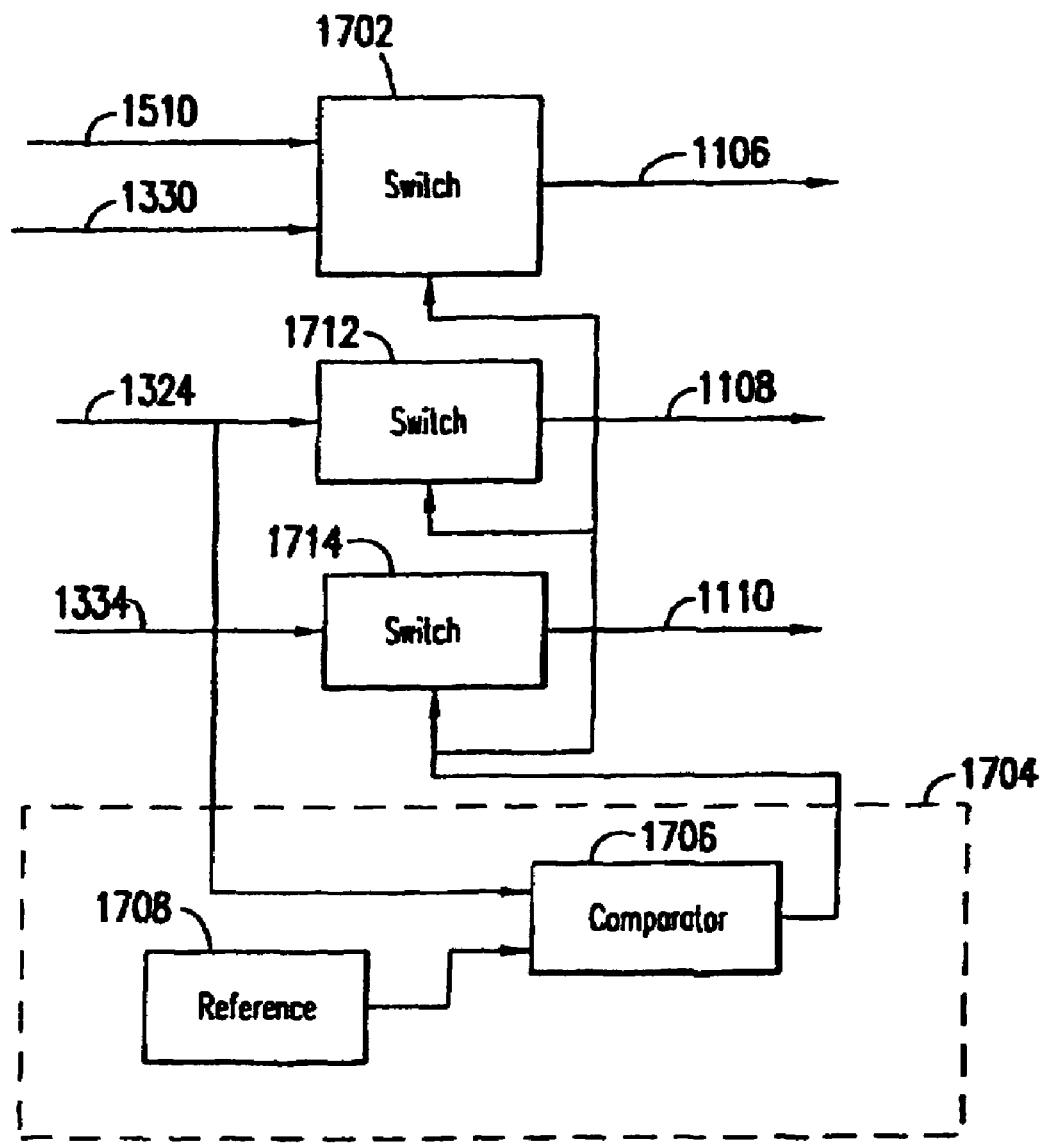
FIG. 17 illustrates a lock detection and signal combination function used by the signal evaluation function of FIG. 11.

An output combiner for the two noise measurement modes together with a mode logic method is shown with reference to FIG. 17. In FIG. 17 the output of the noise measurement 1510 from the algorithm of FIG. 15, which is valid for the unlocked case and the output of the noise measurement 1330 from the algorithm of FIG. 13, which is valid for the locked case, are provided to the two alternative inputs of a selector switch 1702. The switch 1702 is controlled by the output of a lock detector 1704, which determines the mode. The selected output is then supplied to the noise output 1106 of the signal evaluation block 1011 of FIG. 1.

The lock detector 1704 comprises a comparator 1706 connected to the signal strength output 1324 of FIG. 13. A reference value 1708 supplied to the comparator 1706 is a value that is slightly higher than the ambient noise. For an impulse radio, and for digital radios in general, a 10 dB signal to noise ratio is generally required in order to achieve acceptable reception. Thus, it is feasible to place a threshold (that is, the reference value 1708) between the no-signal and the acceptable-signal level.

In a simple receiver, the reference value 1708 may be fixed. In a more advanced radio, the reference value 1708 may be determined by placing the receiver in a state where lock is not possible due to, for instance, a frequency offset, and then setting the reference value 1708 such that the lock detector 1704 shows a stable unlocked state. In another embodiment, the reference value 1708 is set to a factor (e.g., two) times the unlocked noise value 1510.

In the embodiment of FIG. 17, the output of lock detector 1704 is also shown switching (enabling) the outputs of the signal strength 1324 and signal to noise 1334 signals using switches 1712 and 1714, since these outputs are not meaningful until a significant signal is received and in lock. These outputs 1324, 1334 are then supplied to the outputs 1108, 1110 of the signal evaluation function 1011 of FIG. 11.

IV.2.c. Bit Error Rate (BER)

Referring again to FIG. 11, the Bit Error Rate (BER) is measured directly from the received data stream 739. The result 1112 is provided to the power control algorithm 1014. BER can be measured by a number of methods depending on the configuration of the system. In an embodiment adaptable for a block oriented data transmittion system, BERG is measured periodically, by sending a known bit pattern and determining the number of bits in error. For example, a known one-thousand bit message could be sent ten times a second, and the result examined for errors. The error rate could be directly calculated as the number of errors divided by the total bits sent. This block of known BER pattern data may be broken into sub-blocks and sent as part of the data contained in block or packet headers. Both of these methods require considerable overhead in the form of known data sent on the link in order to calculate the error rate.

In a system adapted to use forward error correction (FEC), the error correction rate can be used as the new BER measurement representative of signal quality. Suitable algorithms including Reed Soloman, Viterbi, and other convolutional codes, or generally any FEC methods that yields an error connection rate can be used.

In a preferred embodiment, parity or check sums are used as a measure of errors, even though they alone are insufficient to correct errors. With this method, the user data is used to measure the error rate and a very small overhead of one percent or less is required for the parity to detect normal error rates. For example, one parity bit added to each block of 128 data bits could measure error rates to $10^{-2}$, which would be sufficient to control to a BER of $10^{-3}$. Although double bit errors within a block will go unnoticed, this is not of much consequence since the average of many blocks is the value used in the power control loop.

VI.2.d. Performance Measurement Summary

In the preferred embodiment, the signal strength measurement 1324 could be fairly responsive, i.e., have very little averaging or filtering, in fact it may have no filtering and depend on the power control loop or algorithm 1014 to provide the necessary filtering. The signal to noise measurement 1334 also could be fairly responsive to power changes because the signal measurement is simply propagated through the signal to noise divide operation 1332. The noise measurement 1330, however, typically needs significant filtering 1308 to provide a stable base for the divide operation 1332. Otherwise, the SNR value 1334 will vary wildly due to fluctuations in the noise measurement 1330.

The evaluation of BER 1116 requires a large quantity of data in order to achieve a statistically significant result. For example, for a maximum of $10^{-3}$ BER is desired (e.g., in FIG. 22 discussed below, BER reference 2210=$10^{-3}$), 1000 data bits must be received to have a likely chance of a single error. 30,000 to 100,000 bits are needed to have a smooth statistical measure at this error rate. Thus, the averaging requirements for BER 1116 are much longer than for signal strength 1324 or SNR 1334, yet BER 1116 is typically the most meaningful measure of channel quality.

It should be apparent to one of ordinary skill in the art that, where some of the diagrams and description may seen to describe an analog implementation, both an analog or a digital implementation are intended. Indeed, the digital implementation, where the functions such as switches, filters, comparators, and gain constants are performed by digital computation is a preferred embodiment.

IV.3. Impulse Radio Power Control

Figure 18:
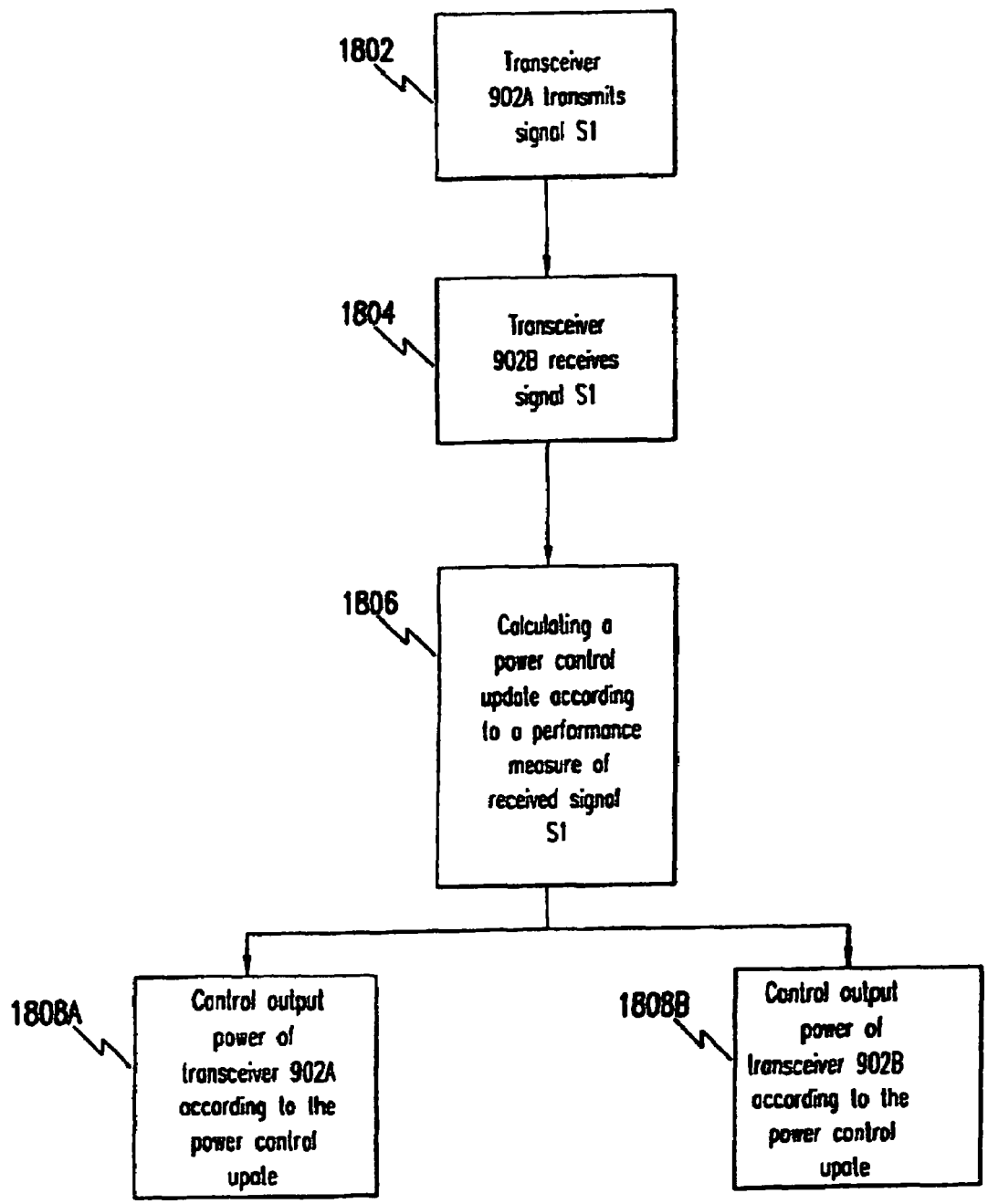
FIG. 18 is a flowchart that describes a method of power control according to the present invention.

FIG. 18 is a flowchart that describes a method of power control according to the present invention. FIG. 18 is described with reference to the example environment depicted FIGS. 9 and 10. In step 1802, transceiver 902A transmits a signal S1. In step 1804, transceiver 902B receives signal S1. In step 1806, a power control update 1016 is calculated according to a performance measurement(s) of receive signal S1. Various performance measurements are discussed below, such as received signal strength BER, and SNR, can be used either alone or in combination.

In steps 1808A and 1808B, the output power of either transmitter 602A of transceiver 902A or transmitter 602B of transceiver 902B (or both) is controlled according to the power control update 1016. In step 1808A, the power of transmitter 602A of transceiver 902A is controlled according to the power control update 1016, which is preferably calculated (in step 1806) at transceiver 902B and transmitted from transceiver 902B to 902A. Step 1808A is described in additional detail in FIG. 19.

Figure 19:
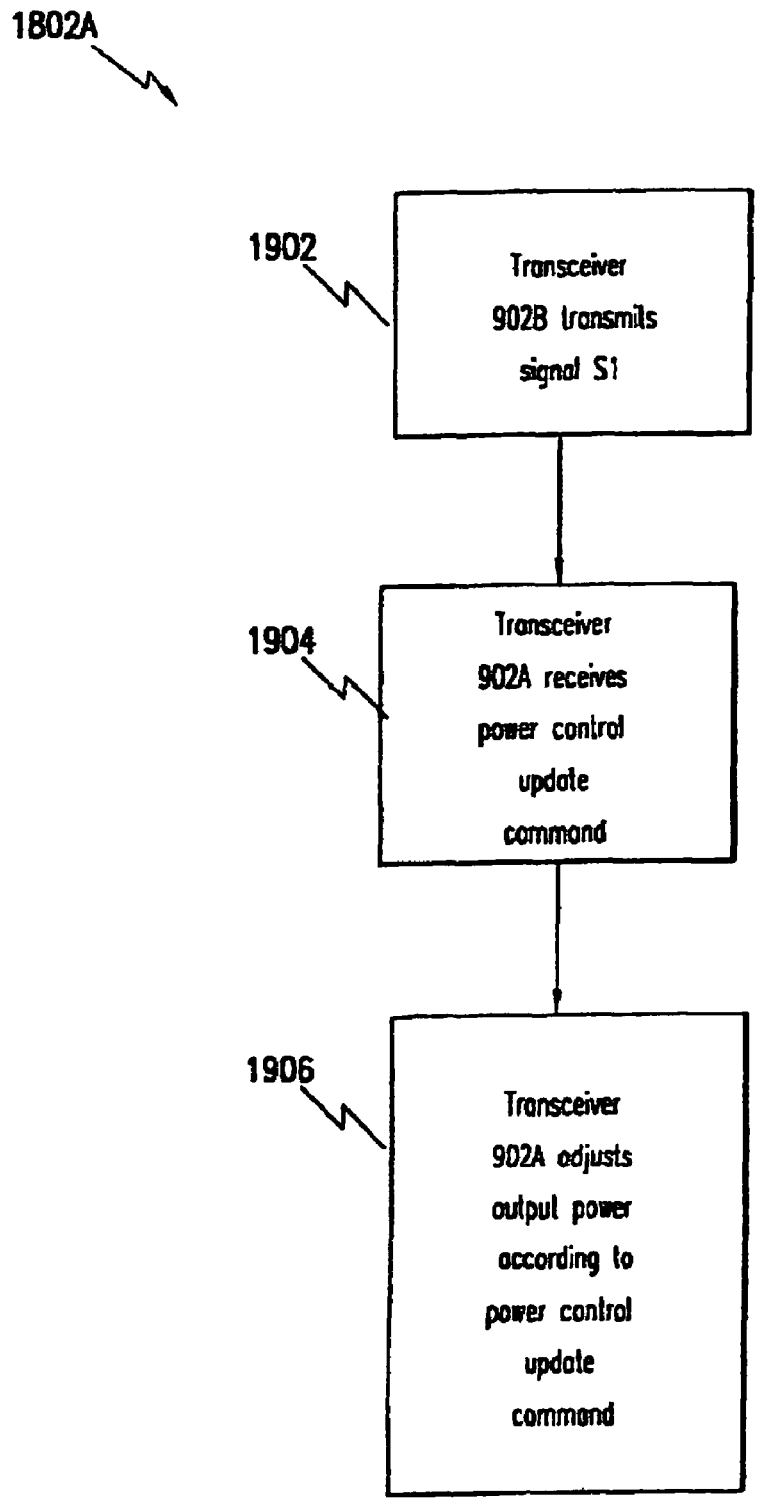
FIG. 19 is a flowchart that describes controlling the transmitter power of a first transceiver according to the power control updates.

Referring to FIG. 19, transceiver 902B transmits a power control update, in step 1902. In step 1904, transceiver 902A, receives the power control update from transceiver 902B. Then, in step 1906, transceiver 902A adjusts its output power (of transmitter 602A) according to the received power control update 1016. According to this embodiment, the power control for a particular transceiver is therefore determined by the performance (measured by another transceiver receiving the signals) of signals it transmits.

Alternatively, in step 1808B, the output power of transmitter 602B of transceiver 902B is controlled according to the power control update 1016. According to this embodiment, the power control for a particular transceiver is therefore determined by the performance of signals it receives from another transceiver. This embodiment assumes that the propagation path between transceivers in communication is bilaterally symmetric, i.e., that signals transmitted between the pair of transceivers undergo the same path loss in both directions. Consider the example environment depicted in FIG. 9. The propagation path between transceivers 902A and 902B is bilateral symmetric if signal S1 undergoes the same path loss as signal S2. The path loss of S1 therefore provides an accurate estimate of the path loss of S2 to the extent that the propagation path approaches bilateral symmetry. According to this embodiment, the power control of transceiver 902B is determined by the performance of received signal S1 (which is transmitted by transceiver 902A and received by transceiver 902B) in lieu of evaluating received signal S2 (which is transmitted by transceiver 902B and received by transceiver 902A). Impulse radio provides a unique capability for implementing this kind of system. In an impulse radio, the multipath signals are delayed from the direct path signal. Thus the first received pulse in a multipath group will be the direct path signal. If both transceivers in a transceiver system are configured to find and lock on the earliest signal in a multipath group, then the symmetry will be assured, assuming the direct path exists. If the direct path does not exist because of obstruction, then both transceivers will still likely lock on the same early multipath reflection—resulting in a bilateral symmetric propagation configuration.

The following two sections describe steps 1806 and 1808 is greater detail.

IB.3.a. Calculate Power Control Update

As described above, in step 1806 a power control update is calculated according to a performance measurement(s) of received signal S1. Those skilled in the art will recognize that many different measurements of performance are possible. Several performance measurements are discussed herein, along with their relative advantages and disadvantages.

IV.3.a.i. Using Signal Strength Measurements

In a first embodiment, the signal strength of the received signal is used as a performance measurement. The power control update, dP, is given by:

$$dP = K (P_{ref} - P_{S1})$$

where K is a gain constant;

$P_{S1}$ is the signal strength of received signal S1;

$P_{ref}$ is a signal strength reference; and dP is the power control update (which is preferable in the unit of Volts).

The output level of transmitter 602A (of transceiver 902A) is therefore increased when $P_{S1}$ falls below $P_{ref}$ and decreased when $P_{S1}$ rises above $P_{ref}$. The magnitude of the update is linearly proportional to the difference between these two signals. Note that the power control update can be equivalently expressed as an absolute rather than a differential value. This can be achieved by accumulating the differential values dP and communicating the resulting output level P as follows:

$$P_n = P_{n-1} + dP,$$

Where $P_n$ is the output level (e.g., voltage level or power level) to be transmitted during the next evaluation interval;

$P_{n-1}$ is the output level transmitted during the last evaluation interval; and dP is the output level increment computed as a result of the signal evaluation during the last interval.

Note also that the power control update could be quantized to two or more levels.

Figure 20:
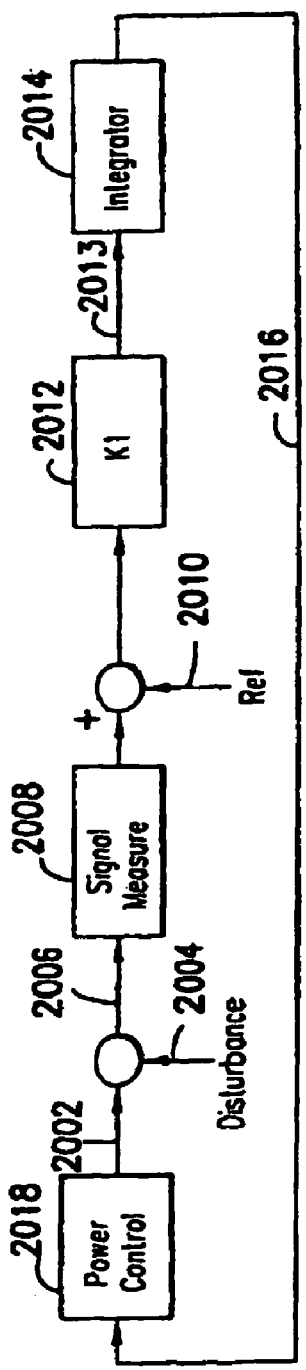
FIG. 20 is a flow diagram illustrating the control dynamics of one embodiment of the present invention.

A control loop diagram illustrating this embodiment will now be described with reference to FIG. 20. A signal 2002 (e.g., signal 2002 (e.g., signal 2002 is transmitted by transmitter 602A of transceiver 902A) having a transmitted output level is disturbed by the propagation path according to a disturbance 2004. This disturbance 2004 may be modeled as either an additive process or a multiplicative process. The multiplicative process is generally more representative of the attenuation process for large disturbances 2004. The resulting received signal 2006 (received by receiver 702B or transceiver 902B) is evaluated for signal Strength 2008 ($P_{s1}$) and compared with the desired signal strength reference 2010 ($P_{ref}$). The result is then scaled by $K_1$ 2012 (K) to produce power control update 2013 (dP). Power control update 2013 (dP) is summed or integrated or possibly filtered over time by, for example, integrator 2014 to produce a power control command signal 2016 to command the power control function 2018 (1126 in FIG. 11) of the transmitter (transmitter 602A of transceiver 902A if the embodiment including step 1808A is implemented, or transmitter 602B of transceiver 902B if the embodiment including step 1808B is implemented) to output a signal 2002 having a new output level (e.g., voltage level or power level). Note that this diagram ignores a nominal path loss and receiver gain which may overcome this path loss. This diagram focuses on the disturbance from the nominal.

If the receiver contains an automatic gain control (AGC), the operation of this AGC must be taken into account in the measurement of signal strength. Indeed, some AGC control signals are suitable for use as a signal strength indicator.

Where the embodiment of 1808B is implemented, the integrating step 2014 should preferably be a filter rather than a perfect integrator and the gain K1 should be low such that the gain correction is less than sufficient to fully level the power, preferably less than half of what would level the power. This will present instability in the system. Such low gain K1 would likely be discarded as unworkable in conventional spread spectrum systems, but because of the potentially very high processing gain available in an impulse radio systems, and impulse radio system can tolerate gain control errors of much greater magnitude than conventional spread spectrum systems, making this method potentially viable for such impulse radio systems.

It should be apparent to one skilled in the art that the system functions including the reference 2010, the $K_1$ scaling function 2012, and the integrator 2014, can be partitioned into either the transmitter or receiver at the convenience of the designer.

Those skilled in the art will recognize that many difference formulations are possible for calculating a power control update according to received signal strength. For instance, the performance measurement might be compared against one or more threshold values. For example, if one threshold value is used the output power is increased if the measurement falls below the threshold and decreased if the measurement rise above the threshold. Alternatively, for example, the performance measurement is compared against two threshold values, where output power is increased if the measurement falls below a low threshold, decreased if the measurement rises above a high threshold, or held steady if between the two thresholds. This alternative method is often referred to as being based on hysteresis.

These two thresholding methods could also be used with the remaining performance measurements discussed below.

In another embodiment, transceiver 902A, does not evaluate the signal. Transceiver 902B evaluates the signal strength of S1 and computes a power control update command for transmitter 602B and for transmitter 602A. The power control update (dP) command for transmitter 602A is sent to transceiver 902A and used to control transmitter 602A.

IV.3.a.ii. Using SNR Measurements

In a second embodiment, the SNR of the received signal is used as a performance measurement. The power control update, dP, is given by:

$$dP=K(SNR_{ref}-SNR_{S1})$$

where K is a gain constant;
$SNR_{S1}$ is the signal-to-noise ratio of received signal S1; and
$SNR_{ref}$ is a signed-to-noise ratio reference.

The power of transmitter 602A (of transceiver 902A) is therefore increased when $SNR_{S1}$ falls below $SNR_{ref}$, and decreased when $SNR_{S1}$ rises above $SNR_{ref}$. The magnitude of the update is linearly proportional to the difference between these two signals. Note that the power control update can be equivalently expressed as an absolute rather than a differential value. As described above, those skilled in the art will recognize that many alternative equivalent formulations are possible for calculating a power control update according to received signal SNR.

Figure 21:
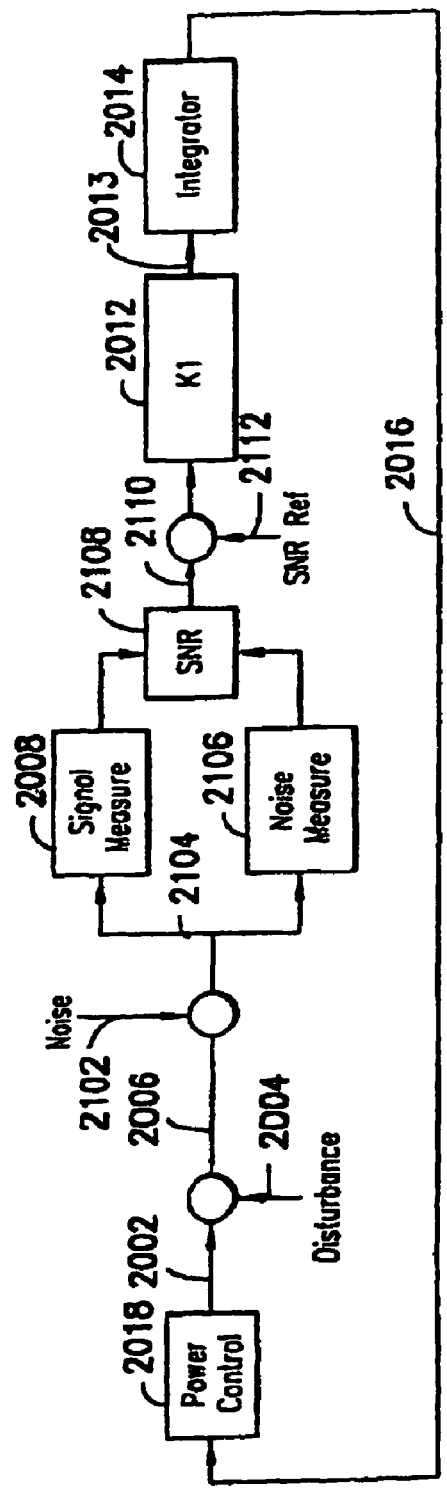
FIG. 21 is a flow diagram illustrating the control dynamics of a system including Signal to Noise Ratio measurement.

A control loop diagram illustrating the functionality of this embodiment Will now be described with reference to FIG. 21. A signal 2002 (e.g., signal 2002 is transmitted by transmitter 602A of transceiver 902A) having a transmitted power level is disturbed by the propagation path according to a disturbance 2004. This disturbance 2004 may be modeled as either an additive process or a multiplicative process; however, the multiplicative process is generally more representative of the attenuation process for large disturbances 2004. The resulting signal 2006 is then combined with additive noise 2102 representing thermal and interference effects to yield a combined signal 2104 which is received by the receiver (receiver 702B of transceiver 902B), where signal strength 2008 and noise 2106 are measured. These values are combined 2108 to yield a signal to noise measurement 2110 ($SNR_{S1}$). The signal to noise measurement 2110 is then compared with a signal to noise reference value 2112 ($SNR_{ref}$). The result is then scaled by $K_1$ 2012 (K) to produce power control update 2013 (dP). Power control update (dP) is summed or integrated 2014 over time to produce a power control command signal 2016 to command the power control function 2018 (1126 in FIG. 11) of the transmitter (transmitter 602A of transceiver 902A if the embodiment including step 1808A is implemented, or transmitter 602B of transceiver 902B if the embodiment including step 1808B is implemented) to output a signal 2002 having a new power level.

Again, it should be apparent to one skilled in the art that the system functions including the reference 2010, the $K_1$ scaling function 2012, and the integrator 2014, as well as part of the signal evaluation calculations, can be partitioned into either the transmitter or receiver at the convenience of the designer.

IV.3.a.iii. Using BER Measurements

In a third embodiment, the BER of the received signal is used as a performance measurement. The power control update, dP, is given by:

$$dP=K(BER_{S1}-BER_{ref})$$

where K is a gain constant;
$BER_{S1}$ is the bit error rate of received signal S1; and
$BER_{ref}$ is a bit error rate reference.

Note that the sign is reversed in this case because the performance indicator, BER is reverse sensed, i.e. a high BER implies a weak signal. The power of transmitter 602A (of transceiver 902A) is therefore decreased when $BER_{S1}$ falls below $BER_{ref}$, and increased when $BER_{S1}$ rises above $BER_{ref}$. The magnitude of the update is linearly proportional to the difference between these two signals. Note that the power control update can be equivalently expressed as an absolute rather than a differential value. As described above, many alternative formulations are possible for calculating a power control update according to received signal BER.

Note that BER measurements span a large dynamic range, e.g., from $10^{-6}$ to $10^{-1}$, even where the received signal power may vary by only a few dB. BER measurements are therefore preferably compressed to avoid the wide variation in control loop responsiveness that would otherwise occur. One method of compressing the range is given by:

$$dP=K(\log(BER_{S1})-\log(BER_{ref})),$$

Where log() is the logarithm function and the other variables are defined above.

Thus five orders of dynamic range are compressed into the range from −1 to −6, which makes the control loop stability manageable for typical systems. An alternative compression function can be generated by mapping BER into equivalent dB gain for a given system. This function can be based on theoretical white Gaussian noise, or can be based on measurements of environmental noise for a given system.

Using BER as the measurement of performance provides meaningful power control in digital systems. However, calculating BER requires a relatively long time to develop reliable statistics. SNR is not as meaningful as BER, but may be determined more quickly. Signal strength is less meaningful still because it does not account for the effects of noise and interference, but may be determined with only a single sample. Those skilled in the art will recognize that one would use these performance measurements to trade accuracy for speed, and that the particular environment in which the transceivers will be used can help determine which measurement is the most appropriate. For example, received signal variations in a mobile application due to attenuation and multipath signals demand high update rates, whereas high noise environments tend to need more filtering to prevent erratic behavior.

Combining BER, SNR, and/or signal strength can produce other useful performance measurements.

IV.3.a.iii.(1) BER and Signal Strength

In a fourth embodiment, BER and signal strength are combined to form a performance measurement, where the power control update, dP, is given by:

$$P_{ref}=K_2(\log(BER_{S1})-\log(BER_{ref}))\ dP=K_1(P_{ref}-P_{S1})$$

where $K_1$ and $K_2$ are gain constants;
$BER_{S1}$ is the bit error rate of received signal S1;
$BER_{ref}$ is a bit error rate reference; and
$P_{S1}$ is the signal strength of received signal S1.

$P_{ref}$, a signal strength reference, is calculated according to the first formula and substituted into the second to determine the power control update. This composite performance measurement combines the more accurate BER measurement with the more responsive signal strength measurement. Note that the power control update might be equivalently expressed as an absolute rather than a differential value.

IV.3.a.iii.(2) BER and SNR

In a fifth embodiment and a sixth embodiment, BER and SNR, are combined to form a performance measurement. In the fifth embodiment, the power control update, dP, is given by:

$$SNR_{ref}=K_2(BER_{S1}-BER_{ref})\ dP=K_1(SNR_{ref}-SNR_{S1})$$

where $K_1$ and $K_2$ are gain constants;
$BER_{S1}$ is the bit error rate of received signal S1;
$BER_{ref}$ is a bit error rate reference; and
$SNR_{S1}$ is the signal-to-noise ratio of received signal S1.

In the sixth embodiment, the power control update, dP, is given by:

$$SNR_{ref}=K_2(\log(BER_{S1})-\log(BER_{ref}))\ dP=K_1(SNR_{ref}-SNR_{S1})$$

where $K_1$ and $K_2$ are gain constants;
$BER_{S1}$ is the bit error rate of received signal S1;
$BER_{ref}$ is a bit error rate reference; and
$SNR_{S1}$ is the signal-to-noise ratio of received signal S1.

$SNR_{ref}$, a signal-to-noise ratio reference, is calculated according to the first formula and substituted into the second to determine the power control update. This composite performance measurement combines the more accurate BER measurement with the more responsive SNR measurement. Note that the power control update might be equivalently expressed as an absolute rather than a differential value.

A control loop simulation diagram illustrating the functionality of an embodiment based on BER and SNR will now be described with reference to FIG. 22. A signal 2002 (e.g., signal 2002 is transmitted by transmitter 602A of transceiver 902A) having transmitted power level is disturbed by the propagation path according to a disturbance 2202, which may include both propagation and noise effects as in FIG. 21 yielding a combined signal 2104 which is received by the receiver (receiver 702B of transceiver 902B). The signal 2104 is evaluated for signal to noise ratio 2204 (combined functions of 2008, 2106 and 2108) and then compared with a reference 2206 to yield a result 2210. This result 2210 is then scaled by scaling function $K_1$ 2012 ($K_1$) and summed or integrated over time by integrator 2014 to produce a power control command signal 2016 to command the power control function 2018 (1126 in FIG. 11) of the transmitter (transmitter 602A of transceiver 902A if the embodiment including step 1808A is implemented, or transmitter 602B of transceiver 902B if the embodiment including step 1808B is implemented) to output a signal 2002 having a new power level. The embodiment including step 1808A is preferred, because the embodiment including step 1808B is susceptible to errors from non-symmetrical noise and interference as in the case where interfering transmitter 910 is closer to receiver 702B than to receiver 702A. The embodiment including step 1808B may be used in applications that do not need precise power control by using low gain factors ($K_1$ and $K_2$).

Reference 2206 is based on BER measurement 2208 ($BER_{S1}$) of signal 2104. More specifically, signal 2104 is evaluated for BER 2208 and then compared to desired BER reference 2209 ($BER_{ref}$). The result is then scaled by $K_2$ 2212 and filtered or integrated over time by integrator 2214 to produce reference 2206 ($SNR_{ref}$). This process results in the SNR reference 2206 used by the SNR power control loop. The BER path is adjusted by scaling function $K_2$ 2212 ($K_2$) and by the bandwidth of the filter 2214 (when a filter is used for this function) to be a more slowly responding path than the SNR loop for loop dynamic stability reasons and because BER requires a much longer time to achieve a statistically smooth and steady result. Note also that to implement the integrator 2214 as a pure integrator rather than a filter the equations may be modified to include an additional summation stage:

$$dSNR_{ref}=K_1(\log(BER_{S1})-\log(BER_{ref}))$$
$$SNR_{ref}=dSNR_{ref}+SNR_{ref}\ dP=K_2(SNR_{ref}-SNR_{S1})$$

where $K_1$ and $K_2$ are gain constants;
$BER_{S1}$ is the bit error rate of received signal S1;
$BER_{ref}$ is a bit error rate reference;
$dSNR_{ref}$ is an incremental change in SNRref;

SNR$_{ref}$ is a calculated reference used in the SNR loop; and SNR$_{S1}$ is the signal-to-noise ratio of received signal S1.

Figure 22:
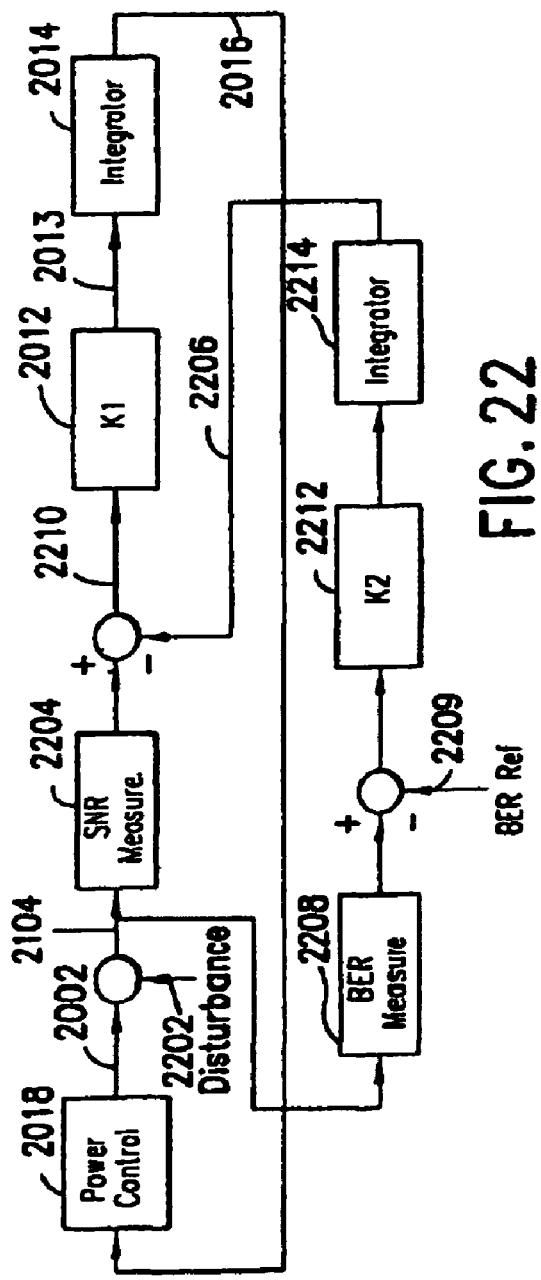
FIG. 22 is a flow diagram illustrating the control dynamics of a system including Bit Error Rate measurement.

Again, it should be apparent to one skilled in the art that the system functions illustrated on FIG. 22 from the references 2206 and 2209 to the integrator 2014 as well as part of the signal evaluation calculations 2204 and 2208, can be partitioned into either the transmitter or receiver at the convenience of the designer.

Figure 23:
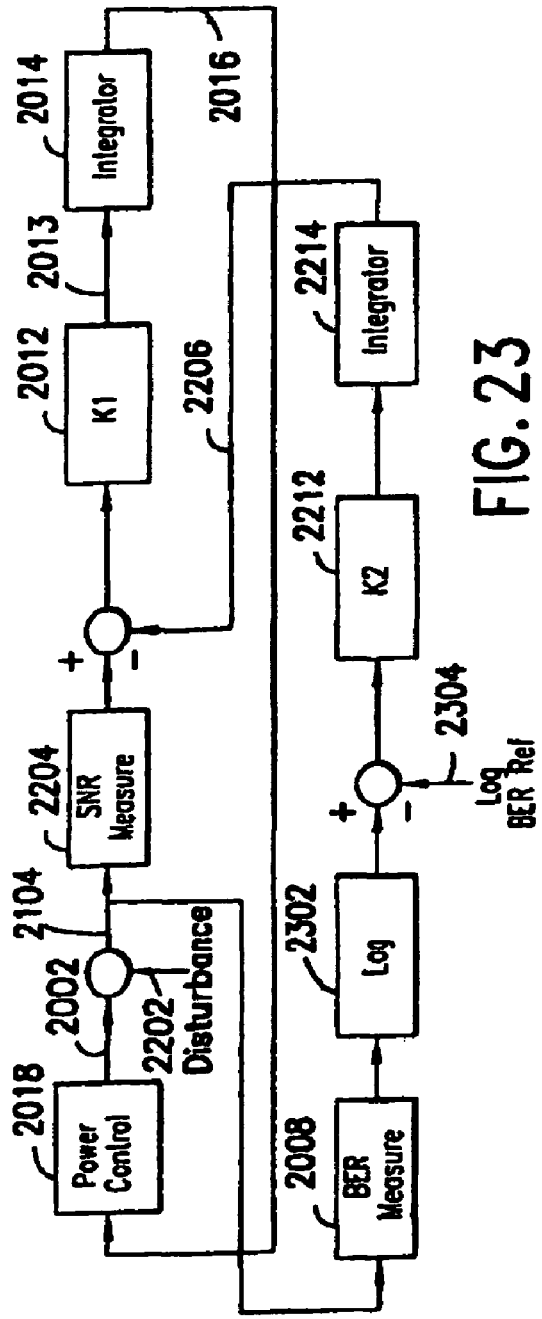
FIG. 23 is a flow diagram illustrating the control dynamics of a system employing log mapping of Bit Error Rate measurements.

A control loop simulation diagram illustrating the addition of the log(BER) function will now be described with reference to FIG. 23. It can be seen that this Figure is substantially similar to FIG. 22 except that the BER measurement 2208 is processed by a log function 2302 (log(BER$_{S1}$)) and compared with a reference 2304 (log(BER$_{ref}$)) suitable for the log(BER) value before being scaled by scaling function K$_2$ 2212 (K$_2$) and integrated or filtered by integrator 2214 and used as the reference 2206 (SNR$_{ref}$) for the SNR control loop.

One should note that strong signals result in small BER measurement values or large magnitude negative log(BER) values and that control loop gain factor polarities need to be adjusted to account for this characteristic.

IV.3.b. Calculate Power Control Update Using Measurements of a Signal Transmitted by another Transceiver In each of the above discussed embodiments for perform power control, power control for a particular transceiver (e.g., transceiver 902A) can be determined based on the performance (i.e., signal strength, SNR and/or BER) of signals transmitted by the particular transceiver and received by another transceiver, (e.g., transceiver 902B), as specified in step 1808A of FIG. 18. More specifically, in step 1808A, the power of transmitter 602A of transceiver 902A is controlled according to a power control update, which is preferably calculated at transceiver 902B and transmitted from transceiver 902B to transceiver 902A.

Alternatively, as briefly discussed above, each of the above discussed embodiments for performing power control for a particular transceiver can be determined based on the performance (i.e., signal strength, SNR and/or BER), of signals it receives, as in step 1808B of FIG. 18. More specifically, according to this embodiment, the power control for a particular transceiver (e.g., transceiver 902A) is determined by the performance of signals it receives from another transceiver (e.g., signals transmitted from transceiver 902B and received by transceiver 902A).

This power control embodiment assumes that the propagation path between transceivers in communication is bilaterally symmetric. However, an interfering transmitter (e.g., transmitter 908), when present, will disturb the system asymmetrically when it is nearer to one transceiver. As shown in FIG. 9, interfering transmitter 908 is near to transceiver 902B. Thus, when interfering transmitter 908 turns on, the noise level at transceiver 902B will increase more than the noise level at transceiver 902A. The response of the power control system can vary depending on the performance measurement utilized. If the power control system is using signal strength, the control system would be unaffected by the interference, but if the system is using signal to noise ratio, the nearby transceiver 902B would increase power to overcome the performance degradation. In this case, it is an unnecessary increase in power. This increase in power would be seen as a propagation improvement at transceiver 902A, which would decrease power, resulting in an even lower SNR at 902B, which would increase power further. Clearly this is not workable.

In a preferred embodiment, this can be overcome by communicating to transceiver 902B the power (e.g., relative power or absolute power) transmitted by transceiver 902A. This allows transceiver 902B to separate power changes due to power control from changes due to propagation. This communication can be accomplished according to conventional techniques, such as transmitting a digital message in a link control header, or transmitting a periodic power reference. With this information, transceiver 902B may adjust its power based only on propagation changes and not on power control adjustments made by transceiver 902A.

Multi-path environments can also disturb system symmetry. A transceiver 902 can lock onto various multi-path signals as the transceivers in communication move in relation to one another. If the two transceivers are not locked on to signals from the same path, the signals will not necessarily match in attenuation patterns. This can cause erroneous power control actions in the affected transceiver 902.

Figure 24:
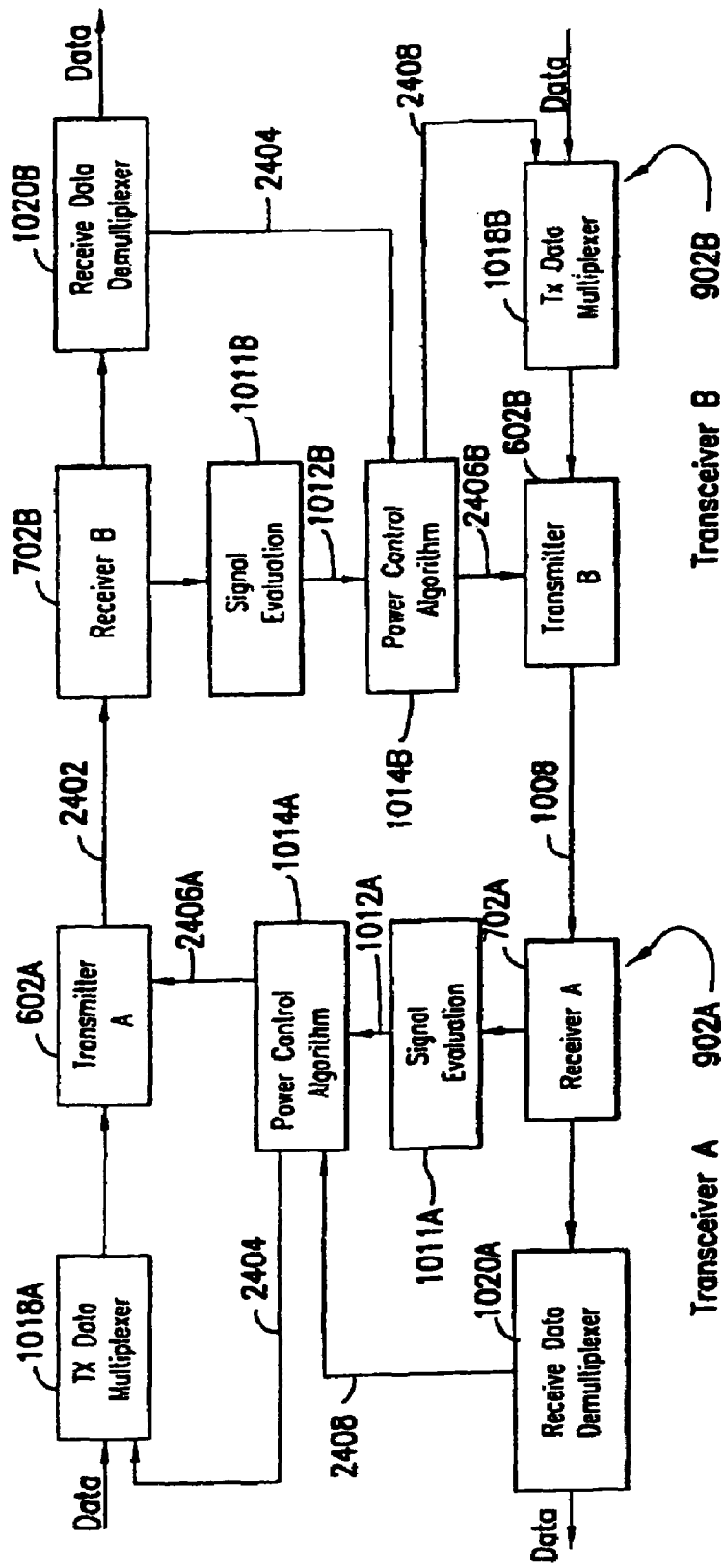
FIG. 24 is a flow diagram illustrating the control dynamics of a system that incorporates auto power control and cross power control.

A more general block diagram of a transceiver power control system including power control of both transmitters (i.e., transmitter 602A of transceiver 902A. and transmitter 602B of transceiver 902B) from signal evaluations from both transceivers (i.e., transceivers 902A and 902B) is shown in FIG. 24. For this discussion, auto-power control refers to power control of a first transceiver's (e.g., transceiver 902A) output according to the evaluation of a signal transmitted by a second transceiver (e.g., transceiver 902B) and received by the first transceiver (e.g., transceiver 902A). Thus, auto power control relates to step 1808B discussed above. Cross power control refers to the control of a first transceiver's (e.g., transceiver 902A) output according to the evaluation of the first transceiver's transmitted signal as received at a second transceiver (e.g., transceiver 902B). Thus cross power control relates to step 1808A discussed above.

Referring to FIG. 24, transmitter 602A transmits a signal 2402 to receiver 702B of transceiver 902B. This signal 2402 is evaluated by signal evaluation function 1011B resulting in performance measurement(s) 1012B (e.g., signal strength, SNR and/or BER) which are delivered to the power control algorithm 1014B. The power control algorithm 1014B also receives power control messages 2404 from transmitter 602A via the receiver data demultiplexer 1020B, which separates user data and power control messages 2404. These power control update messages 2404 can comprise data related to the power level of transmitter 602A and/or signal evaluations (e.g., signal strength, SNR, and/or BER) of signals 1008 received by receiver 702A (e.g., signals transmitted by transceiver 902B and received by transceiver 902A).

The power control algorithm 1014B then computes a new power level 2406B to be transmitted and delivers this value to transmitter 602B. Power control algorithm 1014B can also deliver signal evaluations 2408, which are based on measurements determined by signal evaluation function 1011B, to the TX data multiplexer 1018B. Alternatively, signal evaluation function 1011B can deliver this information 2408 directly to TX data multiplexer 1018B. This signal evaluation data 2408 is then added to the input data stream and transmitted at the commanded power level 2406B.

FIG. 25 illustrates an embodiment of the power control algorithm 1014B (of transceiver 902B) employing auto-control with power level messaging. Referring to FIG. 25, the received signal (transmitted by transmitter 702A and received by receiver 602B) is evaluated for signal strength 1106B by signal evaluation function 1011B. Additionally, receive data demultiplexer 1020B (See FIG. 24) separates user data and power control messages 2404 and delivers the power control messages 2404 to subtract function 2502B. The power control message value 2404 (representing the output level of transmitter 602A) is then subtracted by subtractor 2502 from the signal strength measurement 1106 (which is based on the strength of a signal transmitted by transceiver 902A). The result 2406 is used to deviate (e.g., decrease or increase) the transmitter output from a nominal output level. Additionally, a message value that represents the transmitter output level is generated and sent to the other transceiver 902A.

Thus, it can be seen that if the signal becomes attenuated, the output of the subtractor 2504 will decrease, resulting in an increase in the transmitted output level (e.g., voltage level or output level) and a message to the effect. On the other hand if transmitter 602A decreases its output level due to a measured signal condition, both the received signal and output levels signals will decrease such that there is no change in the difference resulting in no change to the output power. This mechanism prevents a runaway positive feedback loop between the two transceivers and allows higher control loop gains than would be workable without the message.

FIG. 26 illustrates an embodiment where auto and cross control are implemented in combination. Referring to FIG. 26, the received signal is evaluated by signal evaluation function 1011B for signal strength 1106B and SNR 1110B. The output level signal 2404 (representing the output level of transmitter 602A) is subtracted from the signal strength 1106B resulting in an auto control signal 2406. This auto control signal 2406 is combined with a signal strength 1106A or SNR measurement 1110A determined by the signal evaluation function 1011A of the other transceiver 902A and further filtered by combiner/filter 2602 to produce an output level value 2604 used to control the output level of transmitter 602B. This output level value 2604 is combined with the signal strength 1106B and SNR 1110B measurements by multiplexer 2606, and then further combined with the transmitted data stream by transmit data multiplexer 1018B. This system takes full advantage of both the auto and cross power control methods, with the auto power control generally offering speed of response, and the cross power control offering precision together with tolerance of link imbalance and asymmetry.

In a preferred embodiment, the power control update is calculated at the transceiver receiving the signals upon which the update is based. Alternatively, the data required to calculate the power control update may be transmitted to another transceiver and calculated there.

IV.A. Transceiver Power Control

Returning to FIG. 18, in steps 1808A and 1808B, the output power of either transceiver 902A or 902B (or both) is controlled according to the power control update calculated in step 1806.

In step 1808A, the power of transmitter 602A of transceiver 902A is controlled according to the power control update. FIG. 19, briefly discussed above, is a flowchart that depicts step 1808A in greater detail according to a preferred embodiment. In step 1902, transceiver 902B transmits the power control update calculated in step 1806 (assuming that, according to a preferred embodiment, the power control update is calculated at transceiver 902B). In step 1904, transceiver 902A receives the power control update. In step 1906, transceiver 902A adjusts its output level (e.g., voltage level or power level) according to the received power control update, as described in detail below.

Alternatively, in step 1808B, the power of transmitter 602B of transceiver 902B is controlled according to the power control update. Thus here, the power level of the signal S1 (sent by transceiver 902A and received by transceiver 902B) is used to control the output level of transmitter 602B. As a result, there is no requirement that the update be transmitted between transceiver 902A and 902B. Rather, transceiver 902B preferably calculates the power control update and adjusts the power of its transmitter 602B accordingly.

Again, it is noted that while power control refers to the control of the output power of a transmitter, this is usually implemented as a voltage control proportional to the output signal voltage.

IV.A.S. Integration Gain Power Control

Figure 27:
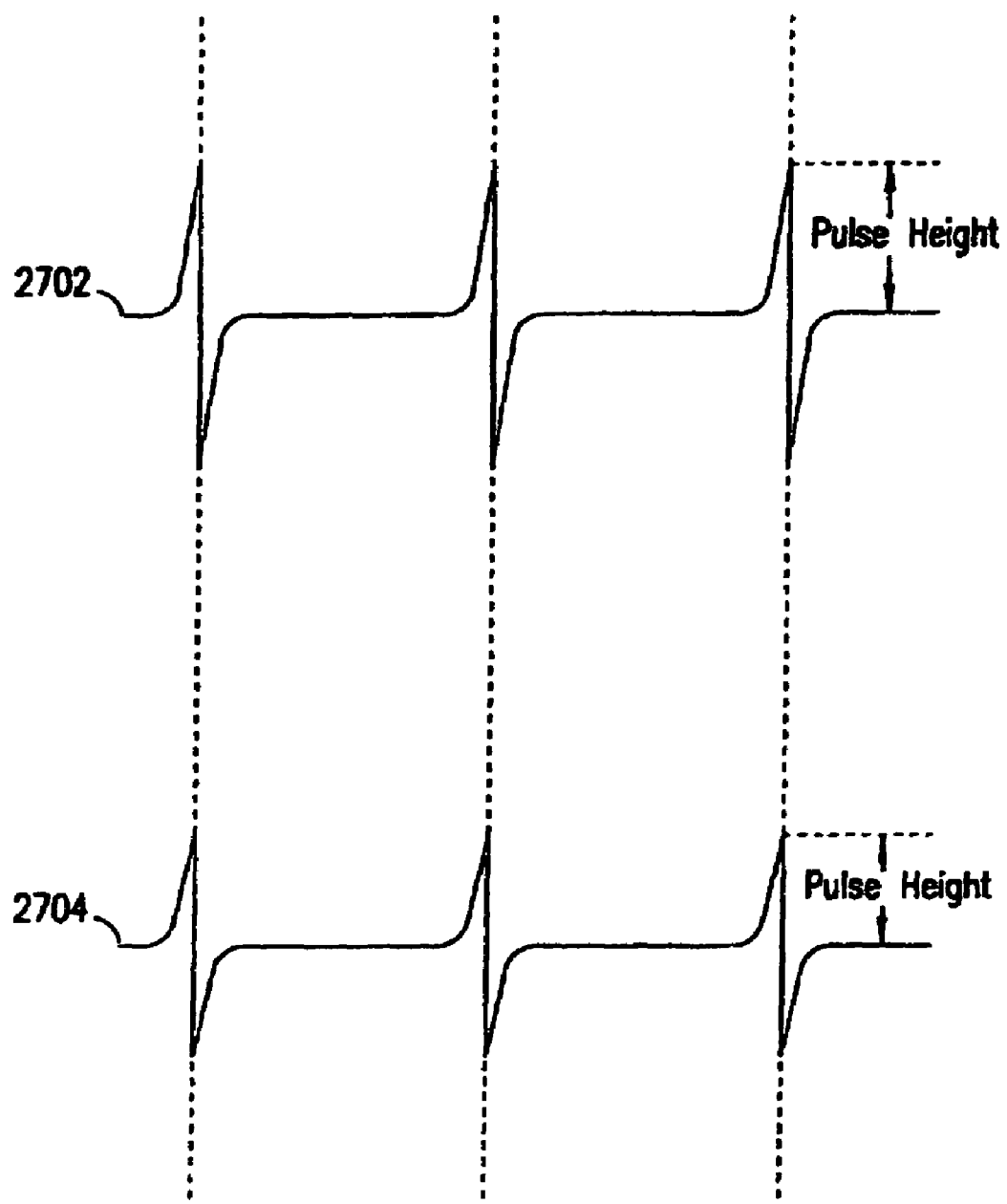
FIG. 27 illustrates two signals having different pulse peak power.

In both steps 1808A and 1808B, power control of a transmitter 902 can be accomplished by controlling any parameter that affects power. In a first embodiment, the pulse peak power (e.g., the height of pulses) of the transmitted signal is controlled while keeping the timing parameters constant. For example, FIG. 27 shows two signals 2702 and 2704 having different pulse peak powers but the same timing parameters. Note that signal 2702 has a greater pulse height and thus corresponds to a greater transmitter power than signal 2704.

In a preferred embodiment, however, the number of pulses per bit is controlled, thereby controlling the integration gain while keeping pulse peak power constant. Integration gain relates to (e.g., is proportional to) the number of pulses summed or integrated in the receiver for each data bit. For a constant data rate, the transmitted power is directly proportional to the number of pulses per bit transmitted. Referring to FIG. 11, in one embodiment where power control commands (e.g., differential commands) are selected from the data stream by a power command function 1124 (which includes the function of receive data demultiplexer 1020) and delivered to a power control function 1126 (that controls the output power of the pulse generator 622), the number of pulses may be found by first, summing the differential commands, and then computing the number of pulses based on this summation, as in the following:

$$P_n = P_{n-1} + dP \ N_{train} = K_p P_n$$

Where, $P_n$ is the present commanded output level (e.g., voltage level or power level);

$P_{n-1}$ is the output level transmitted during the just completed evaluation interval;

dP is the output level increment commanded (also referred to as the power update command 1016) as a result of the just completed evaluation interval;

$N_{train}$ is the number of pulses per data bit (also referred to as the number of pulses in a pulse train) to be transmitted during the present evaluation interval; and $K_p$ is a constant relating power to number of pulses per bit.

Note that a check for limits is necessary. $N_{train}$ cannot be greater than full power, nor can $N_{train}$ be less than one. In some cases, $N_{train}$ must be an even integer or some other quantized level.

Figure 28:
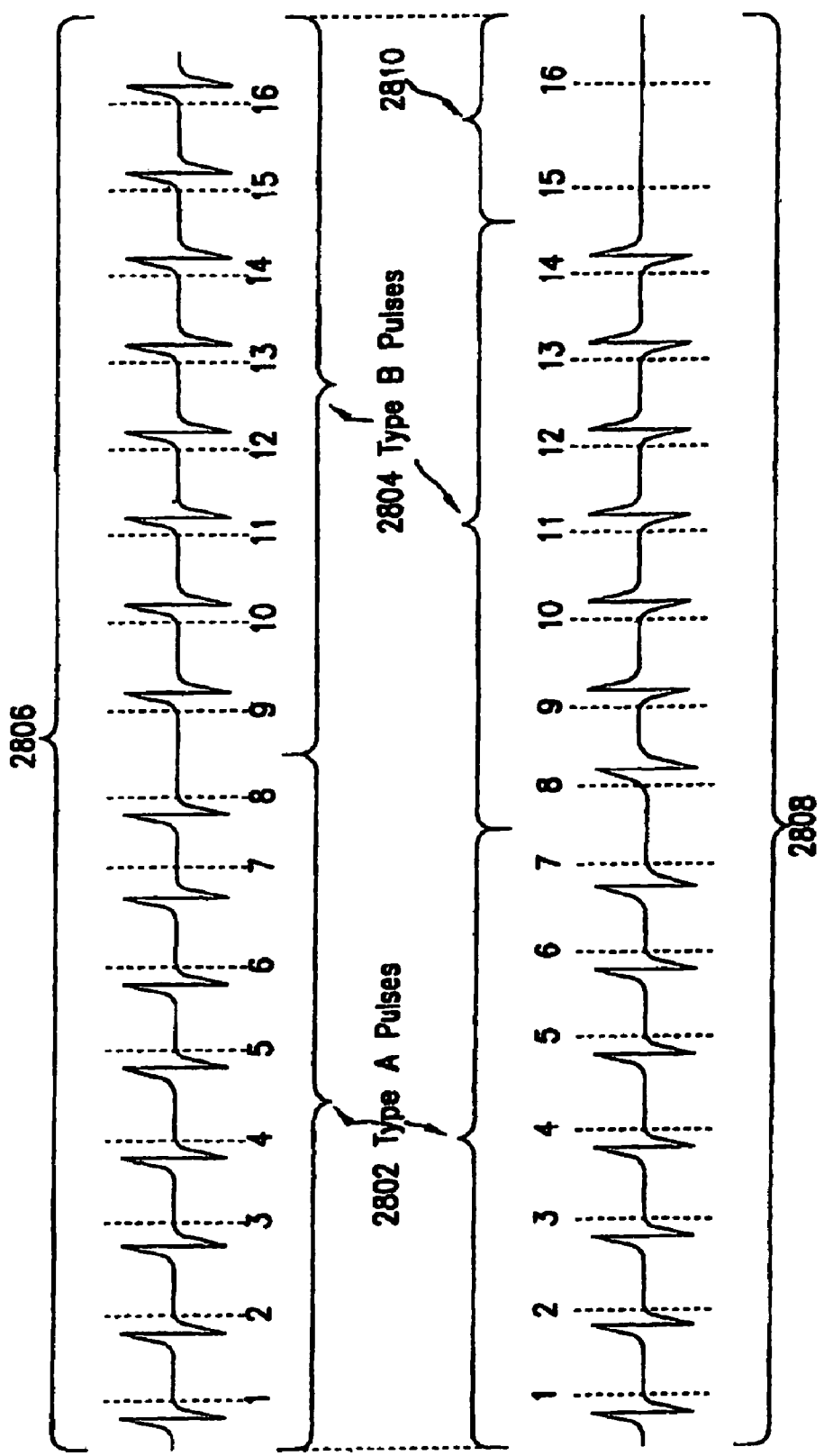
FIG. 28 illustrates periods of two subcarriers.

In a system with a subcarrier as disclosed in the 5,677,927 patent, it may be preferable to increment pulses according to complete subcarrier cycles in order to keep the subcarrier signal balanced. This can be accomplished by adjusting subcarrier cycle length or by adjusting the number of subcarrier cycles. This can be illustrated by example. For the example shown in FIG. 28, type A pulses 2802 shall be defined as pulses delayed from nominal by ½ modulation time and type B pulses 2804 shall be defined as pulses advanced from nominal by ½ modulation time. Thus, the difference between type A pulses 2802 and type B pulses 2804 is one full modulation time. Using this nomenclature, with reference to an example system with 128 pulses per data bit (i.e., $N_{train}$=128 pulses/bit), a suitable subcarrier might comprises eight periods 2806 (i.e., $N_{period}$=8) of 16 pulses (i.e., $N_{pulses-per-period}$=16 pulses/period) where each period 2806 comprises eight type A pulses 2802 followed by eight type B pulses 2804 when a data "one" is transmitted. Power can be reduced by adjusting the subcarrier cycle length by, for example, changing to eight periods 2808 of 14 pulses each (i.e., $N_{pulses-per-period}$ is reduced from 16 pulses/period to 14 pulses/period), where each period 2808 comprises seven type A pulses 2802 followed by seven type B pulses 2804 and two empty pulses 2810. This maintains the balance of pulse types (same number of each type) within each subcarrier cycle, and thus, the whole data bit interval results in a total of 112 pulses per data bit (i.e., $N_{train}$ is reduced from 128 pulses/bit to 112 pulse/bit) excluding empty pulses 2810. It is noted that the location of the empty pulses can be changed. For example, each period 2808 can comprise seven type A pulses 2802, followed by one empty pulses 2810, followed by seven type B pulses 2804, followed by one empty pulse 2810.

Alternatively, the power may be reduced by reducing the number of subcarrier cycles. According to this embodiment, to reduce power the example system could transmit seven (instead of eight) periods of 16 pulses (i.e., $N_{period}$ is reduced from 8 periods to 7 periods), where each period comprises eight type A pulses followed by eight type B pulses when a data "one" is transmitted. This would result in a total of 112 pulses per data bit, as opposed to 128 pulses per data bit (i.e., $N_{train}$ is reduced from 128 pulses/bit to 112 pulses/bit). For example, referring to FIG. 28, to reduce power, a subcarrier cycle can be reduced from eight periods 2806 of 16 pulses to seven periods 2806 of 16 pulses.

Whereas the balance of subcarrier cycles is preferred, it is not required. Patterns may be generated that balance the pulse types over the data bit, wherein one or more subcarrier periods may be unbalanced. Some systems may even tolerate an unbalance of pulse types over a data bit, but this will usually come with some performance degradation. Other patterns can be easily implemented by one of ordinary skill in the art following the principles outlined in these examples.

The receiver integration gain should ideally track the number of pulses transmitted. If these values are not coordinated, loss of performance may result. For example, if the receiver is receiving 128 pulses for each data bit and the transmitter is only transmitting the first 64 of these pulses, the receiver will be adding noise without signal for the second half of the integration time. This will result in a loss of receiver performance and will result in more power transmitted than necessary. This can be prevented by coordinating the number of pulses between the transmitter and receiver. In one embodiment, this information is placed in the headers or other control signals transmitted so that the receiver can determine exactly how many pulses are being sent.

In another embodiment, the receiver employs multiple parallel bit summation evaluations, each for a different possible integration gain pulse configuration. The SNR 1110 is evaluated for each summation evaluation path, and the path with the best SNR is selected for data reception. In this way, the receiver can adaptively detect which pulse pattern is being transmitted and adjust accordingly.

IV.A.B. Gain Expansion Power Control

Power control can be improved by expanding the gain control sensitivity at high levels relative to low levels. For illustration, an unexpanded gain control function would be one where the voltage or power output would be simply proportional to the voltage or power control input signal:

$$V_{out} = K_{ctl} V_{ctl}$$

Where $V_{out}$ is the pulse voltage output;

$K_{ctl}$ is a gain constant (within power control block 1014, not to be confused with $K_1$); and $V_{ctl}$ is the control voltage input (power control command signal).

An example of an expanded gain control function could be:

$$V_{out} = K_{ctl} V_{ctl}^2$$

With this function, a control input increment of one volt from nine to ten volts produces a greater power output change than a control input increment of one volt from one to two volts, hence gain expansion.

An excellent expansion function is exponential:

$$V_{out} = K_{ctl} \exp(V_{ctl})$$

With this function, the output fractional (percentage) change is the same for a given input control voltage difference at any control level, This stabilizes the responsiveness of the power control loop over many orders of magnitude of signal strength.

This function can be implemented with a exponential gain control device, or a separate exponential function device together with a linear gain control device. An embodiment using a exponential gain control device is described in relation to FIG. 20. In this embodiment, operation is much the same as previously described for the linear power control case except that now the power control function 2018 controls the power output in a manner such that the power output, expressed in decibels (dB), is substantially proportional to the power control input voltage 2016 ($V_{ctl}$) (also referred to as, the power control command signal).

An alternative embodiment employing a separate exponential function and a linear gain control device will now be described with reference to FIG. 29. A signal 2002 ($V_{out}$) having a transmitted power level is disturbed by the propagation path according to a disturbance 2202. The resulting received signal 2104 is evaluated for signal to noise ratio 2204 and compared with the desired signal to noise reference 2112. The result is then scaled by $K_1$ 2012 and summed or integrated over time by integrator 2014 to produce an output 2902. This output 2902 drives an exponential function 2904 to yield a power control command signal 2906 to command the power control function 2018 (1126 in FIG. 11) of a transmitter to output a signal 2002 ($V_{out}$) having a new power level.

Figure 29:
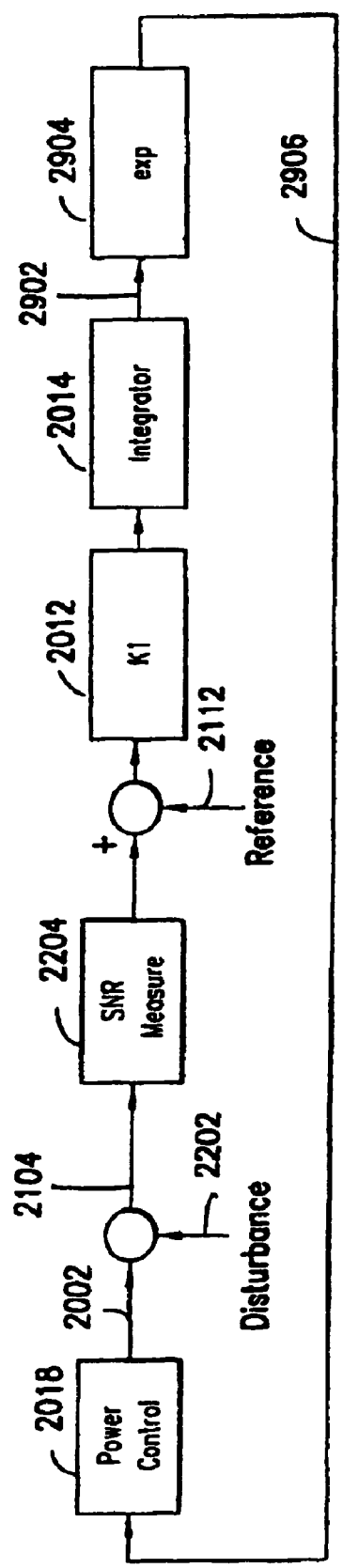
FIG. 29 is a flow diagram illustrating the control dynamics of a system employing gain expansion power control.

It should be apparent to one skilled in the art that the system functions illustrated in FIG. 29 from the reference 2112 to the exponential function 2904 can be partitioned into either the transmitter or receiver at the convenience of the designer. This embodiment can be modified to use BER information and log(BER) information as shown in FIGS. 22 and 23.

Where exponential power control and integration gain power control methods are combined, algorithm simplicity can result. The number of pulses is determined by the following relationship:

$$Np = 2^{KpP}$$

Where Np is the number of pulses per data bit to be transmitted;

P is the power control command; and

Kp is a scaling constant.

In one embodiment, Np is the only value in the above equation that is rounded to an integer. In another embodiment, greater implementation simplicity may be achieved by rounding the product KpP to an integer value. Thus, only power of two values need to be generated. In this embodiment, a command for lower power results in half of the present number of pulses per data bit being transmitted. Conversely, a command for more power results in twice the present number of pulses per data bit being transmitted. For example, in a system designed for full power at 128 pulses per bit, the product KpP=7 commands full power. Thus Kp=7/$P_{max}$ such that the maximum vale of P yields KpP=7. Because this represents fairly coarse steps in power increment, hysteresis can be used to advantage in the rounding of the KpP value to prevent instability at the rounded threshold.

IV.A.C. Power Control In Combination With Variable Data Rate

Impulse radio systems lend themselves to adaptively changing the data rate according to data needs and link propagation conditions. The combination of power control methods and variable data rate methods requires special considerations. This is because it is not always advantageous to use power control to reduce signal power and minimize interference.

For example, in data systems, it is advantageous to use the maximum data rate possible for the link range and interference conditions, keeping the power at the maximum. Thus, power control would only be used where there is excess received signal at the maximum data rate available to the transceiver system. That is, where a transceiver is already transmitting at its maximum data rate, power control could be used to decrease power so long as such a decrease in power does not cause the data rate to decrease. For a constant message rate, the average interference is the same whether a high power/high data rate message is transmitted for a short time or whether a lower power/low data rate message is transmitted over a longer time. The user of a computer system, however, would usually prefer the message to be transmitted in a short time.

In digital voice systems with constant data rate modems and compression/expansion algorithms, power control is the only option. In such systems, the power should be minimized. (It is, however, possible to send the data in blocks or packets at a burst rate higher than the average data rate.)

In digital voice systems with variable data rate modems and compression/expansion algorithms, the power can be minimized during low data rate intervals to minimize interference. In this case, it is also possible to maintain maximum power and maximum data rate, but to turn off the transmitter for intervals when no data is available.

Figure 30:
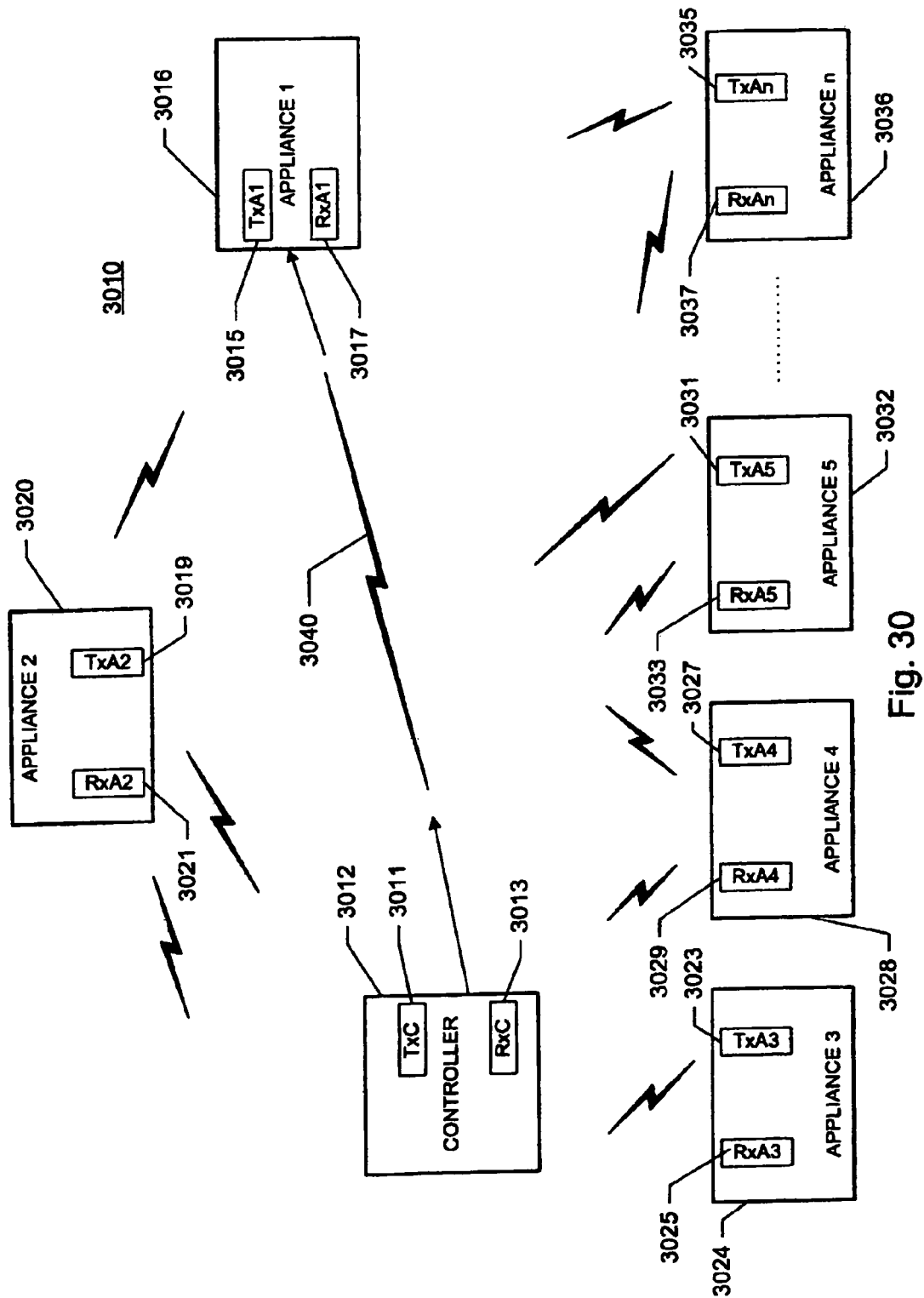
FIG. 30 illustrates an example of a noisy environment in applying impulse radio to control appliances.

FIG. 30 illustrates an example of a noisy environment in applying impulse radio to control appliances. In FIG. 30, an impulse radio appliance control system 3010 includes an impulse radio controller 3012 and a plurality of appliances 3016 (Appliance 1), 3020 (Appliance 2), 3024 (Appliance 3), 3028 (Appliance 4), 3032 (Appliance 5), 3036 (Appliance n). Controller 3012 includes a transmitter 3011 (TxC) and a receiver 3013 (RxC). Similarly, appliance 3016 includes a transmitter 3015 (TxA1) and a receiver 3017 (RxA1); appliance 3020 includes a transmitter 3019 (TxA2) and a receiver 3021 (RxA2); appliance 3024 includes a transmitter 3023 (TxA3) and a receiver 3025 (RxA3); appliance 3028 includes a transmitter 3027 (TxA4) and a receiver 3029 (RxA4); appliance 3032 includes a transmitter 3031 (TxA5) and a receiver 3033 (RxA5); and appliance 3036 includes a transmitter 3035 (TxAn) and a receiver 3037 (RxAn).

In the representative system 3010 illustrated in FIG. 30, controller 3012 is controllingly linked with appliance 3016 via a wireless communication link 3040. Wireless communication link is an impulse radio communication link with communication information arranged in any known format, including but not limited to continuous information and packet information. Controller 3012 may be connected with a plurality of appliances, such as a microwave oven, conventional oven, burglar alarm, or other appliances. For simplicity in explaining the present invention, only one such controlling communicating link 3040 is illustrated in FIG. 30. Each appliance 3016, 3020, 3024, 3028, 3032, 3036 may be a source of noise which may interfere with wireless communication link 3040. Each appliance 3016, 3020, 3024, 3028, 3032, 3036 may generate noise in a different frequency range, with a different pattern or duty cycle, and at a different signal strength.

Each appliance transmitter 3015, 3019, 3023, 3027, 3031, 3035 is included in FIG. 30 as illustrative of one embodiment of the present invention. In the preferred embodiment of the present invention, appliances do not establish duplex communications with controller 3012, so that appliance transmitters 3015, 3019, 3023, 3027, 3031, 3035 are not present. In such a preferred configuration, only simplex communications are established between controller 3012 and appliances 3016, 3020, 3024, 3028, 3032, 3036. Thus, in the illustrative simplified embodiment of FIG. 30, when appliance 3016 is equipped with an appliance transmitter 3015, communications between controller 3012 and appliance 3016 are duplex communications, and appliance 3016 can indicate to controller 3012 the quality of received signal experienced. That is, appliance 3016 can directly indicate to controller 3012 via return communications from appliance transmitter 3015 to controller receiver 3013 the character of signals received by appliance receiver 3017, including information relating to noise being encountered by appliance receiver 3017. In such an arrangement enabling duplex communications between controller 3012 and an appliance, such as appliance 3016, appliance control system 3010 operates substantially the same as earlier-described embodiments, such as those embodiments described herein in connection with FIGS. 10-28. The consequence of a decision by the system to alter power level relating to a particular signal may, in the embodiment of the invention of FIG. 30 (i.e., system 3010) involve power level control, as well result in cessation of transmission, altering the data rate of the transmission, or altering the packet size in a packet communications system. Further, the result action may also include any combination of altering the data rate, altering the power level or altering the packet size of the transmission.

In the embodiment of the present invention contemplated as the preferred embodiment that is, system 3010 representatively illustrated in FIG. 30, but without appliance transmitters 3015, 3019, 3023, 3027, 3031, 3035 controller 3012 measures noise in the environment with controller receiver 3013. Thus, controller receiver 3013 may be configured to measure noise within a predetermined frequency band; the measurement of noise may be effected periodically, or may be carried out on a continuous basis. Alternatively, controller receiver 3013 may be tunable to measure noise in a plurality of frequency bands, either simultaneously or seriatim. If controller receiver 3013 is capable of measuring noise in a plurality of frequency bands simultaneously, then controller receiver 3013 may be configured as a plurality of receivers. Preferably, controller 3012 is configured to evaluate noise signals measured by controller receiver 3013 to determine observed interference periods. Most preferably, controller 3012 is configured to evaluate noise signals measured by controller receiver 3013 to predict future interference periods and to be able to anticipate occurrence of an interference period in determining when to effect a preventive action for moderating the effect of noise in the environment, such as cessation of transmission of control signals, increasing power level of transmitted control signals, shortening packets of transmitted control signals arranged for packet communication, increasing the data rate for transmitting control signals, or other alterations, either singly or in an appropriate combination.

Figure 31:
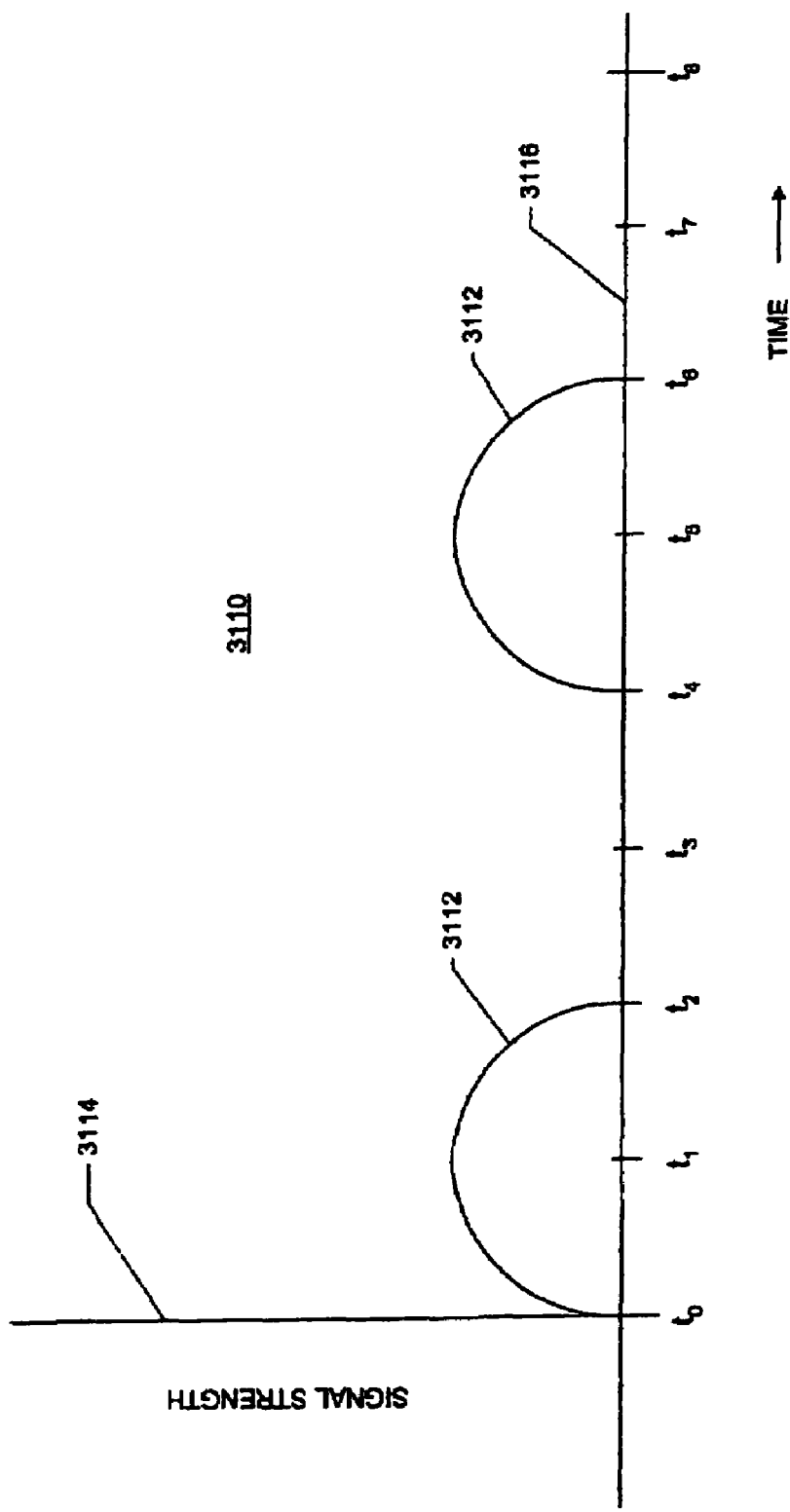
FIG. 31 is a schematic diagram illustrating the periodic generation of noise by a representative appliance.

FIG. 31 is a schematic diagram illustrating the periodic generation of noise by a representative appliance. In FIG. 31, a graph 3110 illustrates a signal 3112 representative of a leakage envelope related to operation of a household microwave oven. Signal 3112 is plotted on graph 3110 indicating signal strength on a vertical axis 3114, as a function of time on a horizontal axis 3116. Signal 3112 transmit intermittently in a pattern reflecting half-cycles of a 60 Hertz power supply signal provided to the microwave oven (not shown). Thus, the microwave oven generates noise in increasing amounts during a time period $t_0$ $t_1$ to a peak signal strength at time $t_1$. Signal 3112 decreases in signal strength to a substantially zero value during a time period $t_1$-$t_2$. Signal 3112 remains at a substantially zero signal strength during a time period $t_2$-$t_4$, and increases again to a peak signal strength during a time period $t_4$-$t_5$. Signal 3112 again decreases in signal strength to a substantially zero signal strength during a time period $t_5$-$t_6$. If the microwave oven generating noise signal 3112 remained in an ON state, signal 3112 would resume at a time $t_8$. However, in graph 3110, the microwave oven source of noise signal 3112 was turned to an OFF state some time during the time period $t_6$-$t_8$, so noise signal 3112 remains at a substantially zero signal strength after time $t_6$.

Thus, the microwave oven (i.e., the magnetron associated with the microwave oven) acts as a half-wave rectifier and transmits noise only during half of a 60 Hertz cycle. Accordingly, half the time is available for unrestricted transmission of control signals to appliances from a wireless controller, such as controller 3012 (FIG. 30). Noise from a plurality of appliances in the environment may additively contribute with a result that noise-free periods are less than one-half of a 60 Hertz cycle. Moreover, turning appliances on and off, and other circumstances, may combine to produce a noise envelope that changes over time in frequency range, duty cycle (i.e., ON Time versus OFF time), signal strength, and other factors. It is therefore desirable that a predictive capability be provided to a wireless controller configured according to the present invention. By measuring, or evaluating a plurality of frequency ranges in which noise signals may prove interfering to appliance control operations one can enhance avoidance of interference. Further, if one can predict the occurrence of noise signals above a threshold at which such noise becomes detrimental, one may anticipatorily effect change in a control signal to better avoid interference. As mentioned earlier, such change in control signal may, for example, involve one or more of cessation of the control signal, varying power level or data rate of the control signal, or altering the packet length of the control signal. Measuring and evaluating noise signals is preferably effected in a repeat cycle significantly shorter than the frequency of changes caused either by changes in operating (e.g., turning appliances on or off) or by changes from other causes, such as beat frequency effects among noise signals, or the like. Shorter evaluation cycles facilitate more accurate prediction of change, more immediate recognition of actual change, and more accurate checking of accuracy of predictions. All such advantages facilitate more efficient adaptation of an appliance control system to its noise environment.

Figure 32:
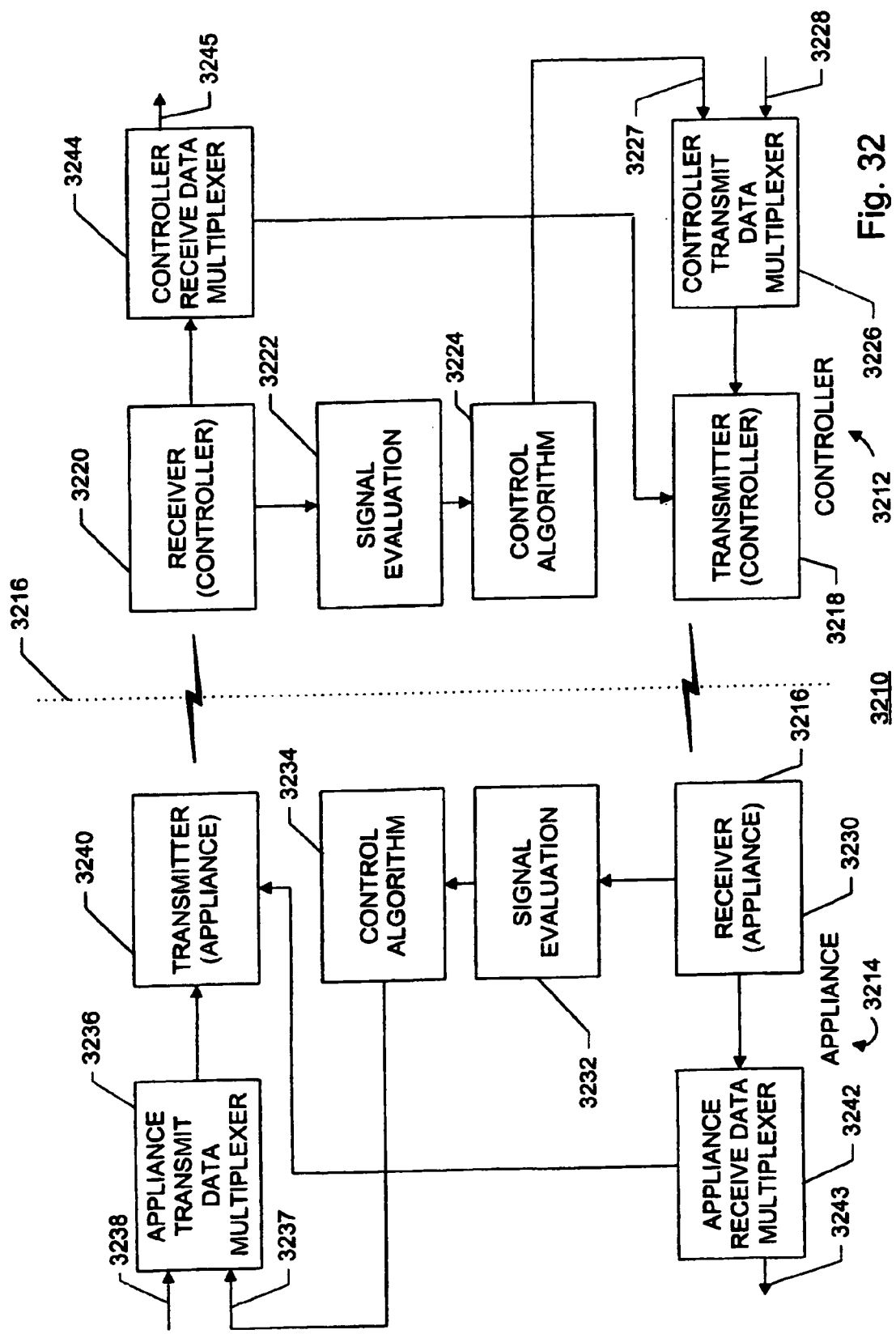
FIG. 32 is an exemplary diagram of one embodiment of impulse radio employed in controlling appliances in a noisy environment according to the present invention.

FIG. 32 is an exemplary diagram of one embodiment of impulse radio employed in controlling appliances in a noisy environment according to the present invention. In FIG. 32, an appliance control system 3210 includes an impulse radio wireless controller 3212 and an appliance 3214. Controller 3212 and appliance 3214 are communicatively linked wirelessly through a communication interface 3216. Controller 3212 includes a transmitter 3218 for transmitting control signals via communication interface 3216 to appliance 3214. Controller 3212 also includes a receiver 3220 for receiving signals. Receiver 3220 may be configured for receiving environmental noise signals (not shown in detail in FIG. 32.), configured for receiving communication signals from appliance 3214, or configured to receive both environmental noise signals and communication signals from appliance 3214. Preferably receiver 3220 is configured to receive communication signals from appliance 3214 and is capable of measuring noise signals in at least one frequency range in which noise signals are disruptive to operation of appliance control system 3210. Such measurement of noise signals in different frequency ranges may be effected substantially simultaneously or seriatim. Receiver 3220 provides at least a portion of its signal received relating to the quality of the signal received from a transmitter 3240 of appliance 3214 for signal evaluation, as indicated by a signal evaluation block 3222. In the preferred embodiment of appliance control system 3210 illustrated in FIG. 32, both controller 3212 and appliance 3214 have a transmitter and a receiver. In such a configuration, communication signals received 3220 from appliance 3214 contain signal strength information from appliance 3214 relating to the quality of signal received by appliance receiver 3230 from controller transmitter 3218. Receiver 3220 also receives noise interference information in the form of noise signals extant in the environment. Signal strength information is provided by receiver 3220 for signal evaluation 3222 in order to evaluate the prospect of altering transmit power for transmitter 3218. Noise information is provided to a controller receive data multiplexer for use in determining whether to alter transmission by transmitter 3218 to moderate the effects of ambient noise.

Results of signal evaluation 3222 which may have been effected by one or more of the signal evaluation techniques described earlier, such as signal strength, signal-to-noise ratio (SNR), or bit error rate (BER) evaluation are provided for evaluation according to a predetermined control algorithm, as indicated by a block 3224. Results of evaluation by the predetermined control algorithm are provided to a transmit data multiplexer 3226. Such results of evaluation indicate, for example, whether appliance 3214 should alter its transmission power level.

Transmit data multiplexer 3226 receives the results of algorithmic evaluation (block 3224) at a first input 3227 to transmit data multiplexer 3226. Transmit data multiplexer 3226 receives data to be transmitted at a second input 3228. Such data for transmission includes control signals and similar signals employed in operating appliance control system 3210. A multiplexed signal including elements of results of control algorithm evaluation and elements of data to be transmitted are provided by transmit data multiplexer 3226 to transmitter 3218 for transmission through communication interface 3216 to appliance 3214. Preferably communication interface 3216 is a wireless impulse radio control interface between controller 3212 and appliance 3214.

As mentioned briefly before, receiver 3220 provides noise interference information in the form of noise signals extant in the environment to receive data multiplexer 3244. Receive data multiplexer 3244 evaluates noise information received from receiver 3220 and indicates to transmitter 2318 whether to alter transmitted signals to appliance 3214. Such alterations may include cessation of transmission, altering data rate or power level, shortening packet length, or other alterations, alone or in appropriate combination. Controller receive data multiplexer 3244 presents an output signal at an output 3245 for providing selected information from signals received from controller receiver 3220 for use by controller 3212.

Appliance 3214 includes a receiver 3230 for receiving communications from transmitter 3218. Receiver 3230 sends information relating to quality of the signal received from controller transmitter 3218 for signal evaluation, as indicated by a block 3232. Signal evaluation according to block 3232 may be carried out according to any accepted signal evaluation criteria, including those criteria applied by controller 3212 in its signal evaluation 3224. The evaluation of the criteria is effected employing a predetermined control algorithm, as indicated by a block 3234. Results of the exercise of the control algorithm indicating aspects of signal propagation within system 3210, are provided to a transmit data multiplexer 3236 at a first input 3237.

Receiver 3230 provides noise interference information in the form of noise signals extant in the environment to a receive data multiplexer 3242. Receive data multiplexer 3242 evaluates noise information received from receiver 3230 and indicates to appliance transmitter 3240 whether to alter transmitted signals to controller 3212. Such alterations may include cessation of transmission, altering data rate or power level, shortening packet length or other alterations, alone or in appropriate combination. Application receive data multiplexer 3242 presents an output signal at an output 3243 for providing selected information from signals received from appliance receiver 3230 for use by appliance 3210.

Figure 33:
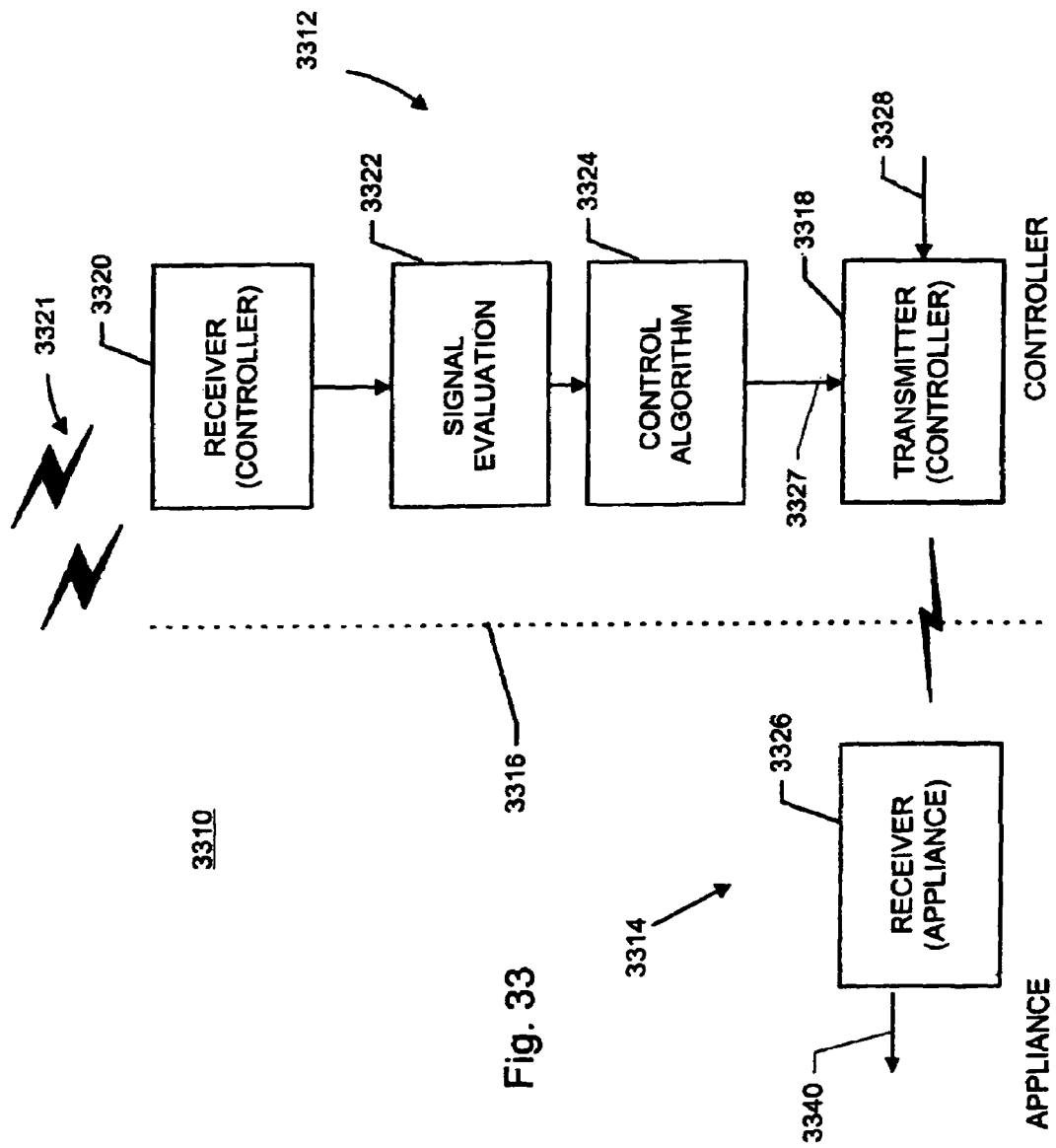
FIG. 33 is an exemplary diagram of a first alternate embodiment of impulse radio employed in controlling appliances in a noisy environment according to the present invention.

FIG. 33 is an exemplary diagram of a first alternate embodiment of impulse radio employed in controlling appliances in a noisy environment according to the present invention. In FIG. 33, an appliance control system 3310 includes an impulse radio wireless controller 3312 and an appliance 3314. Controller 3312 and appliance 3314 are communicatively linked wirelessly through a communication interface 3316. Controller 3312 includes a transmitter 3318 for transmitting control signals via communication interface 3316 to an appliance receiver 3326 at appliance 3314. Appliance receiver 3326 presents an output signal at an output 3340 for providing information from signals received from controller transmitter 3318 for use by appliance receiver 3230 for use by appliance 3214. Receive data multiplexer 3242 evaluates noise information received from receiver 3230 and provides resultant information for inclusion in control algorithm evaluation 3234. Results of control algorithm 3234 are applied to control transmitter 3240 to determine whether to alter transmitted signals to controller 3212. Such alterations may include cessation of transmission, altering data rate or power level, shortening packet length, or other alterations, alone or in appropriate combinations. The provision of information by receive data multiplexer 3242 for inclusion in control algorithm evaluation 3234, and the direct control connection between control algorithm evaluation 3234 and transmitter 3240 are another difference between systems 3410, 3210 (FIG. 32).

Figure 34:
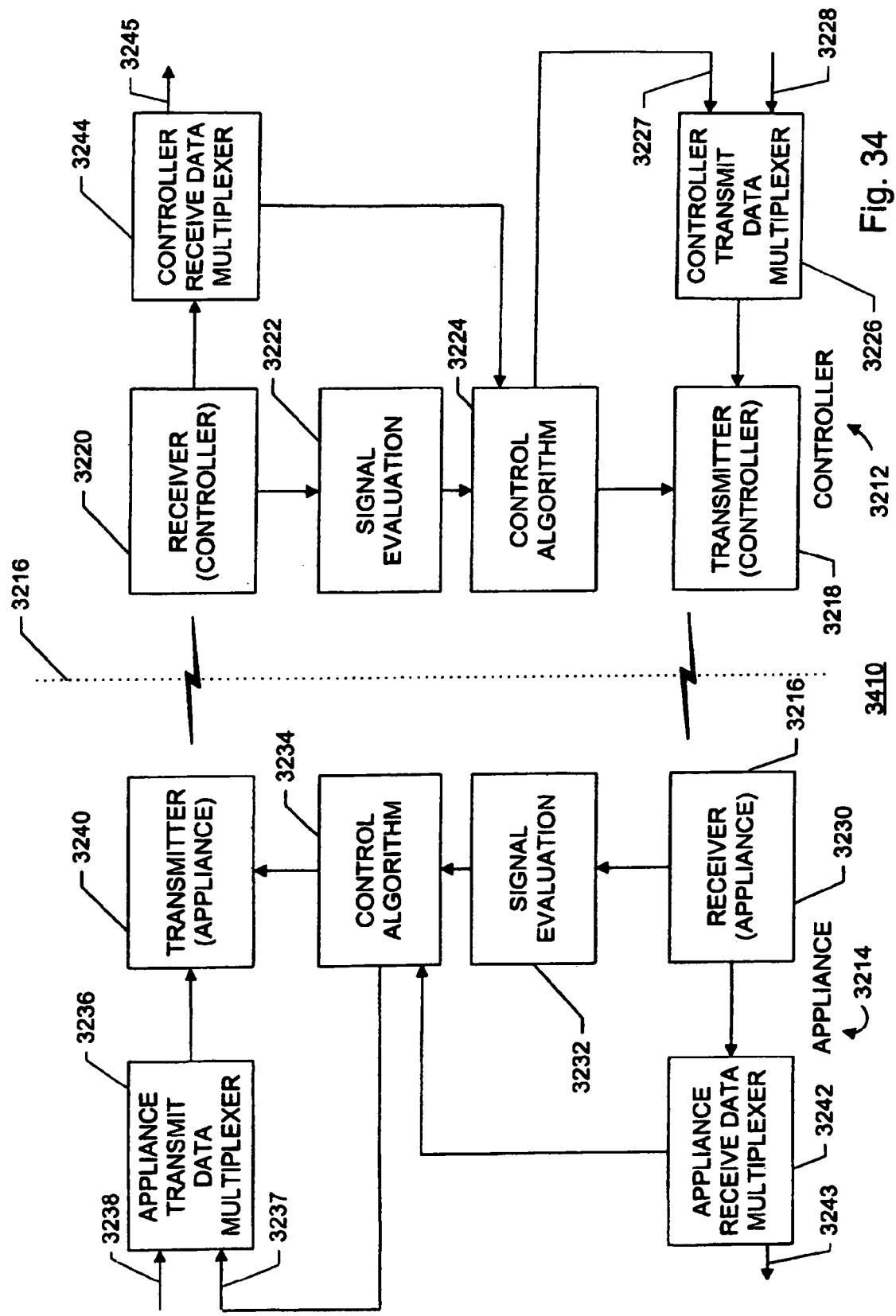
FIG. 34 is an exemplary diagram of a second alternate embodiment of impulse radio employed in controlling appliances in a noisy environment according to the present invention.
Figure 35:
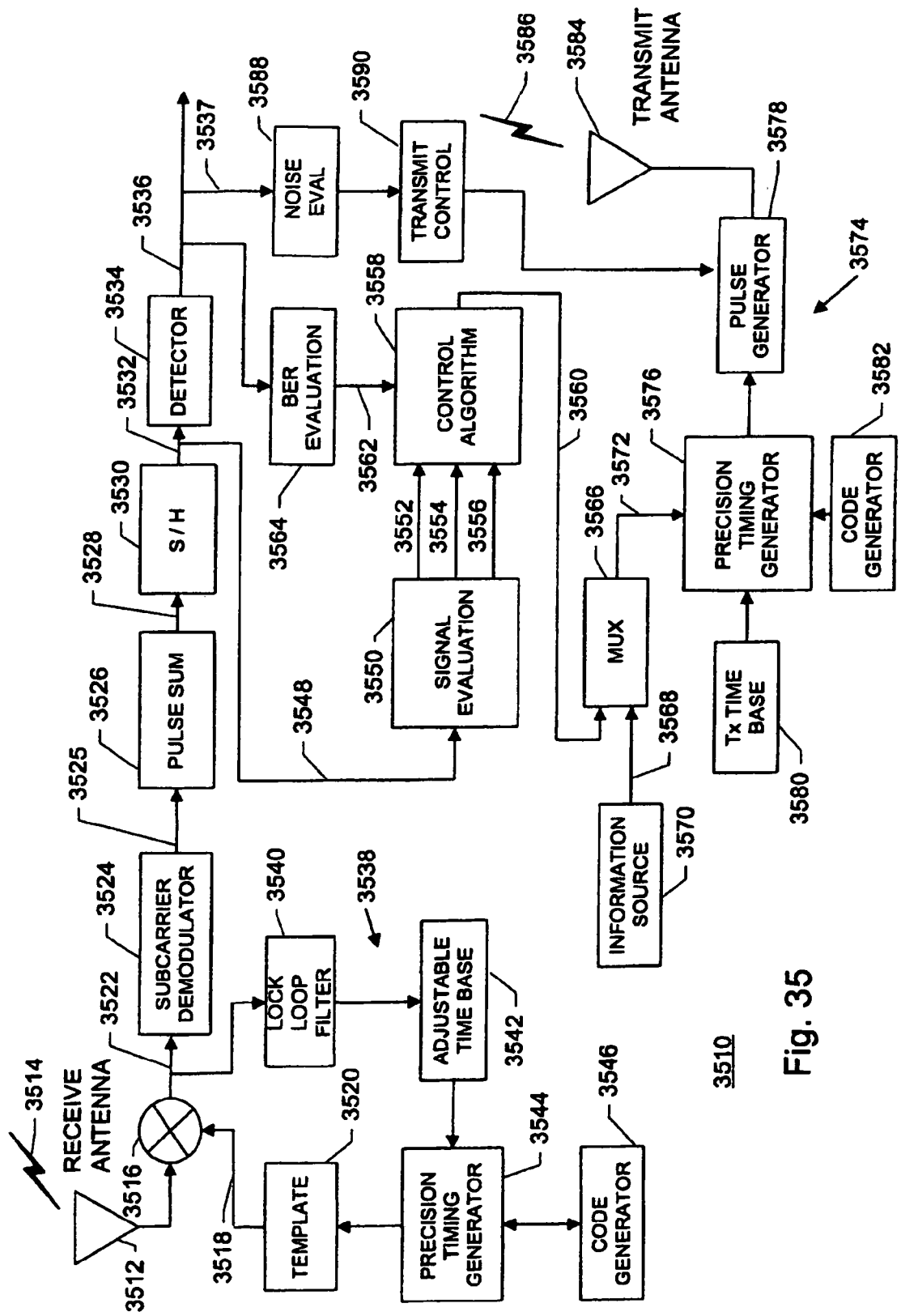
FIG. 35 is an exemplary diagram of an impulse radio apparatus including noise measuring functions employed in controlling appliances according to the preferred embodiment of the present invention.

FIG. 35 is an exemplary diagram of an impulse radio apparatus including noise measuring functions employed in controlling appliances according to the preferred embodiment of the present invention. In FIG. 35, a controller transceiver 3510 for use in an appliance control system and configured to measure signal strength, signal-to-noise ratio (SNR), and bit error rate (BER) is illustrated. Controller transceiver 3510 is appropriate for use in appliance control systems 3010 (FIG. 30), 3210 (FIG. 32), 3310 (FIG. 33), and 3410 (FIG. 34).

In controller transceiver 3510, receive antenna 3512 receives incoming signals 3514. Incoming signals 3514 may contain information relating to quality of signal received by an appliance and may include indications of effects of noise experienced by the appliance (e.g., as in duplex communication capable appliance control systems) or may simply be noise signals present in the system environment (e.g., in simplex communication capable appliance control systems). Received signal 3514 is provided to a correlator 3516. Correlator 3516 multiplies received signal 3514 according to a template signal 3518 received from a template generator 3520 to produce a correlated signal which is short term integrated (or alternatively sampled) by correlator 3522 to produce a baseband output signal 3522. Baseband output signal 3522 is provided to an optional subcarrier demodulator 3524. Subcarrier demodulator 3524 demodulates any subcarrier signal that may be involved with incoming signal 3514 to produce a subcarrier demodulated baseband signal 3525.

Subcarrier demodulated baseband signal 3525 is then long term Integrated in a pulse summation stage 3526. Pulse summation stage 3526 is typically an integrate-and-dump stage that produces a ramp shape output waveform when transceiver 3510 is receiving incoming signal 3514. Pulse summation stage 3526 preferably produces a random walk type waveform when receiving pure noise at receive antenna 3512. Pulse summation stage 3526 provides an output signal 3528 to a sample-and-hold stage 3530. An output signal 3532 from sample-and-hold stage 3530 is provided to a detector 3534. Detector 3534 produces an output in the form of a detection-indicating signal 3536; detection-indicating signal 3536 indicates the logic state of received signal 3514.

Baseband output signal 3522 from correlator 3516 is also provided to a lock loop 3538. Lock loop 3538 includes a lock loop filter 3540, an adjustable time base 3542, a prevision timing generator 3544, template generator 3520 and correlator 3516. Lock loop 3538 maintains a stable quiescent operating point on the correlation function performed by correlator 3516 in the presence of variations in the transmitter time base frequency and variations due to Doppler effects.

Adjustable time base 3542 drives precision timing generator 3544, which provides timing to a code generator 3546. Code generator 3546 provides timing commands back to timing generator 3544 according to a selected code. Timing generator 3544 provides timing signals to template generator 3520 according to the timing commands, and template generator 3520 generates a proper template waveform 3518 for use by correlator 3516 for the correlation process. Coding is optional. Accordingly, it should be appreciated that the present invention covers non-coded implementations that do not incorporate code generator 3546.

Output signal 3528 from pulse summation stage 3526 is sampled by the sample-and-hold stage 3530 providing an output signal 3548 to a signal evaluation stage 3550. Signal evaluation stage 3550 evaluates output signal 3548 to determine a measure of the signal strength 3552, received noise 3554, and signal-to-noise ratio (SNR) 3556. These values are employed by a power control algorithm 3558 to generate a power control update signal 3560. Power control update signal 3560 is determined according to one or more of the performance measurements: signal strength 3552, received noise 3554, and SNR 3556. Power control algorithm 3558 may also employ a bit error rate (BER) measurement 3562 in determining power control update signal 3560. BER measurement 3562 provided by a BER evaluation function 3564 that samples detection indicating signal 3536.

Power control update signal 3560 is provided to a multiplexer 3566. Multiplexer 3566 also receives an information signal 3568 from an information source 3570. Multiplexer 3566 combines power control update signal 3560 with information signal 3568 in a multiplexed output signal 3572. Multiplexed output signal 3572 is provided to a transmitter 3574. Transmitter 3574 includes a precision timing generator 3576, a pulse generator 3578, a transmitter time base 3580, a code generator 3582 and a transmit antenna 3584. A portion of multiplexed output signal 3572 contains user data (i.e., information signal 3568) and a portion contains control information, which includes power control update signal 3560. Multiplexed output signal 3572 is provided to transmitter precision timing generator 3576 (which may optionally include a subcarrier modulation process). Transmitter precision timing generator 3576 is driven by transmitter time base 3580 and interfaces with code generator 3582. Code generator 3582 provides pulse position commands according to a PN code to effect impulse radio signals. Timing generator 3576 provides timing signals to pulse generator 3578; pulse generator 3578 generates pulses of proper amplitude and waveform according to the timing signals received from pulse generator 3578. These pulses are then transmitted by transmit antenna 3584 as transmitted impulse radio signals 3586.

BER 3562 is a measure of signal quality that is related to the ratio of error bits to the total number of bits transmitted in incoming signals 3514, as indicated by detection indicating signal 3536. The use of other signal quality measurements, which are apparent to one skilled in the relevant art, are within the spirit and scope of the present invention.

Detection indicating signal 3536 may contain both user data and noise avoidance control components. Noise avoidance control command components 3537 may be selected from detection indicating signal 3536 by a noise evaluation unit 3588. When noise evaluation unit 3588 determines that noise is interfering, or will likely soon interfere, with operation of system 3510, a notification is provided to a transmit control unit 3590. Transmit control unit 3590 controls transmitter 3574 to avoid or overcome the effects of noise by methods previously discussed, including cessation of transmission, altering power level of transmission, altering data rate or shortening packet length.

Conclusion

While various embodiments of the present invention have been described above, it should be understood that they have been presented by way of example, and not limitation. For instance, although the exemplary system embodiment in this patent application is an impulse radio using a 2.0 GHz center frequency, impulse radio systems with a center frequency from below audio to microwave, millimeter wave, tera-Hertz, and even optical frequencies may benefit from this invention. In addition, some of the embodiments, such as the power control embodiments incorporating integration gain power control and gain expansion power control, may be of benefit to spread spectrum radio systems in general (that is, spread spectrum radio systems that do not employ impulse radio communications). Further, the transmission wave may be electromagnetic or acoustic.

Thus the breadth and scope of the present invention should not be limited by any of the above-described exemplary embodiments, but should be defined only in accordance with the following claims and their equivalents.

We claim:

1. A method for power control in an ultra wideband (UWB) system comprising:
    transmitting a first UWB signal from a first UWB transceiver:
    receiving the first UWB signal at a second UWB transceiver; and
        controlling a transmit power of a second UWB signal generated by one of the first UWB transceiver or the second UWB transceiver based on the received first UWB signal:
    determining a transmit (TX) power update based on the received first UWB signal; and
    modifying the transmit power in accordance with the TX power update.

2. The method of claim 1, wherein determining a TX power update comprises determining a TX power level.

3. The method of claim 1, wherein determining a TX power update comprises determining a TX power attenuation and modifying the transmit power in accordance with the TX power update comprises attenuating the transmit power in accordance with the TX power attenuation.

4. The method of claim 3, wherein a dynamic range for the attenuation of the transmit power is 0-12 dB or wherein the dynamic range for the attenuation of the transmit power is 0-8 dB.

5. The method of claim 3, wherein modifying the transmit power comprises attenuating the transmit power in steps.

6. The method of claim 5, wherein a step size granularity is approximately 2 dB.

7. The method of claim 1, wherein controlling transmit power comprises controlling an integration gain.

8. The method of claim 1, wherein determining the TX power update comprises calculating at least one of a bit error rate, a signal-to-noise ratio and a received signal strength associated with the received first UWB signal.

9. A ultra wideband (UWB) communication system, comprising:
    a first UWB transceiver operable to:
        transmit a first UWB signal: and
    a second UWB transceiver operable to:
        receive the first UWB signal, wherein at least one of the first UWB transceiver or the second UWB transceiver is further operable to transmit a second UWB signal and to control a transmit power of the second UWB signal based on the received first UWB signal wherein at least one of the first UWB transceiver or the second UWB transceiver is further operable to control the transmit power by modifying the transmit power in accordance with a TX power update determined at the first or second UWB transceiver based on the received first UWB signal.

10. The UWB communication system of claim 9, wherein determining a TX power update comprises determining a TX power level.

11. The UWB communication system of claim 9, wherein determining a TX power update comprises determining a TX power attenuation and modifying the transmit power in accordance with the TX power update comprises attenuating the transmit power in accordance with the TX power attenuation.

12. The UWB communication system of claim 11, wherein a dynamic range for the attenuation of the transmit power is 0-12 dB or wherein the dynamic range for the attenuation of the transmit power is 0-8 dB.

13. The UWB communication system of claim 11, wherein modifying the transmit power comprises attenuating the transmit power in steps.

14. The UWB communication system of claim 13, wherein a step size granularity is approximately 2 dB.

15. The UWB communication system of claim 9, wherein to control the transmit power comprises controlling an integration gain.

16. The UWB communication system of claim 9, wherein determining the TX power update comprises calculating at least one of a bit error rate, a signal-to-noise ratio and a received signal strength associated with the received first UWB signal.

* * * * *